US012631987B2

(12) United States Patent
Murakami et al.

(10) Patent No.: US 12,631,987 B2
(45) Date of Patent: *May 19, 2026

(54) DEVELOPER SUPPLY CONTAINER AND DEVELOPER SUPPLYING SYSTEM

(71) Applicant: CANON KABUSHIKI KAISHA, Tokyo (JP)

(72) Inventors: Katsuya Murakami, Toride (JP); Toshiaki Nagashima, Moriya (JP); Fumio Tazawa, Kashiwa (JP); Ayatomo Okino, Moriya (JP); Yusuke Yamada, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/809,545

(22) Filed: Aug. 20, 2024

(65) Prior Publication Data

US 2024/0411242 A1 Dec. 12, 2024

Related U.S. Application Data

(60) Division of application No. 18/133,037, filed on Apr. 11, 2023, now Pat. No. 12,092,972, which is a (Continued)

(30) Foreign Application Priority Data

Mar. 30, 2009 (JP) ................................ 2009-082081

(51) Int. Cl.
*G03G 15/08* (2006.01)

(52) U.S. Cl.
CPC ..... *G03G 15/0867* (2013.01); *G03G 15/0865* (2013.01); *G03G 15/0872* (2013.01); *G03G 15/0877* (2013.01); *G03G 2215/0685* (2013.01)

(58) Field of Classification Search
CPC ........... G03G 15/0867; G03G 15/0865; G03G 15/0872; G03G 15/0877; G03G 2215/0685
See application file for complete search history.

(56) References Cited

U.S. PATENT DOCUMENTS

| | | | |
|---|---|---|---|
| 2,089,854 | A | 8/1937 | Pellegrini |
| 3,951,539 | A | 4/1976 | Draugelis |

(Continued)

FOREIGN PATENT DOCUMENTS

| | | | |
|---|---|---|---|
| CN | 1577158 | A | 2/2005 |
| CN | 1842753 | A | 10/2006 |

(Continued)

OTHER PUBLICATIONS

International Search Report mailed Apr. 27, 2010, in International Application No. PCT/JP2010/056133.

(Continued)

*Primary Examiner* — Sandra Brase
(74) *Attorney, Agent, or Firm* — Venable LLP

(57) ABSTRACT

In the case that a developer supply container is provided with a feeding portion for feeding a developer by receiving a rotational force and a pump portion for discharging the developer by reciprocation, and the rotational force and a reciprocating force are received from a main assembly side of an image forming apparatus, there is a liability that a driving connection is not properly established between a portion of the developer supply container for receiving the reciprocating force and a portion of the main assembly side for applying the reciprocating force. The developer supply container is provided with a drive converting mechanism for converting the rotational force received from the main assembly side to a force for operating a volume changing type pump.

20 Claims, 48 Drawing Sheets

Related U.S. Application Data division of application No. 17/505,776, filed on Oct. 20, 2021, now Pat. No. 11,656,560, which is a division of application No. 16/932,951, filed on Jul. 20, 2020, now Pat. No. 11,188,009, which is a division of application No. 16/391,976, filed on Apr. 23, 2019, now Pat. No. 10,754,276, which is a division of application No. 16/018,694, filed on Jun. 26, 2018, now abandoned, which is a division of application No. 15/624,803, filed on Jun. 16, 2017, now Pat. No. 10,203,631, which is a division of application No. 14/982,454, filed on Dec. 29, 2015, now Pat. No. 9,753,402, which is a division of application No. 14/266,892, filed on May 1, 2014, now Pat. No. 9,354,551, which is a division of application No. 14/024,942, filed on Sep. 12, 2013, now Pat. No. 9,354,550, which is a division of application No. 13/242,758, filed on Sep. 23, 2011, now Pat. No. 8,565,649, which is a continuation of application No. PCT/JP2010/056133, filed on Mar. 30, 2010.

(56) References Cited

U.S. PATENT DOCUMENTS

| | | | | |
|---|---|---|---|---|
| 4,418,643 | A | 12/1983 | Barto, Jr. et al. | |
| 5,235,354 | A | 8/1993 | Larson | |
| 5,446,478 | A | 8/1995 | Larson | |
| 5,810,778 | A | 9/1998 | Hjertman | |
| 7,039,346 | B2 | 5/2006 | Terazawa et al. | |
| 7,043,179 | B2 | 5/2006 | Matsumoto et al. | |
| 7,245,853 | B2 | 7/2007 | Murakami et al. | |
| 7,542,704 | B2 | 6/2009 | Okuda et al. | |
| 7,574,162 | B2 | 8/2009 | Yamane | |
| 7,925,188 | B2 | 4/2011 | Senoh et al. | |
| 8,565,649 | B2 | 10/2013 | Murakami et al. | |
| 9,354,550 | B2 | 5/2016 | Murakami et al. | |
| 9,354,551 | B2 | 5/2016 | Murakami et al. | |
| 9,753,402 | B2 | 9/2017 | Murakami et al. | |
| 10,203,631 | B2 | 2/2019 | Murakami et al. | |
| 10,754,276 | B2 | 8/2020 | Murakami et al. | |
| 11,188,009 | B2 | 11/2021 | Murakami et al. | |
| 11,656,560 | B2 | 5/2023 | Murakami et al. | |
| 2002/0122676 | A1 | 9/2002 | Yamada et al. | |
| 2003/0235436 | A1 | 12/2003 | Kasahara et al. | |
| 2004/0223790 | A1 | 11/2004 | Hosokawa et al. | |
| 2005/0025527 | A1 | 2/2005 | Matsumoto et al. | |
| 2005/0226648 | A1 | 10/2005 | Abe et al. | |
| 2005/0226655 | A1 | 10/2005 | Katsuyama et al. | |
| 2006/0063092 | A1 | 3/2006 | Hasegawa et al. | |
| 2007/0086809 | A1 | 4/2007 | Yamane | |
| 2007/0147902 | A1 | 6/2007 | Taguchi et al. | |
| 2007/0212119 | A1 | 9/2007 | Kurenuma et al. | |
| 2007/0223947 | A1* | 9/2007 | Ohkawa ............. | G03G 15/0872 399/258 |
| 2008/0031657 | A1 | 2/2008 | Okuda et al. | |
| 2008/0124133 | A1 | 5/2008 | Yoshizawa et al. | |
| 2008/0219683 | A1 | 9/2008 | Muramatsu | |
| 2008/0226311 | A1 | 9/2008 | Senoh et al. | |
| 2008/0240771 | A1 | 10/2008 | Kurita et al. | |
| 2009/0010685 | A1 | 1/2009 | Makino | |
| 2010/0296847 | A1 | 11/2010 | Kurenuma et al. | |
| 2012/0014722 | A1 | 1/2012 | Okino et al. | |
| 2015/0277285 | A1 | 10/2015 | Okino et al. | |
| 2017/0285521 | A1 | 10/2017 | Murakami et al. | |

FOREIGN PATENT DOCUMENTS

| | | | |
|---|---|---|---|
| CN | 1955860 | A | 5/2007 |
| CN | 101118404 | A | 2/2008 |
| CN | 102378941 | A | 3/2012 |
| CN | 103853012 | A | 6/2014 |
| JP | 02-005770 | | 1/1990 |
| JP | 04-143781 | A | 5/1992 |
| JP | 04-505899 | T | 10/1992 |
| JP | 06-055157 | U | 7/1994 |
| JP | 09-222795 | A | 8/1997 |
| JP | 63-006464 | U | 1/1998 |
| JP | 10-063078 | A | 3/1998 |
| JP | 2769389 | B2 | 6/1998 |
| JP | 2001-175064 | A | 6/2001 |
| JP | 2002-072649 | A | 3/2002 |
| JP | 2005-017789 | A | 1/2005 |
| JP | 2006-047811 | A | 2/2006 |
| JP | 2007-025625 | A | 2/2007 |
| JP | 2007-058034 | A | 3/2007 |
| JP | 2008-148368 | A | 6/2007 |
| JP | 2008-257213 | A | 10/2008 |
| JP | 2008-309858 | A | 12/2008 |
| JP | 2009-020302 | A | 1/2009 |
| KR | 100454835 | B1 | 11/2004 |
| KR | 2007-0085096 | A | 8/2007 |
| KR | 10-2012-0000568 | A | 1/2012 |
| RU | 2134592 | C1 | 8/1999 |
| RU | 2302027 | C2 | 10/2006 |
| TW | I249088 | | 2/2006 |
| UA | 023129 | A | 6/1998 |
| WO | 90/14960 | A1 | 12/1990 |

OTHER PUBLICATIONS

Ayatomo Okino et al., U.S. Appl. No. 13/246,293, filed Sep. 27, 2011.

International Search Report mailed Apr. 27, 2010, in International Application No. PCT/JP2010/056134.

Decision on Grant—Patent for Invention issued Sep. 27, 2012, in Ukrainian Application No. 201112687 (MI-8573).

Patent Examination Report No. 1 issued Aug. 16, 2012, in Australian Application No. 2010232165.

Official Action issued Dec. 4, 2012, in Ukrainian Application No. 201112684.

Notification of the First Office Action (PCT Application in the National Phase) dated Dec. 5, 2012, including a Search Report, in Chinese Application No. 201080022874.7.

Communication dated Dec. 12, 2012, forwarding a Supplementary European Search Report dated Dec. 4, 2012, in European Application No. 10758917.8-2216/2416222.

Communication dated Dec. 12, 2012, forwarding a Supplemental European Search Report dated Nov. 29, 2012 ("Second European Search Report"), in European Application No. 10758918.6-2216/2416223, which is a counterpart U.S. Appl. No. 13/246,293.

Notification of the First Office Action (PCT Application in the National Phase) dated Jan. 16, 2013, in Chinese Application No. 201080014943.X.

Russian Official Decision on Grant dated May 29, 2014, in related Russian Patent Application No. 2011143796.

Communication in European Patent Application No. 15 15 6670.0, dated Jul. 8, 2015.

Office Action in Taiwanese Patent Application No. 103107886, dated Aug. 28, 2015.

Australian Notice of Acceptance dated May 7, 2014, in related Australian Patent Application No. 201032164.

English translation of Aug. 28, 2015 Office Action in Taiwanese Patent Application No. 103107886.

Notice of Acceptance in Australian Patent Application No. 2014216008, mailed Nov. 20, 2015.

Office Action in German Patent Application No. 11 2010 001 458.2, mailed Nov. 2, 2015 (with English translation).

Decision on Grant in Russian Patent Application No. 2014133712, dated Sep. 22, 2016 (with English translation).

Notice of Allowance in Korean Patent Application No. 10-2011-7024998, dated Jan. 18, 2017.

Apr. 5, 2016 Office Action in Chinese Patent Application No. 201410047157.X (with English translation).

Apr. 5, 2016 Office Action in Chinese Patent Application No. 2014110047160.1 (with English translation).

(56) References Cited

OTHER PUBLICATIONS

Apr. 5, 2016 Office Action in Chinese Patent Application No. 201410047167.3 (with English translation).
Apr. 5, 2016 Office Action in Chinese Patent Application No. 201410046741.3 (with English translation).
Apr. 14, 2016 Office Action in Korean Patent Application No. 10-2011-7024998.
Apr. 5, 2016 Office Action in Chinese Patent Application No. 201410046837.X.
May 11, 2017 Search and Examination Report in United Arab Emirates Patent Application No. 0987/2011.
Notice of Acceptance in Australian Patent Application No. 2016201102, mailed Apr. 24, 2017.
Decision on Grant in Russian Patent Application No. 2017102545, dated Feb. 5, 2018 (with English translation).
Patent Examination Report in India Patent Application No. 7076/CHENP/2011, dated Jul. 10, 2017.
Office Action in Taiwanese Patent Application No. 105112435, dated Aug. 23, 2017.
Extended Search Report in European Patent Application No. 18150195.8, issued May 7, 2018.
Office Action in Korean Patent Application No. 10-2015-7008292, dated Jul. 4, 2018.
Office Action in Korean Patent Application No. 10-2015-7008291, dated Jul. 4, 2018.
Decision on Grant in Russian Patent Application No. 2018114681, mailed Dec. 10, 2018 (with English translation).
Notice of Acceptance in Australian Patent Application No. 2017208233, mailed May 13, 2019.
Jul. 15, 2019 Office Action in Korean Patent Application No. 10-2019-7014805.
Sep. 3, 2019 Office Action in Brazilian Patent Application No. PI1013188-4 (with partial English translation).
Sep. 3, 2019 Office Action in Brazilian Patent Application No. BR122015021128-0 (with partial English translation).
Sep. 3, 2019 Office Action in Brazilian Patent Application No. BR122015021131-0 (with partial English translation).
Sep. 20, 2019 Office Action in Taiwanese Patent Application No. 107146497.
Aug. 29, 2019 Office Action in Russian Patent Application No. 2019105311 (with English translation).
Nov. 25, 2019 Hearing Notice in Indian Patent Application No. 7076/CHENP/2011.
Dec. 2, 2019 Search Report in European Patent Application No. 1 918 4619.5.
Dec. 26, 2019 Search Report in Taiwanese Patent Application No. 107146497.
Office Action dated Mar. 23, 2020 in counterpart DE Application No. 11 2010 006 126.2, together with English translation thereof.
Jan. 15, 2021 Decision to Grant in Russian Patent Application No. 2019105311 (with English translation).
Jul. 6, 2021 Extended Search Report in European Patent Application No. 21162220.4.
Aug. 3, 2021 Office Action in Malaysian Patent Application No. PI 2017001663.
Nov. 18, 2021 Notice of Allowance in Russian Patent Application No. 2021109400 (with English translation).
Jul. 20, 2023 Communication in European Patent Application No. 21 162 220.4.
May 22, 2025 Extended Search Report in European Patent Application Pub. No. 25 150 827.1.
Otober 28, 2025 Office Action in Malaysian Patent Application Pub. No. PI2021-006381.

* cited by examiner (a)

(b)

(a)

(b)

(a)

(b)

(a)

(b)

DEVELOPER SUPPLY CONTAINER AND DEVELOPER SUPPLYING SYSTEM

FIELD OF THE INVENTION

The present invention relates to a developer supply container detachably mountable to a developer replenishing apparatus and to a developer supplying system including them. The developer supply container and the developer supplying system are used with an image forming apparatus such as a copying machine, a facsimile machine, a printer or a complex machine having functions of a plurality of such machines.

BACKGROUND ART

Conventionally, an image forming apparatus such as an electrophotographic copying machine uses a developer of fine particles. In such an image forming apparatus, the developer is supplied from the developer supply container in response to consumption thereof resulting from image forming operation.

As for the conventional developer supply container, an example is disclosed in Japanese Laid-Open Utility Model Application Sho 63-6464.

In the apparatus disclosed in Japanese Laid-Open Utility Model Application Sho 63-6464, the developer is let fall all together into the image forming apparatus from the developer supply container. In addition, in the apparatus disclosed in Japanese Laid-Open Utility Model Application Sho 63-6464, a part of the developer supply container is formed into a bellow-like portion so as to permit all of the developer can be supplied into the image forming apparatus from the developer supply container even when the developer in the developer supply container is caked. More particularly, in order to discharge the developer caked in the developer supply container into the image forming apparatus side, the user pushes the developer supply container several times to expand and contract (reciprocation) the bellow-like portion.

Thus, with the apparatus disclosed in Japanese Laid-Open Utility Model Application Sho 63-6464, the user has to manually operate the bellow-like portion of the developer supply container.

In the apparatus disclosed in Japanese Laid-open Patent Application 2006-047811, a developer supply container provided with a helical projection is rotated by a rotational force inputted from an image forming apparatus, by which the developer in the developer supply container is fed. Furthermore, in the apparatus disclosed in Japanese Laid-open Patent Application 2006-047811, the developer having been fed by the helical projection with the rotation of the developer supply container is sucked into the image forming apparatus side by a suction pump provided in the image forming apparatus through a nozzle inserted into the developer supply container.

Thus, the apparatus disclosed in Japanese Laid-open Patent Application 2006-047811 requires a driving source for rotating the developer supply container and a driving source for driving the suction pump.

Under the circumstances, the inventors have investigated the following developer supply container.

A developer supply container is provided with a feeding portion receiving a rotational force to feed the developer, and is provided with a reciprocation type pump portion for discharging the developer having been fed by the feeding portion through a discharge opening. However, when such a structure is employed, a problem may arise.

That is, the problem arises in the case that the developer supply container is provided with a drive inputting portion for rotating the feeding portion and is also provided with a drive inputting portion for reciprocating the pump portion. In such a case, it is required that the two drive inputting portions of the developer supply container are properly brought into driving connection with two drive outputting portions of the image forming apparatus side, respectively.

However, the pump portion may not be properly reciprocated in such a case that the developer supply container is taken out of the image forming apparatus and then is remounted.

More particularly, depending on expansion and contraction state of the pump portion, that is, the stop position of the drive inputting portion for the pump with respect to a reciprocating direction, the drive inputting portion for the pump may not be engaged with the drive outputting portion for the pump.

For example, when the drive input to the pump portion stops in a state that the pump portion is compressed from the normal length, the pump portion restores spontaneously to the normal length when the developer supply container is taken out. In this case, the position of the drive inputting portion for the pump portion changes while the developer supply container is being taken out, despite the fact that the stop position of the drive outputting portion of the image forming apparatus side remains unchanged.

As a result, the driving connection is not properly established between the drive outputting portion of the image forming apparatus side and the drive inputting portion of the developer supply container side, and therefore, the reciprocation of the pump portion will be disabled. Then, the developer supply into the image forming apparatus is not carried out, and the image formation will become impossible sooner or later.

Such a problem may similarly arise when the expansion and contraction state of the pump portion is changed by the user while the developer supply container is outside the apparatus.

As will be understood from the foregoing, an improvement is desired to avoid the problem when the developer supply container is provided with the drive inputting portion for rotating the feeding portion and also with the drive inputting portion for reciprocating the pump portion.

DISCLOSURE OF INVENTION

Accordingly, it is a principal object of the present invention to provide a developer supply container and a developer supplying system in which a feeding portion and a pump portion of the developer supply container can be properly operable.

It is another object of the present invention to provide a developer supply container and a developer supplying system in which the developer accommodated in the developer supply container can be properly fed, and the developer accommodated in the developer supply container can be properly discharged.

These and other objects of the present invention will become more apparent upon consideration of the following DESCRIPTION OF THE PREFERRED EMBODIMENTS of the present invention, taken in conjunction with the accompanying drawings.

According to an aspect of the present invention, there is provided a developer supply container detachably mountable to a developer replenishing apparatus, said developer supply container comprising a developer accommodating chamber for accommodating a developer; a feeding portion for feeding the developer in said developer accommodating chamber with rotation thereof; a developer discharging chamber provided with a discharge opening for permitting discharging of the developer fed by said feeding portion; a drive inputting portion for receiving a rotational force for rotating said feeding portion from said developer replenishing apparatus; a pump portion for acting at least said developer discharging chamber, said pump portion having a volume which changes with reciprocation; and a drive converting portion for converting the rotational force received by said drive inputting portion to a force for operating said pump portion.

According to another aspect of the present invention, there is provided a developer supplying system comprising a developer replenishing apparatus, a developer supply container detachably mountable to said developer replenishing apparatus, said developer supplying system comprising said developer replenishing apparatus including a mounting portion for demountably mounting said developer supply container, a developer receiving portion for receiving the developer from said developer supply container, a driver for applying a driving force to said developer supply container; and said developer supply container including a developer accommodating chamber for accommodating a developer, a feeding portion for feeding the developer in said developer accommodating chamber with rotation thereof, a developer discharging chamber provided with a discharge opening for permitting discharging of the developer fed by said feeding portion, a drive inputting portion for receiving a rotational force for rotating said feeding portion from said driver, a pump portion for acting at least said developer discharging chamber, said pump portion having a volume which changes with reciprocation, and a drive converting portion for converting the rotational force received by said drive inputting portion to a force for operating said pump portion.

These and other objects, features and advantages of the present invention will become more apparent upon a consideration of the following description of the preferred embodiments of the present invention taken in conjunction with the accompanying drawings.

Figure 2:
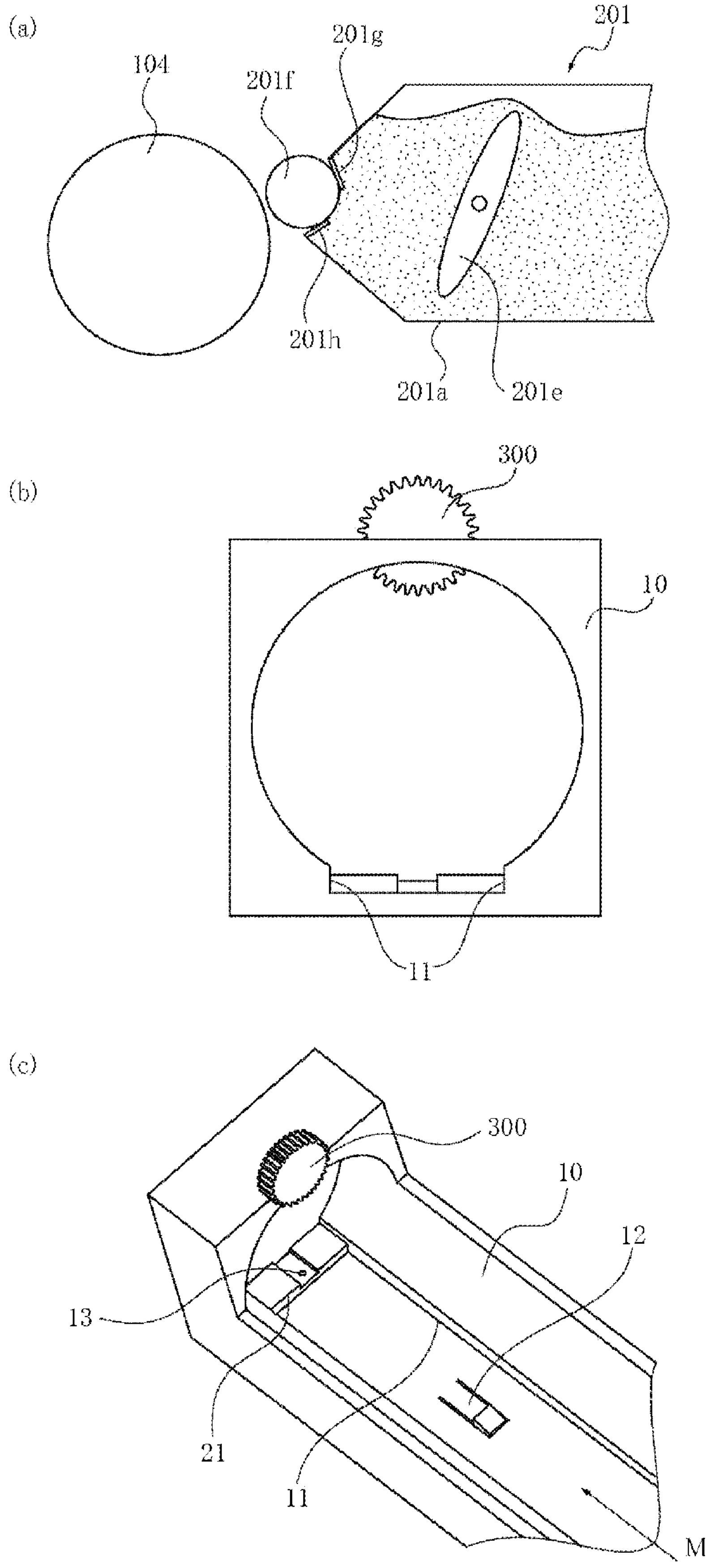

Part (a) of FIG. 2 is a partially sectional view of a developer replenishing apparatus, (b) is a front view of a mounting portion, and (c) is a partially enlarged perspective view of an inside of the mounting portion.

Figure 3:
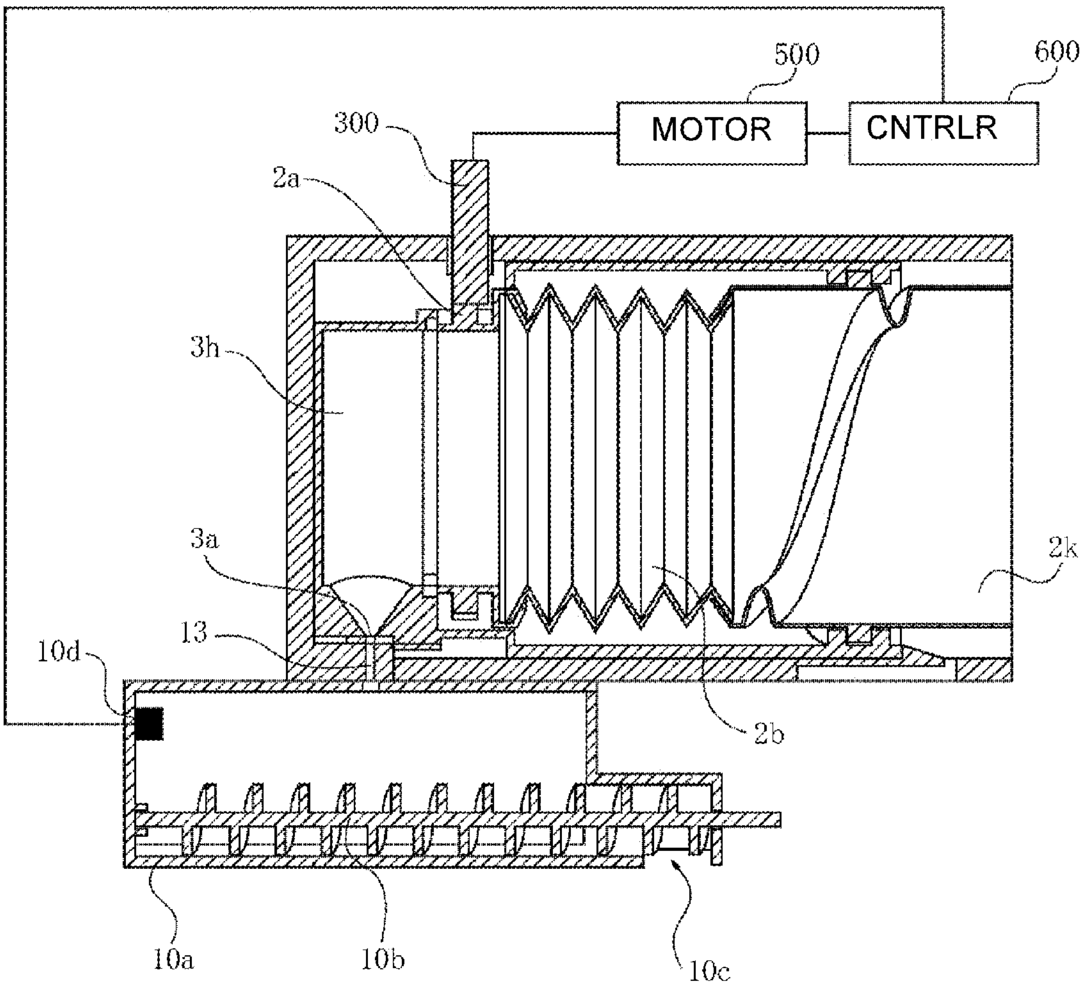

FIG. 3 is an enlarged sectional view illustrating a developer supply container and the developer replenishing apparatus.

Figure 4:
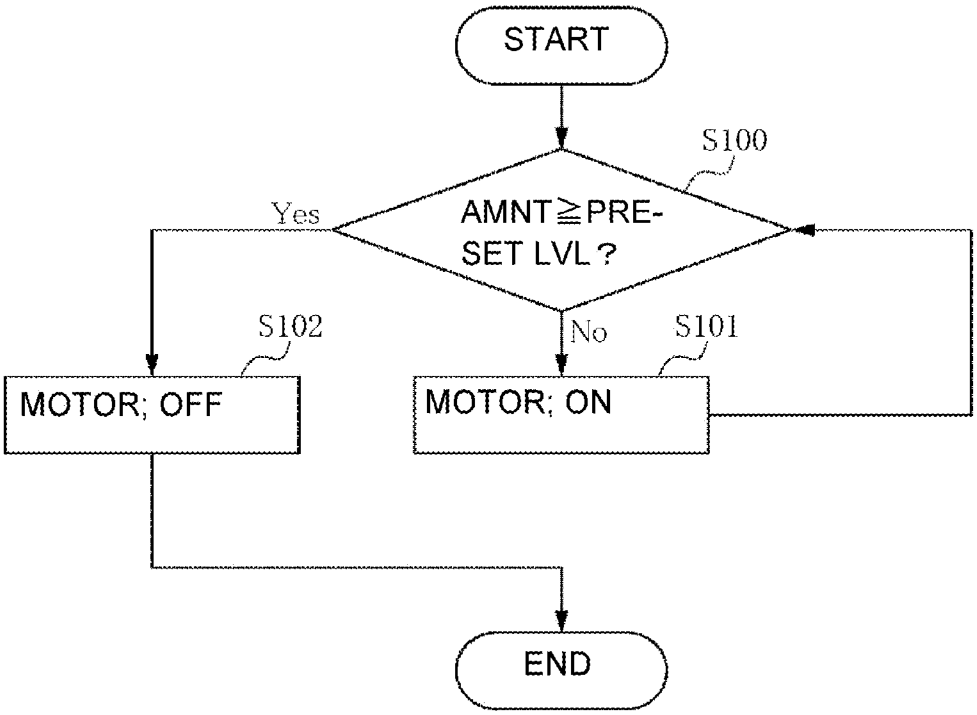

FIG. 4 is a flow chart illustrating a flow of a developer supply operation.

Figure 5:
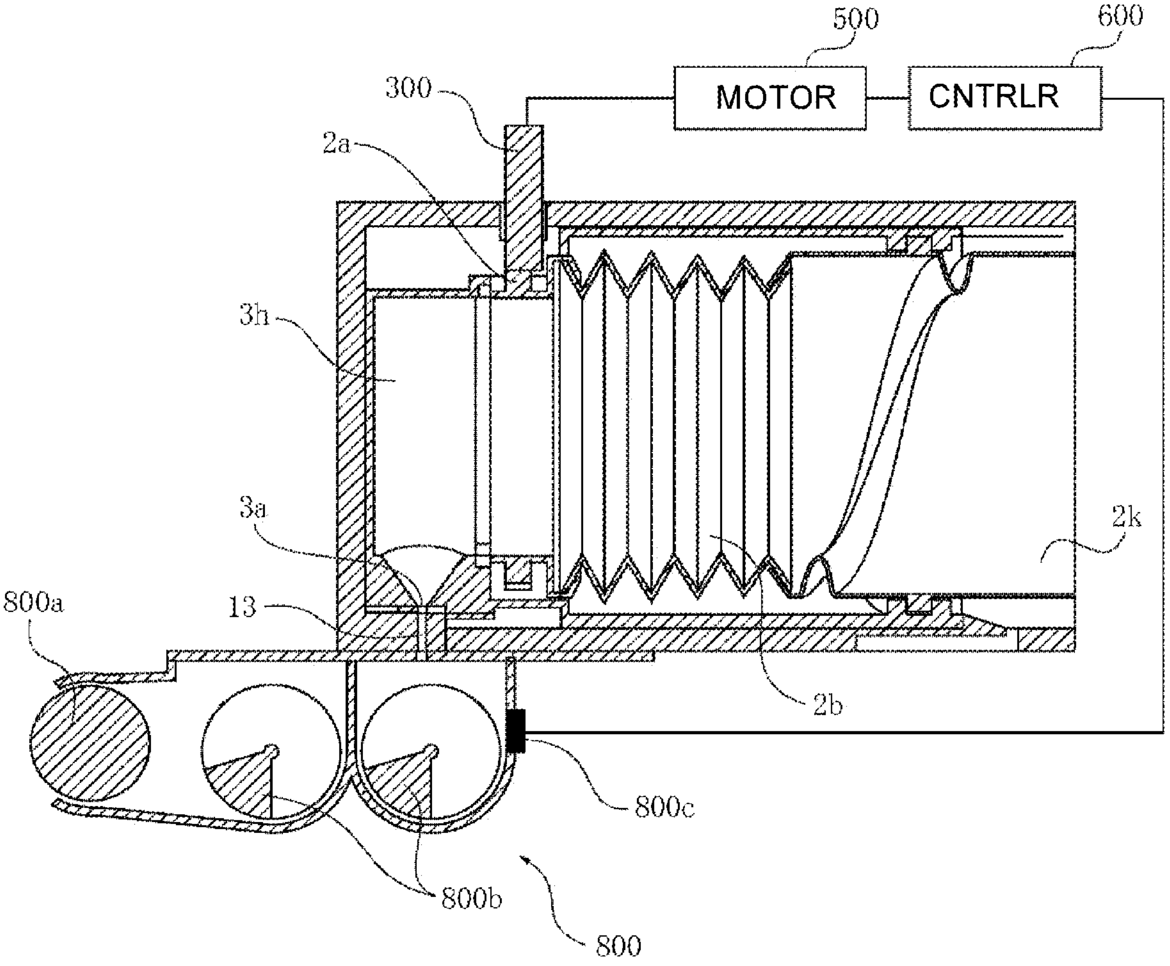

FIG. 5 is an enlarged sectional view of a modified example of the developer replenishing apparatus.

Figure 6:
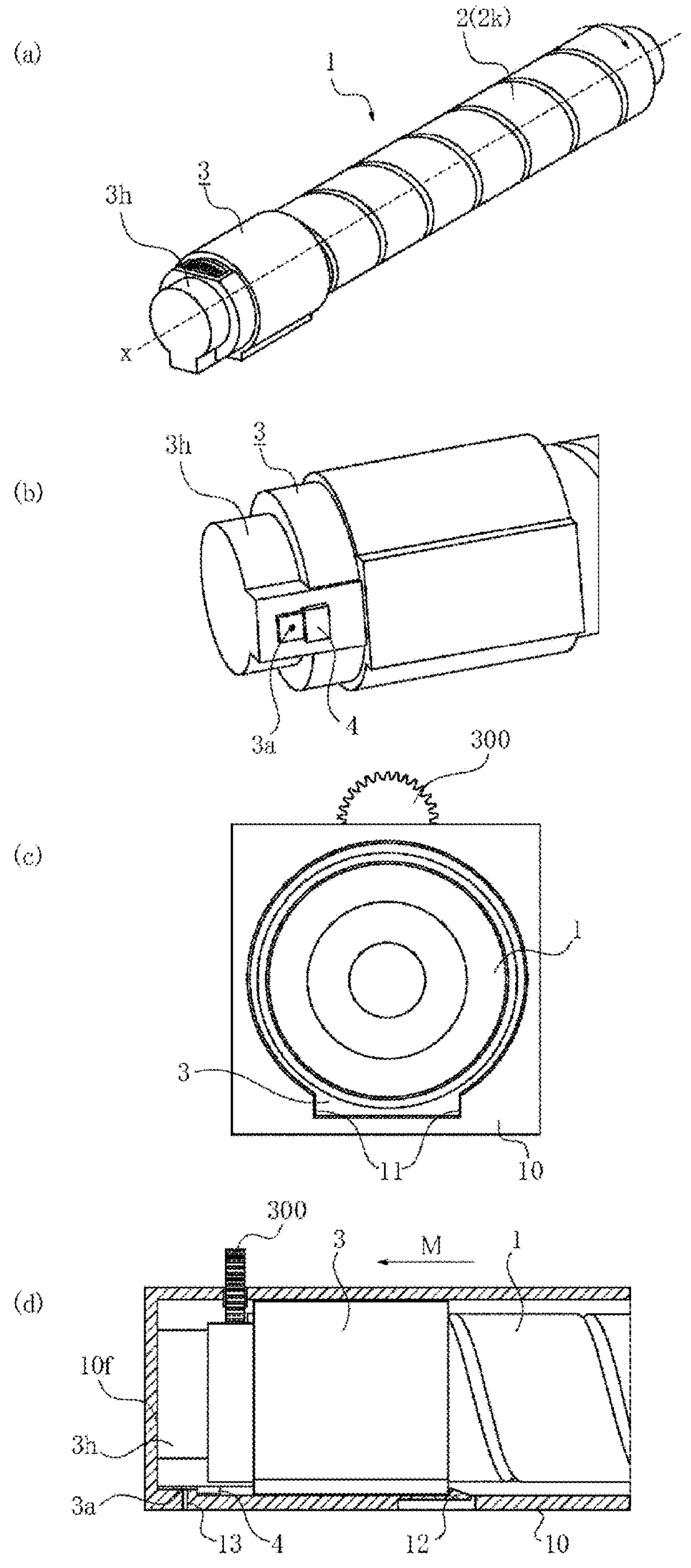

Part (a) of FIG. 6 is a perspective view illustrating a developer supply container according to Embodiment 1, (b) is a perspective view illustrating a state around a discharge opening, (c) and (d) are a front view and a sectional view illustrating a state in which the developer supply container is mounted to the mounting portion of the developer replenishing apparatus.

Figure 7:
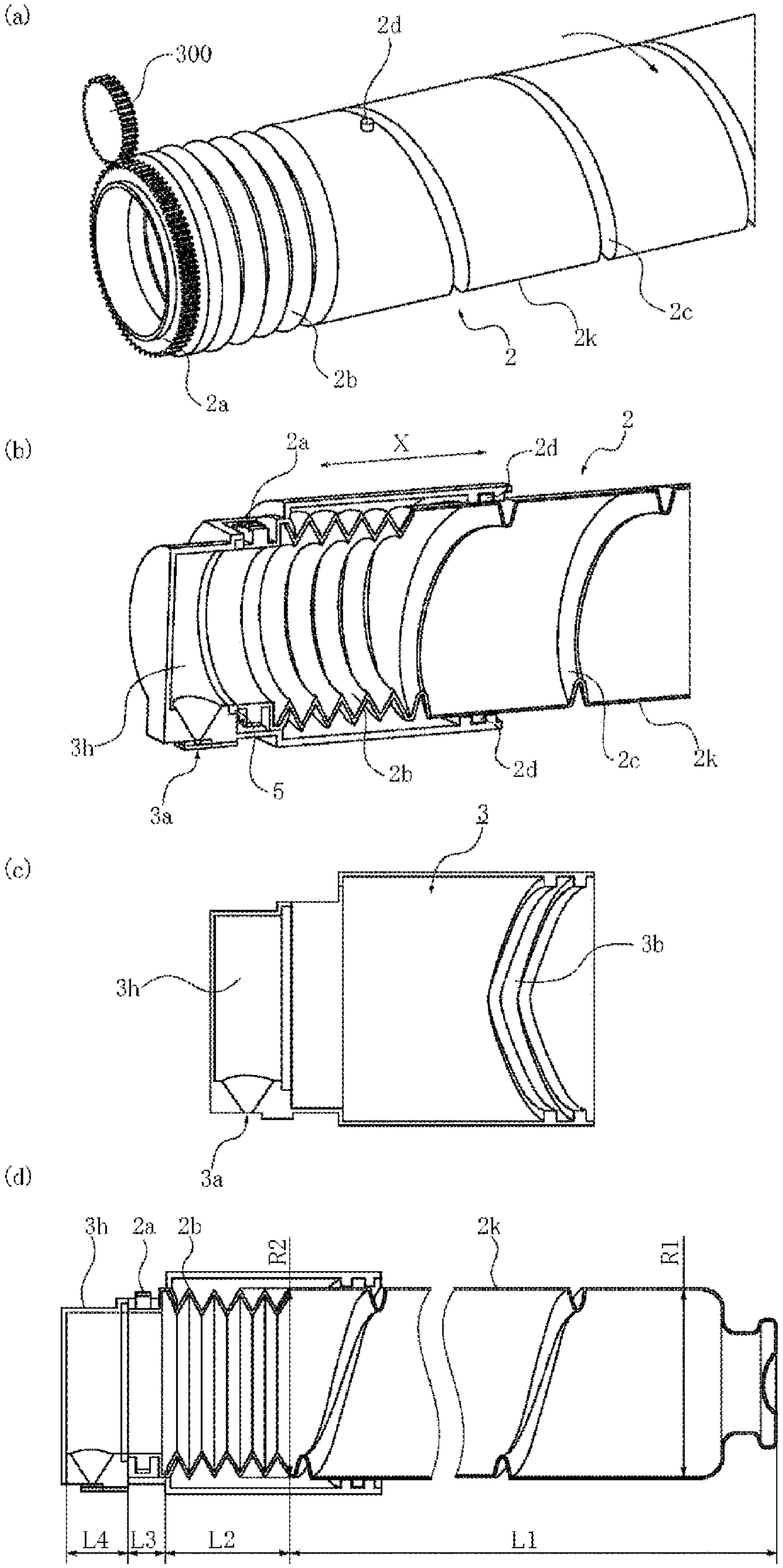

Part (a) of FIG. 7 is a perspective view of a developer accommodating portion, (b) is a perspective sectional view of the developer supply container, (c) the sectional view of an inner surface of a flange portion, and (d) is a sectional view of the developer supply container.

Figure 8:
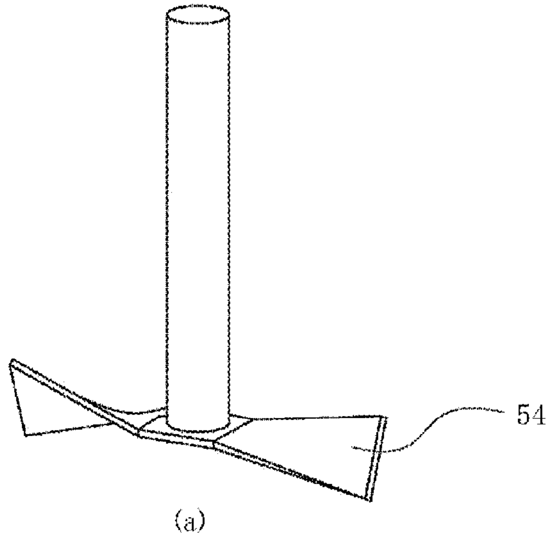
Figure 8:
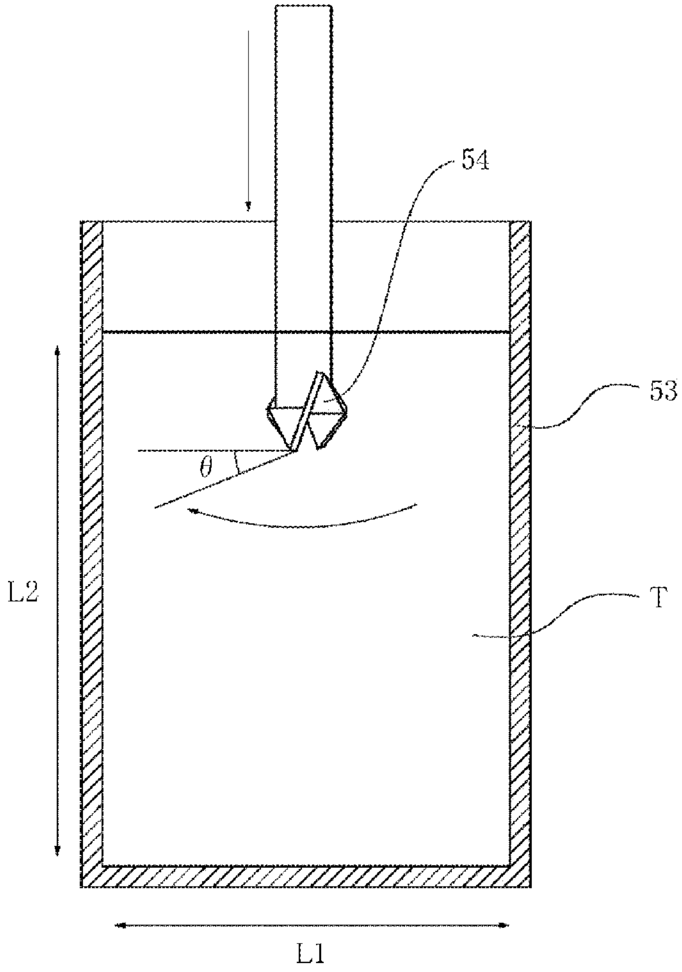

Part (a) of FIG. 8 is a perspective view of a blade used with a device for measuring fluidity energy, and (b) is a schematic view of the device.

Figure 9:
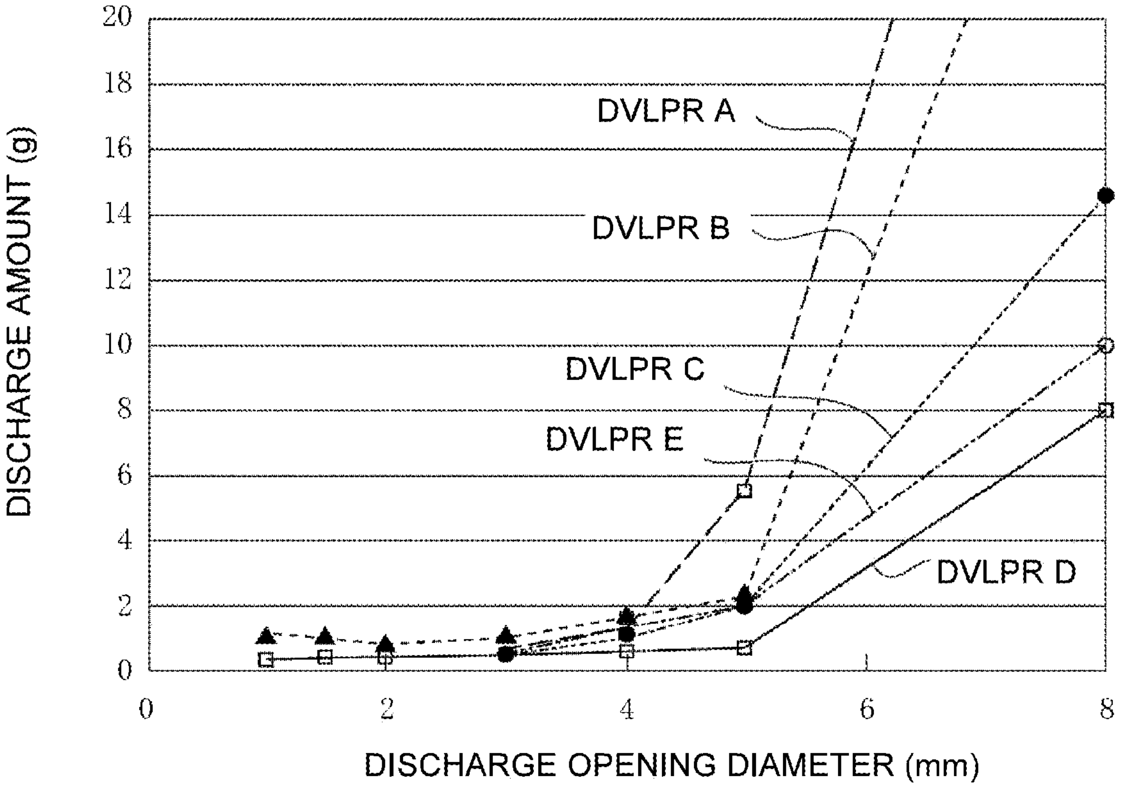

FIG. 9 is a graph showing a relation between a diameter of a discharge opening and a discharge amount.

Figure 10:
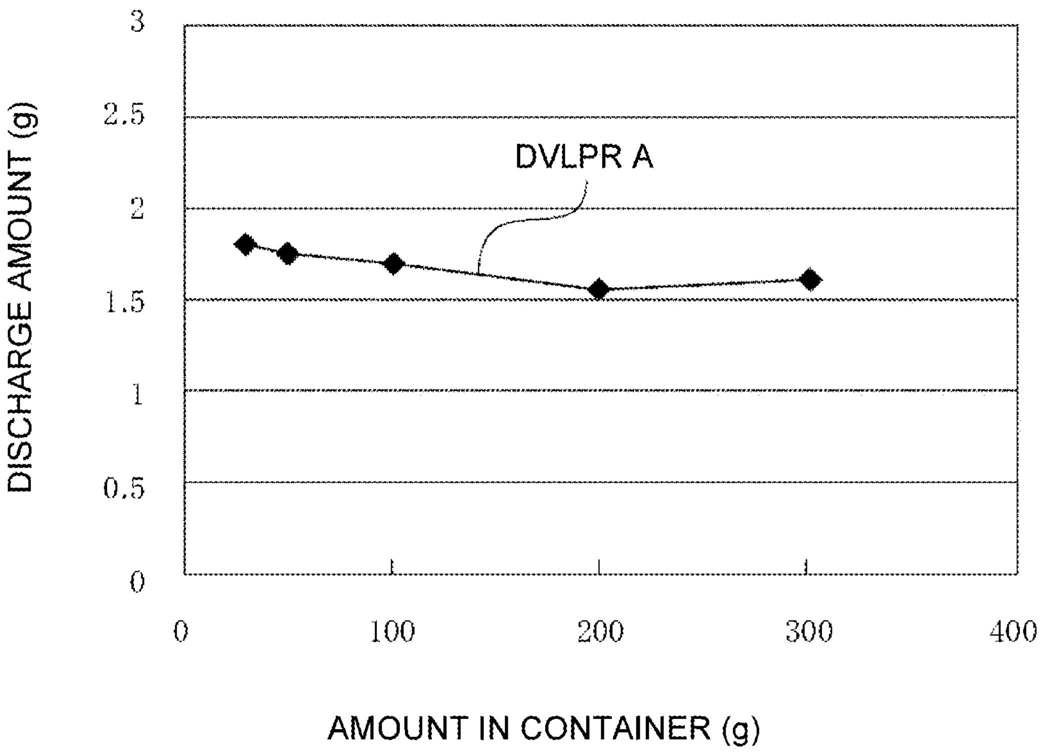

FIG. 10 is a graph showing a relation between an amount in the container and a discharge amount.

Figure 11:
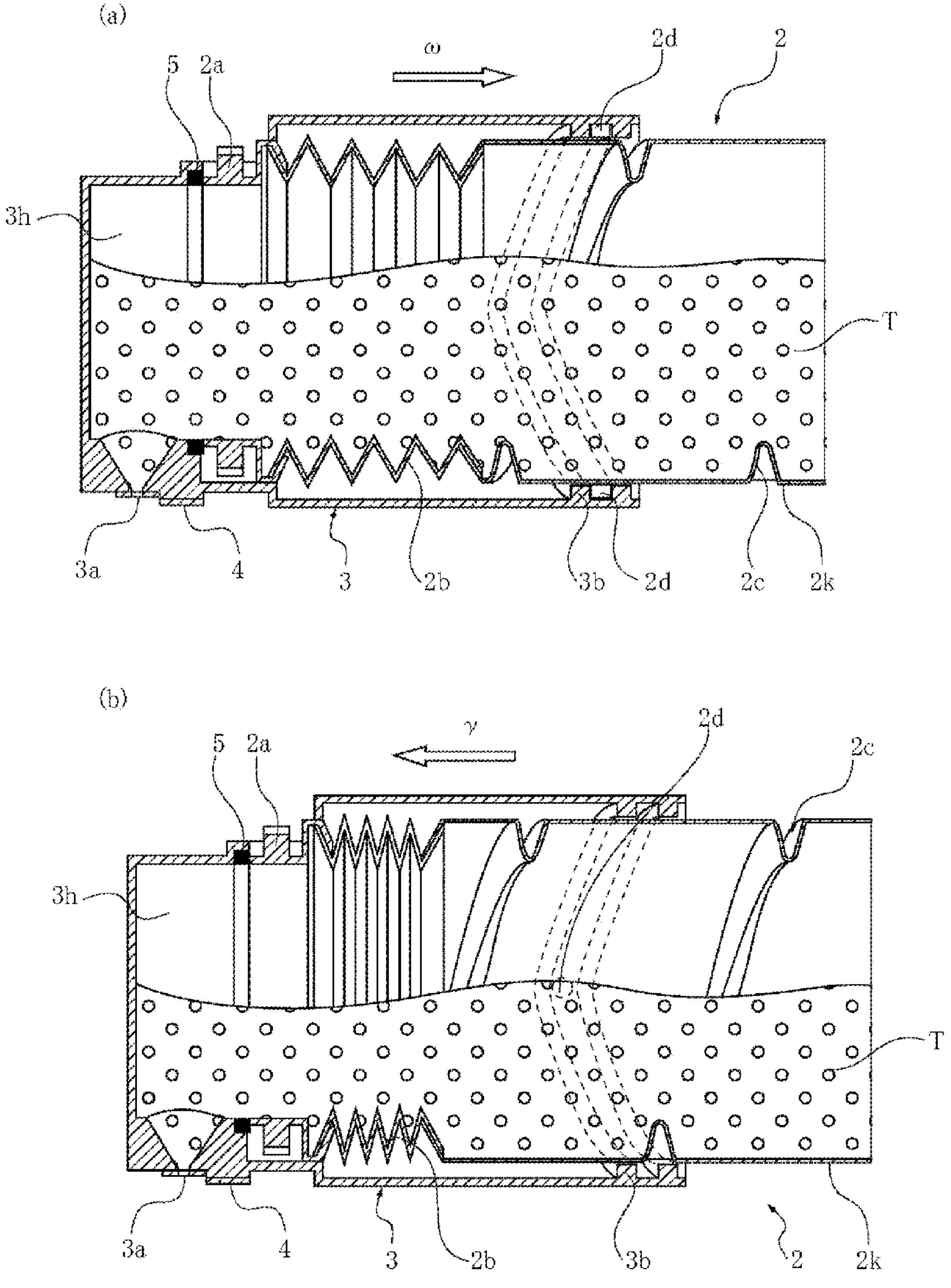

Part (a) and part (b) of FIG. 11 are sectional views showing of suction and discharging operations of a pump portion of the developer supply container.

Figure 12:
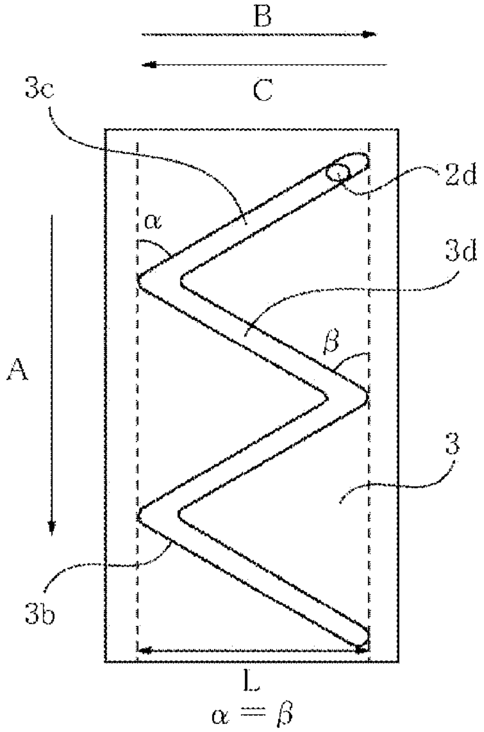

FIG. 12 is an extended elevation illustrating a cam groove configuration of the developer supply container.

Figure 13:
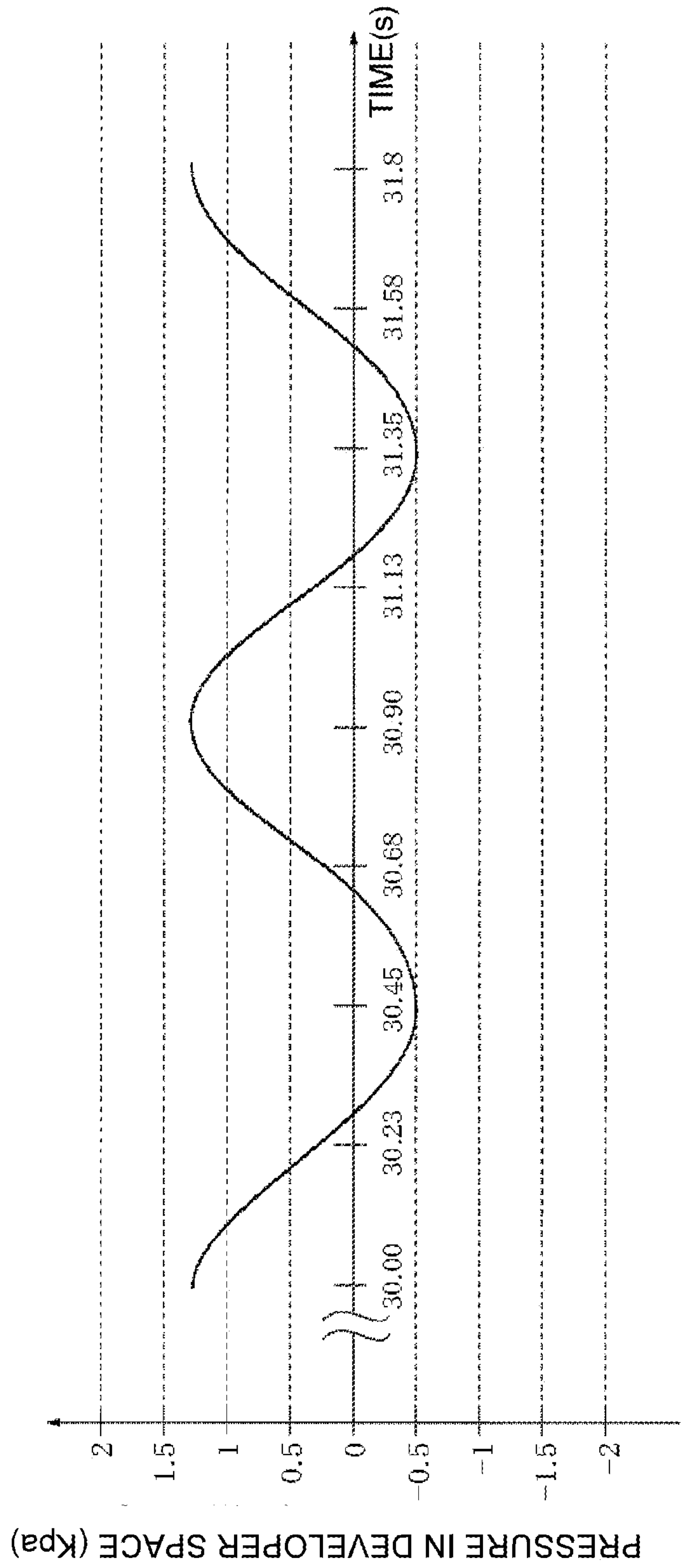

FIG. 13 illustrates a change of an internal pressure of the developer supply container.

Figure 14:
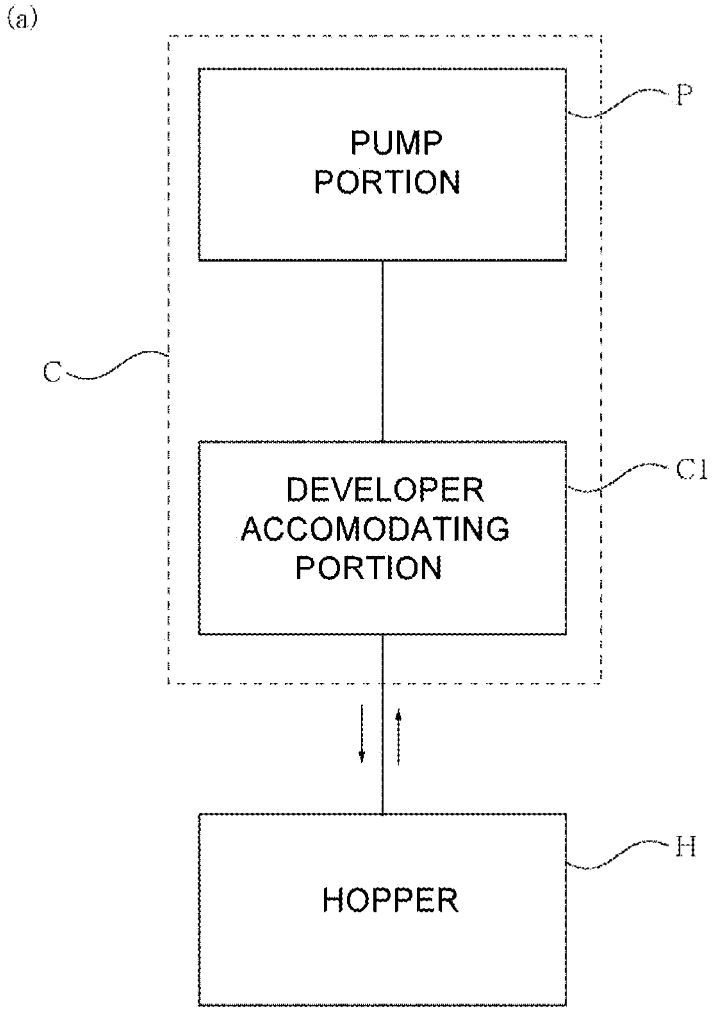
Figure 14:
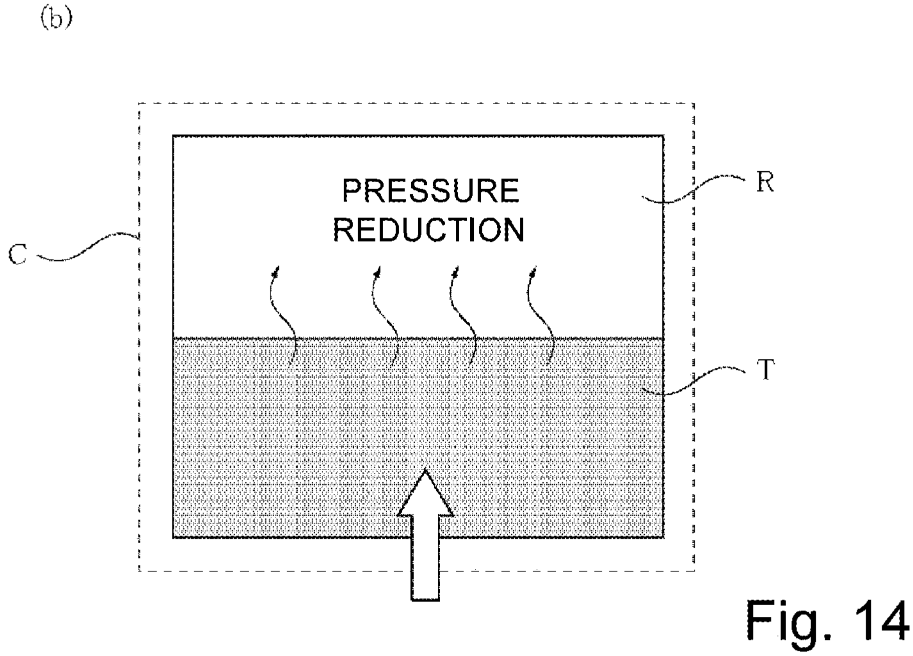

Part (a) of FIG. 14 is a block diagram illustrating a developer supplying system (Embodiment 1) used in verification experiments, and (b) is a schematic view showing the phenomenon-inside the developer supply container.

Figure 15:
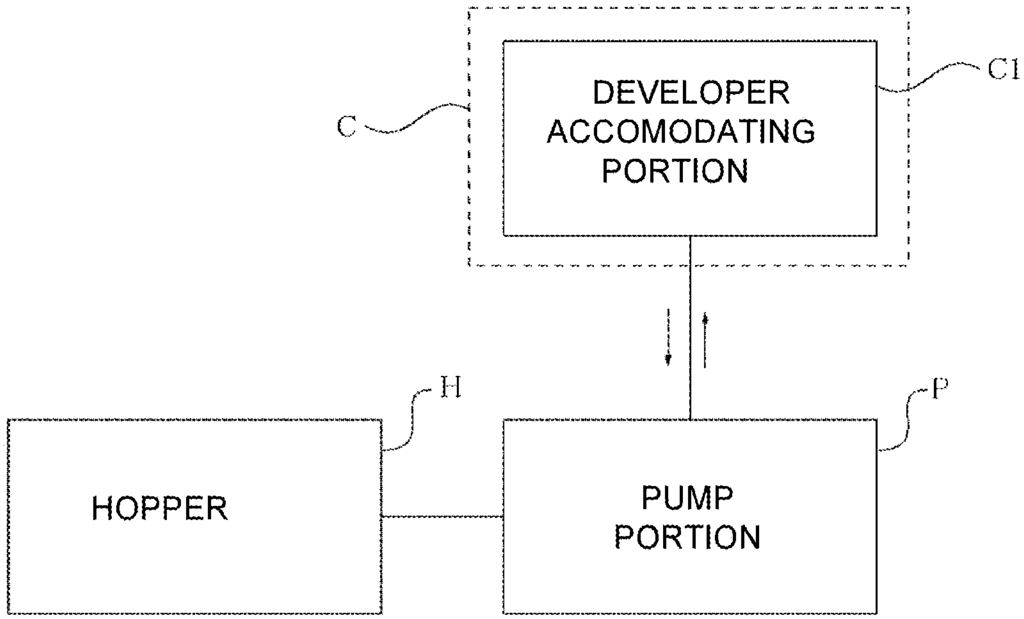
Figure 15:
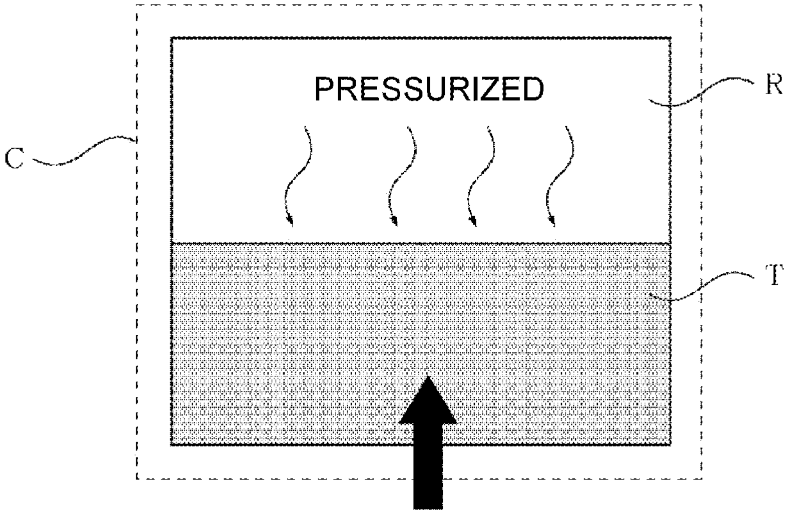

Part (a) of FIG. 15 is a block diagram illustrating a developer supplying system (comparison example) used in the verification experiments, and part (b) illustrates a phenomenon in the developer supply container.

Figure 16:
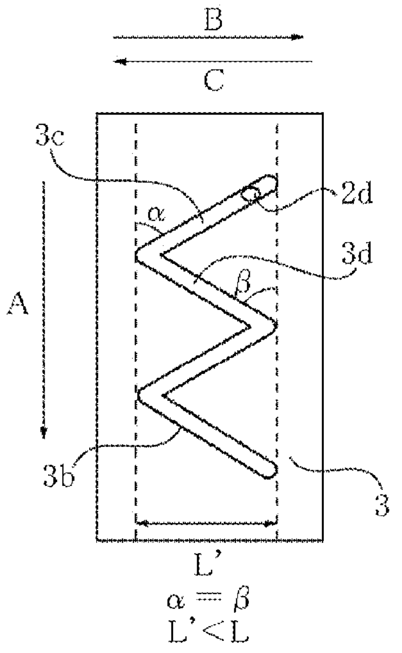

FIG. 16 is an extended elevation illustrating a cam groove configuration of the developer supply container.

Figure 17:
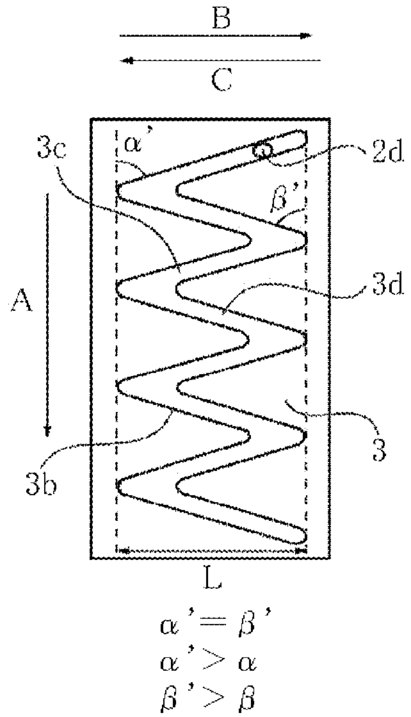

FIG. 17 is an extended elevation of an example of the cam groove configuration of the developer supply container.

Figure 18:
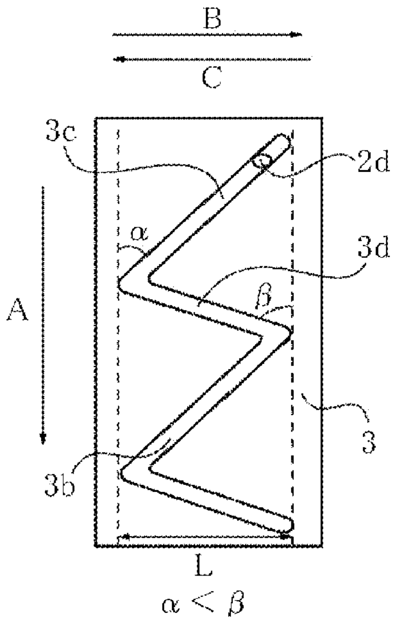

FIG. 18 is an extended elevation of an example of the cam groove configuration of the developer supply container.

Figure 19:
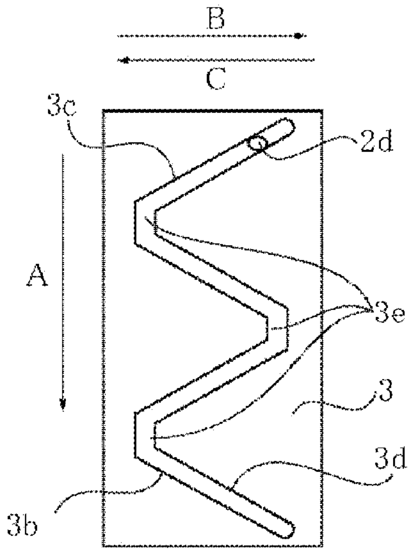

FIG. 19 is an extended elevation of an example of the cam groove configuration of the developer supply container.

Figure 20:
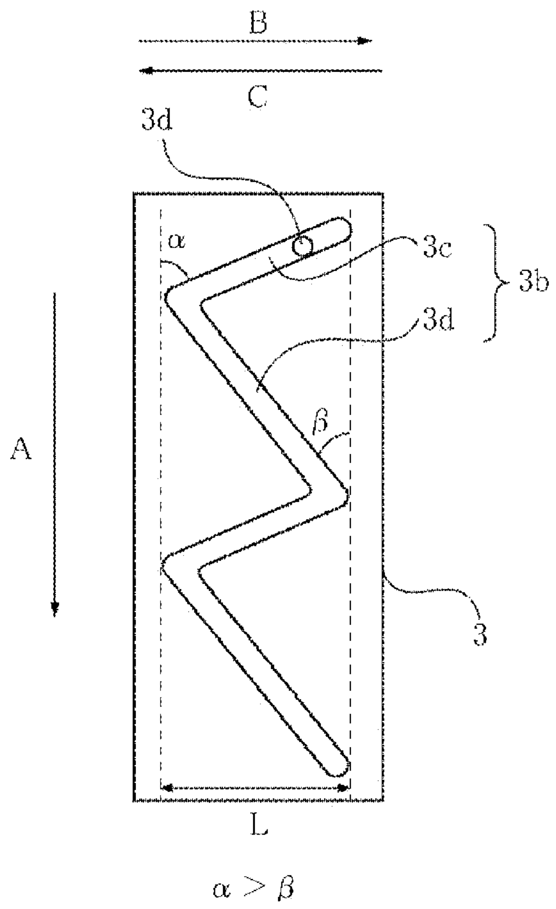

FIG. 20 is an extended elevation of an example of the cam groove configuration of the developer supply container.

Figure 21:
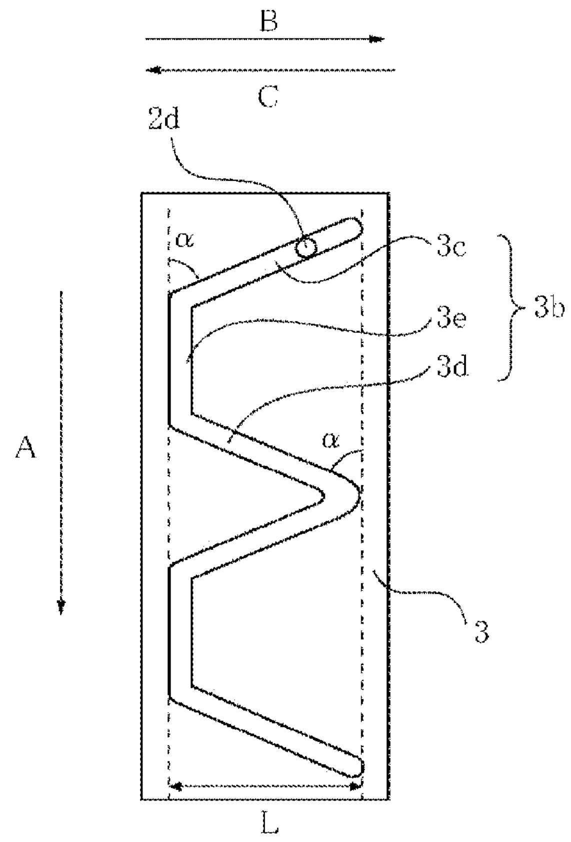

FIG. 21 is an extended elevation of an example of the cam groove configuration of the developer supply container.

Figure 22:
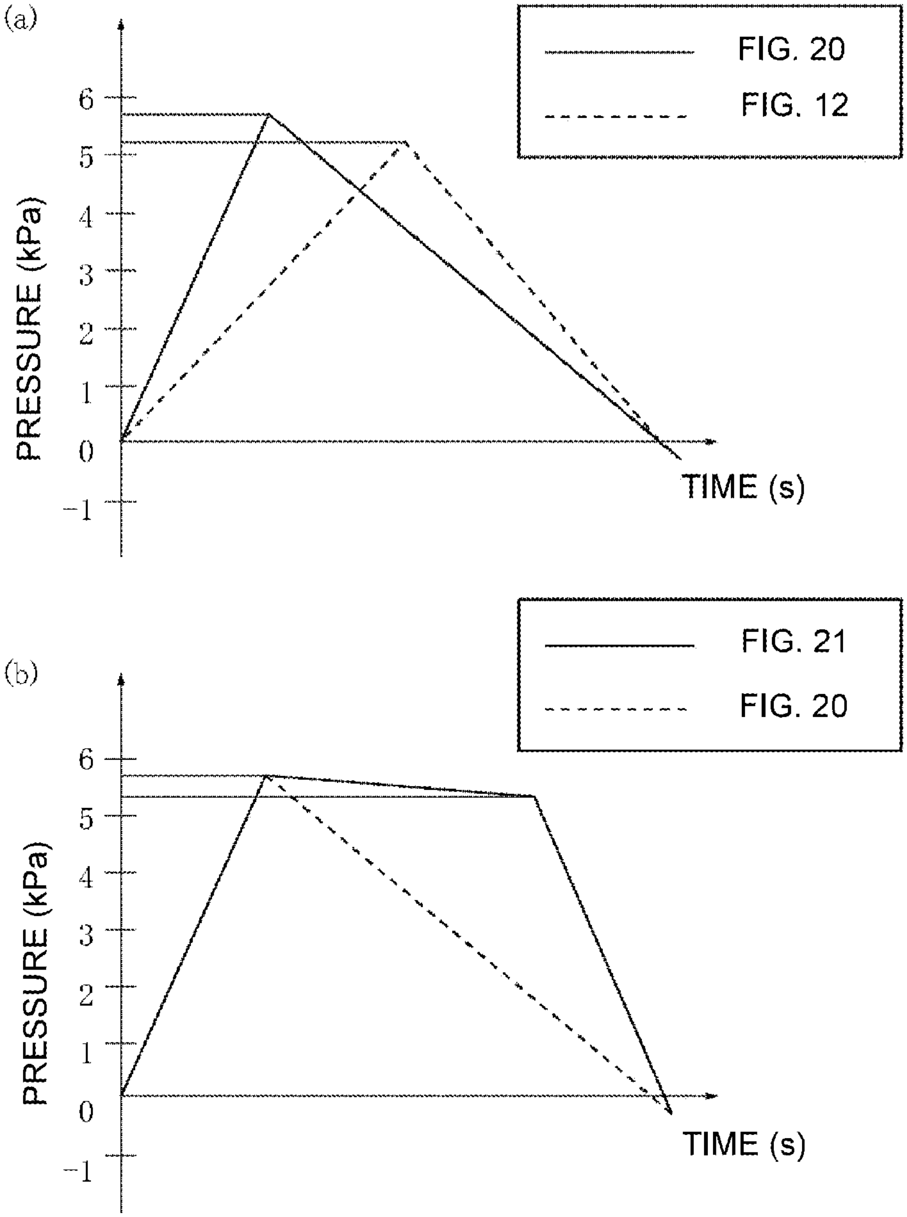

FIG. 22 is a graph showing a change of an internal pressure of the developer supply container.

Figure 23:
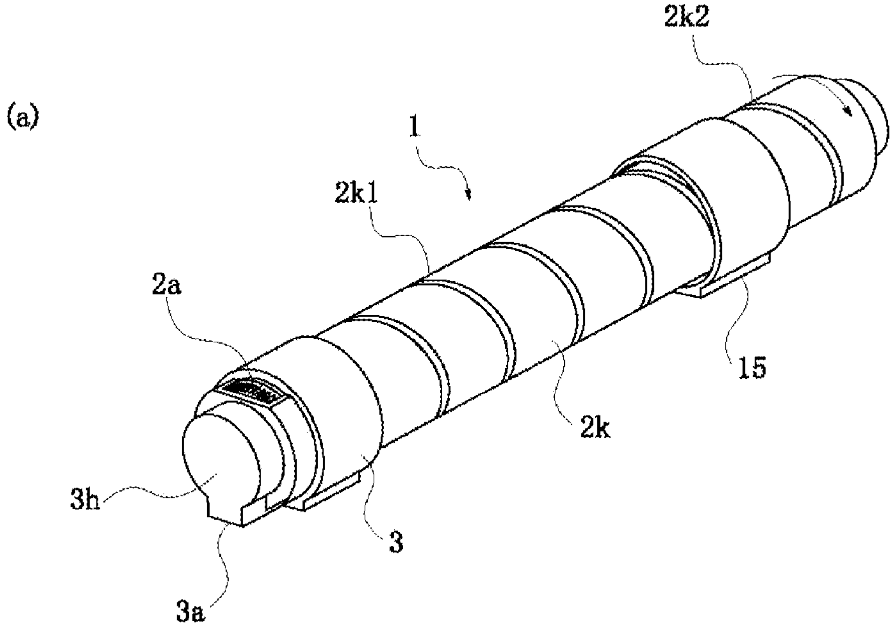
Figure 23:
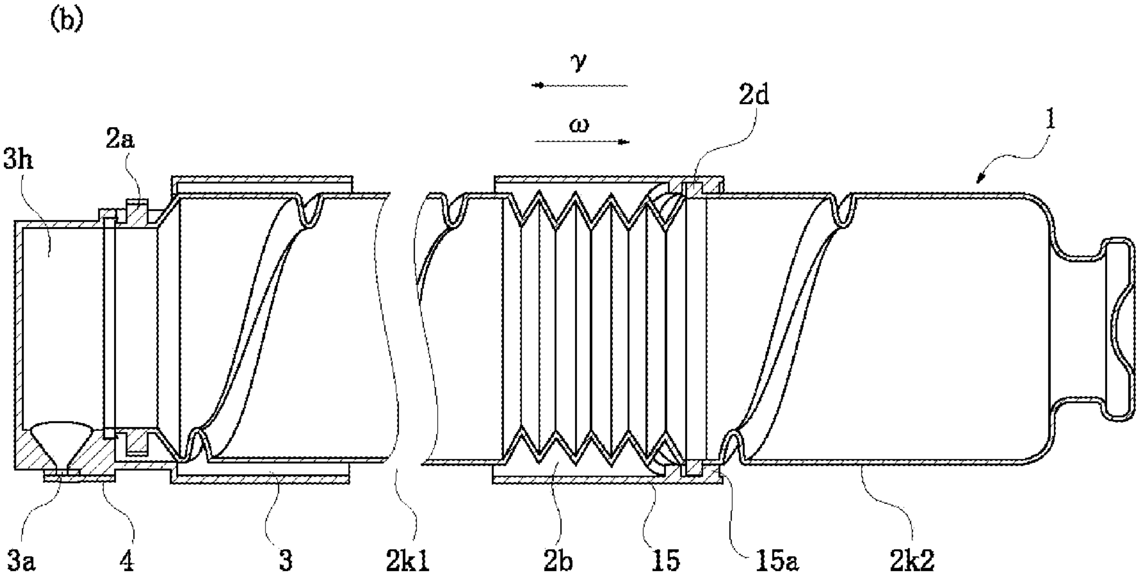

Part (a) of FIG. 23 is a perspective view showing a structure of a developer supply container according to Embodiment 2, and (b) is a sectional view showing a structure of the developer supply container.

Figure 24:
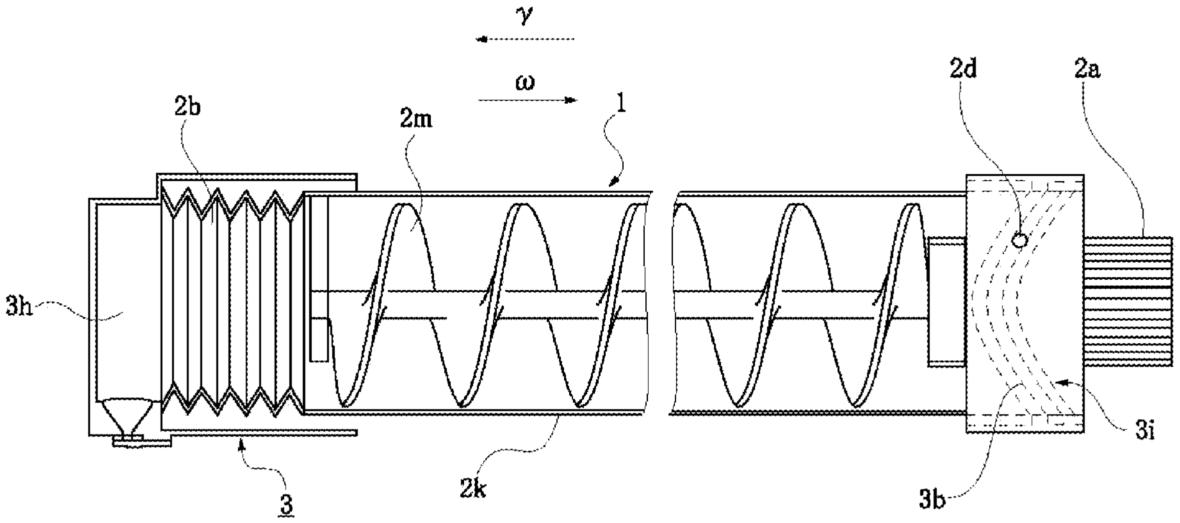

FIG. 24 is a sectional view showing a structure of a developer supply container according to Embodiment 3.

Figure 25:
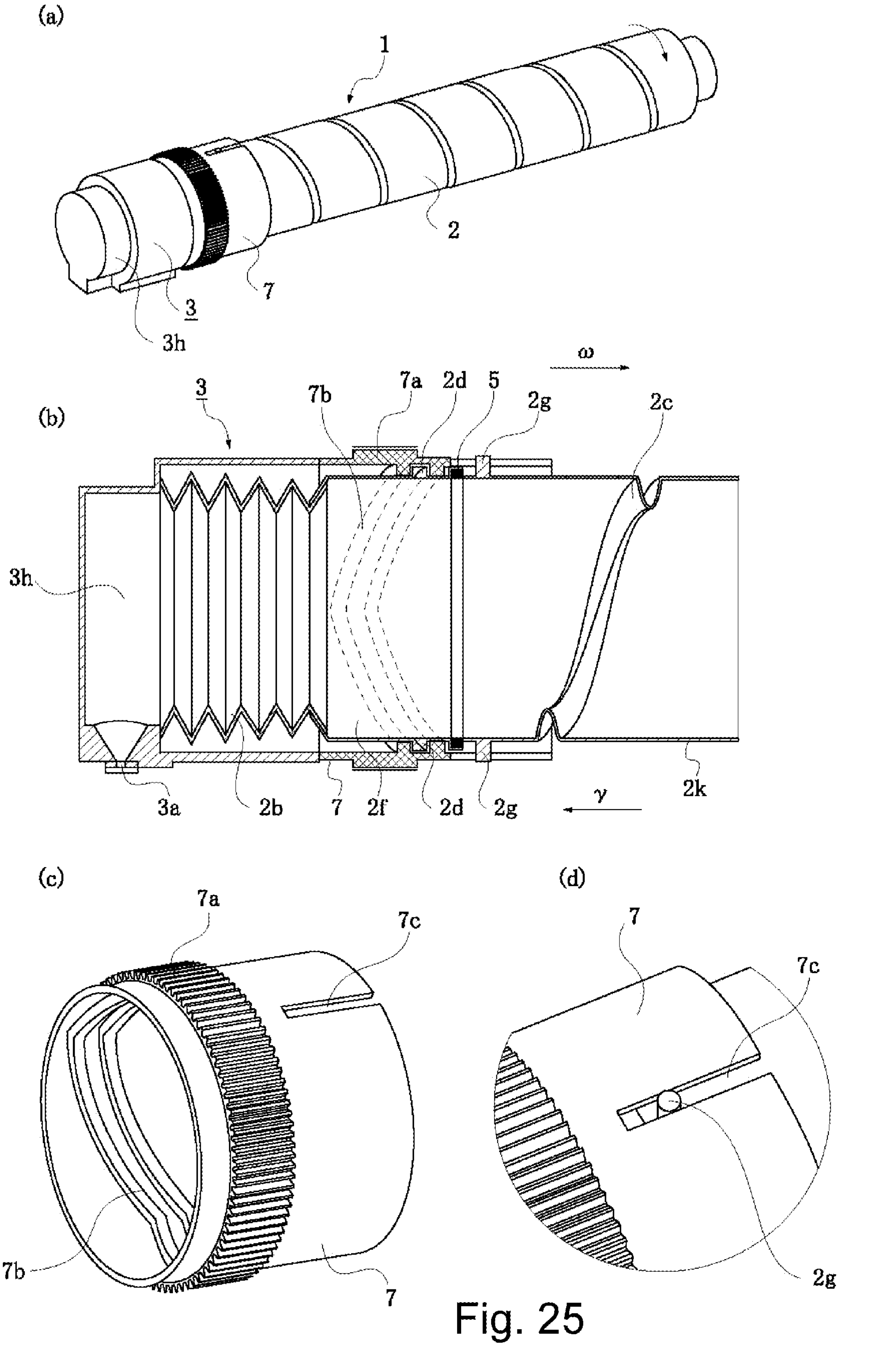

Part (a) of FIG. 25 is a perspective view illustrating a structure of a developer supply container according to Embodiment 4, (b) is a sectional view of the developer supply container, (c) is a perspective view illustrating a cam gear, and (d) is an enlarged view of a rotational engaging portion of the cam gear.

Figure 26:
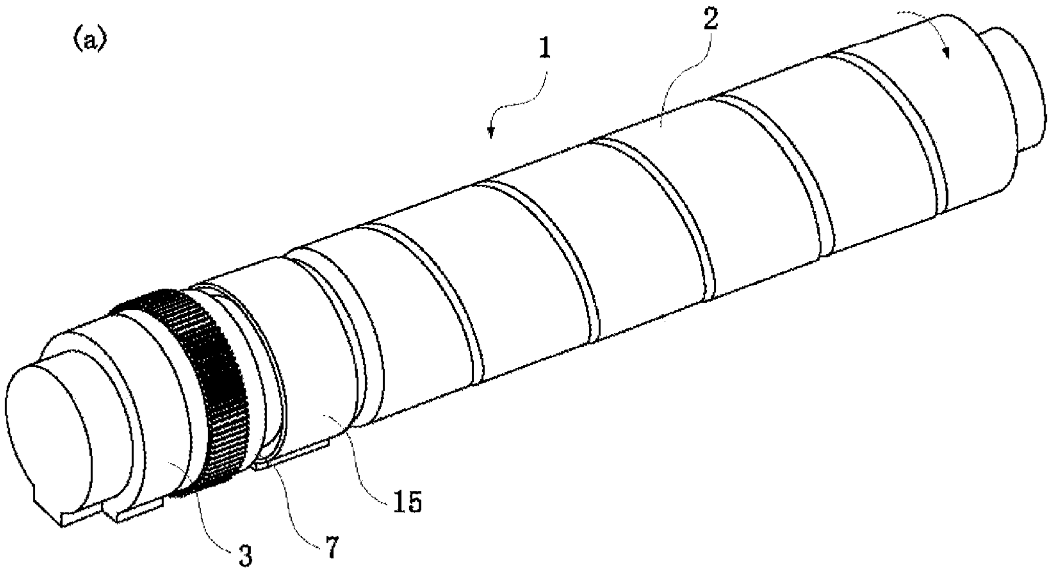
Figure 26:
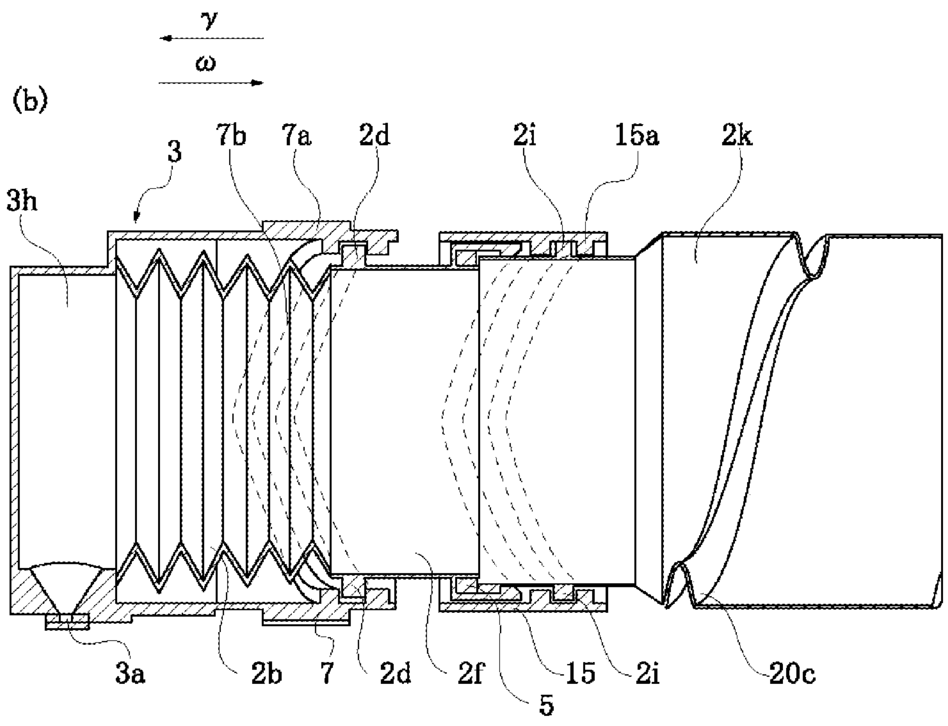

Part (a) of FIG. 26 is a perspective view showing a structure of a developer supply container according to Embodiment 5, and (b) is a sectional view showing a structure of the developer supply container.

Figure 27:
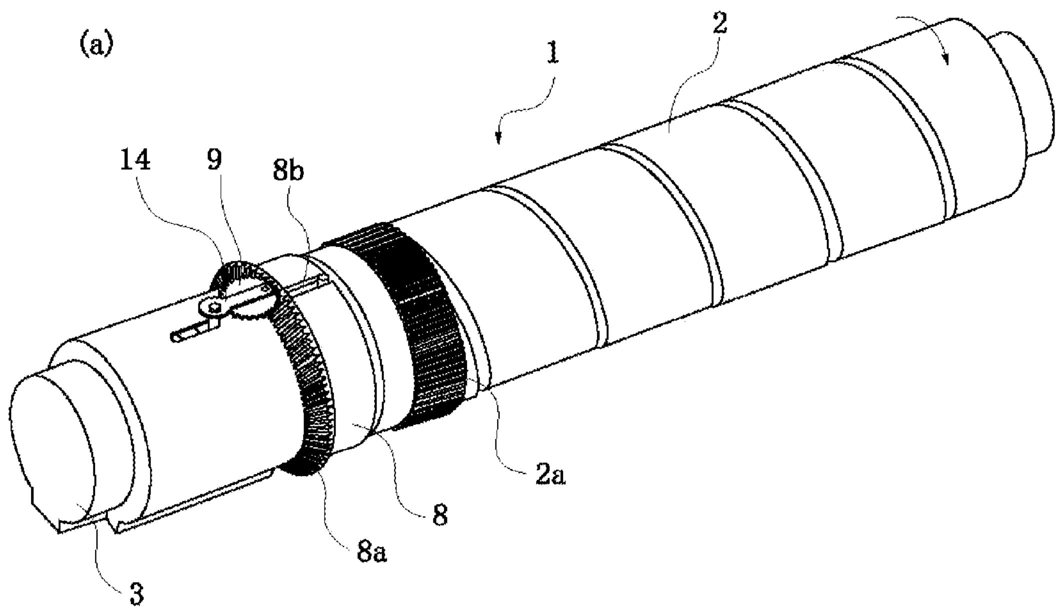
Figure 27:
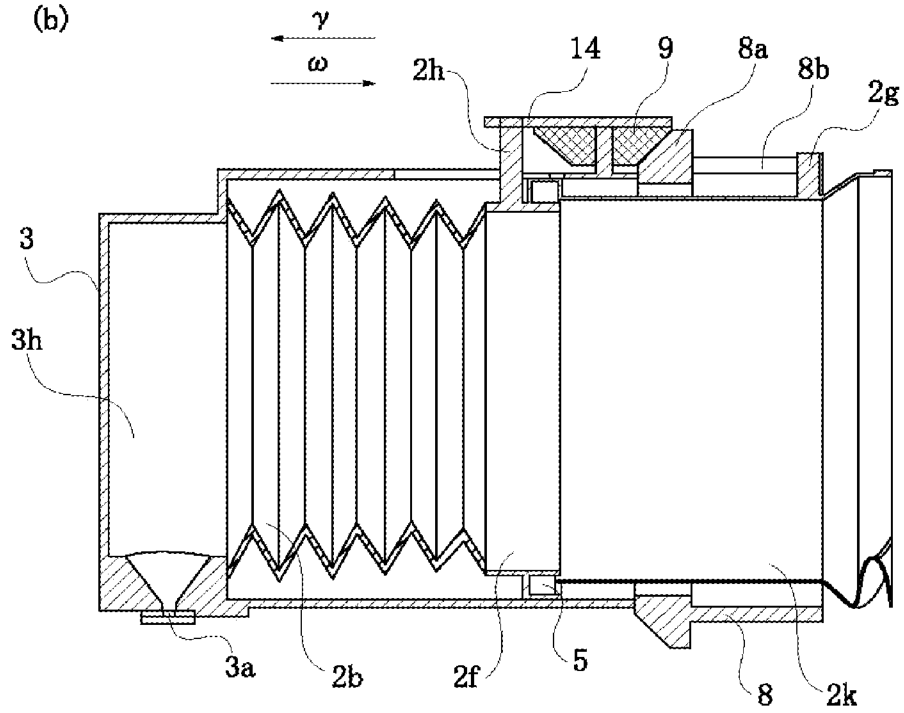

Part (a) of FIG. 27 is a perspective view showing a structure of a developer supply container according to Embodiment 6, and (b) is a sectional view showing a structure of the developer supply container.

Figure 28:
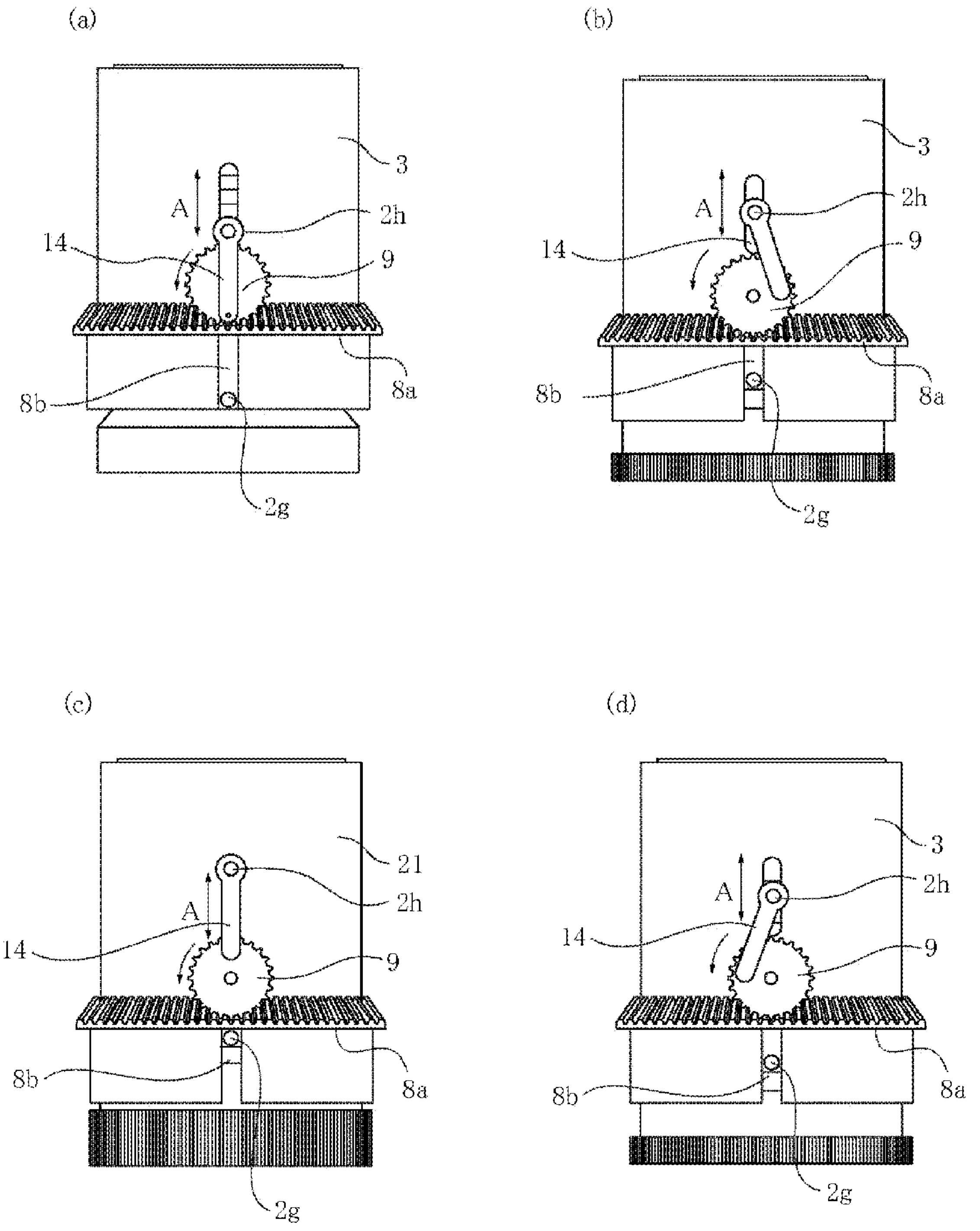

Parts (a)-(d) of FIG. 28 illustrate an operation of a drive converting mechanism.

Figure 29:
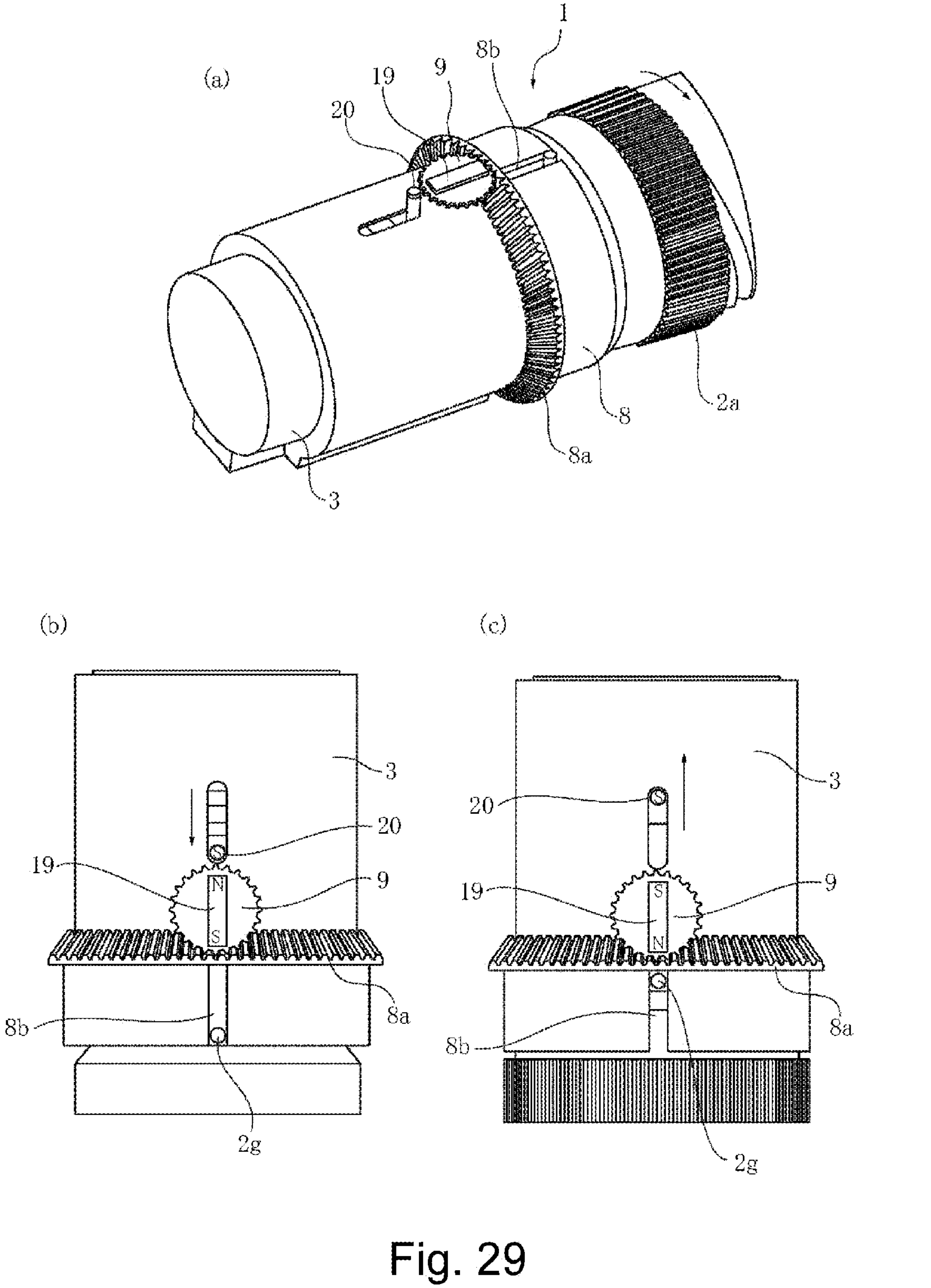

Part (a) of FIG. 29 illustrates a perspective view illustrating a structure of a according to Embodiment 7, (b) and (c) illustrate an operation of a drive converting mechanism.

Figure 30:
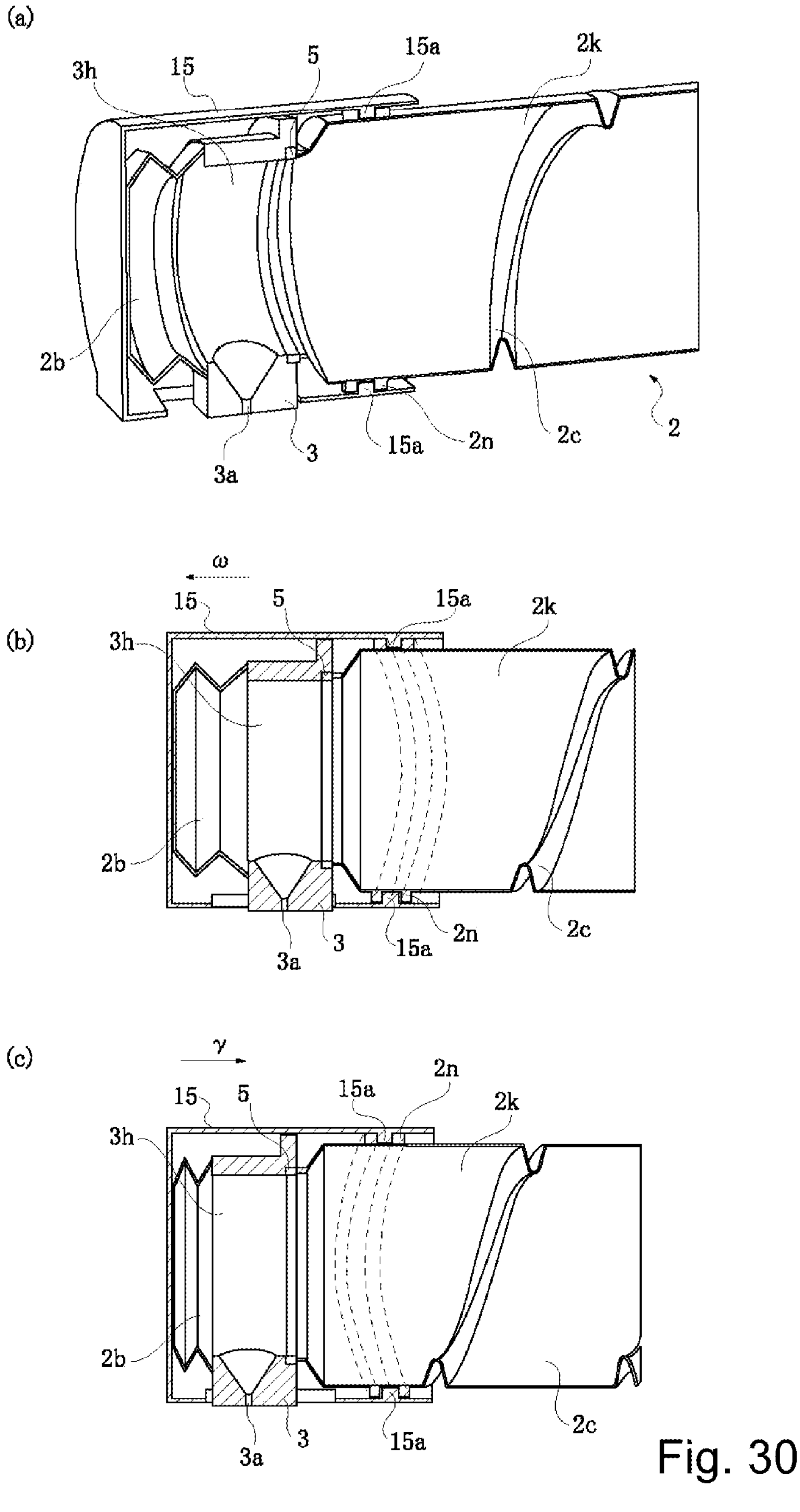

Part (a) of FIG. 30 is a sectional perspective view illustrating a structure of a developer supply container according to Embodiment 8, (b) and (c) are sectional views illustrating suction and discharging operations of a pump portion.

Figure 31:
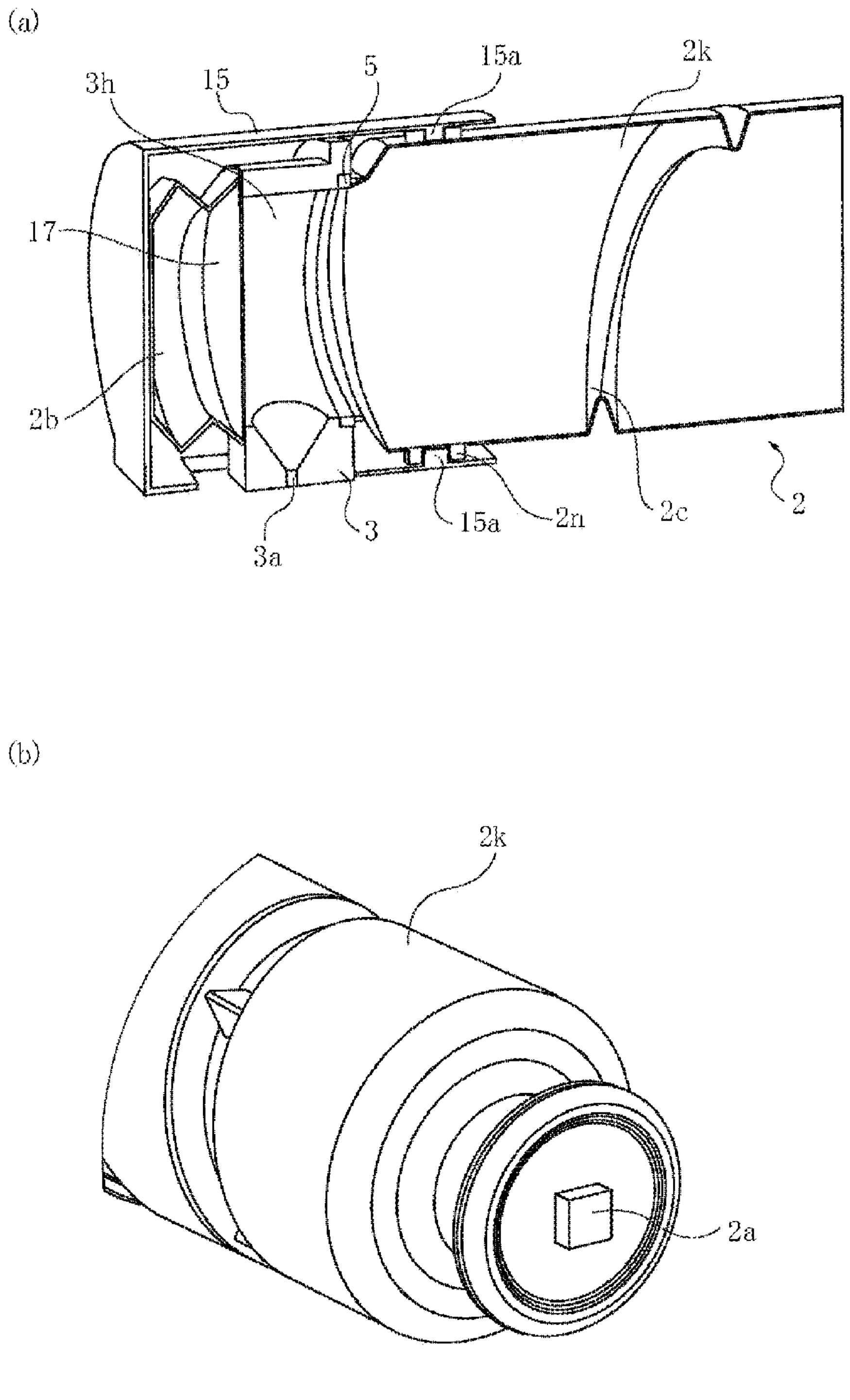

Part (a) of FIG. 31 is a perspective view illustrating a structure of a developer supply container according to Embodiment 8, and (b) illustrates a coupling portion of the developer supply container.

Figure 32:
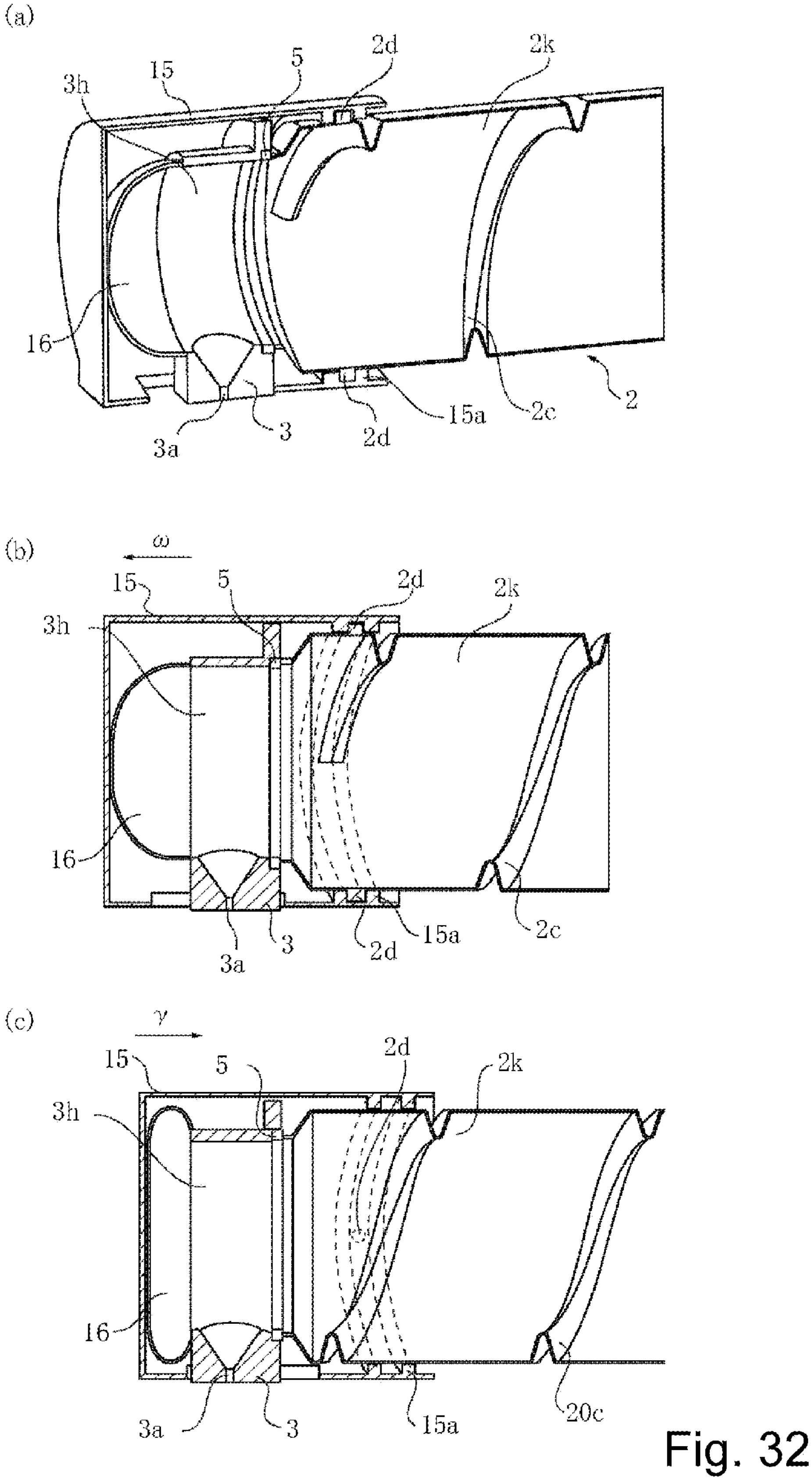

Part (a) of FIG. 32 is a perspective view illustrating a developer supply container according to Embodiment 9, and (b) and (c) are sectional views illustrating suction and discharging operations of a pump portion.

Figure 33:
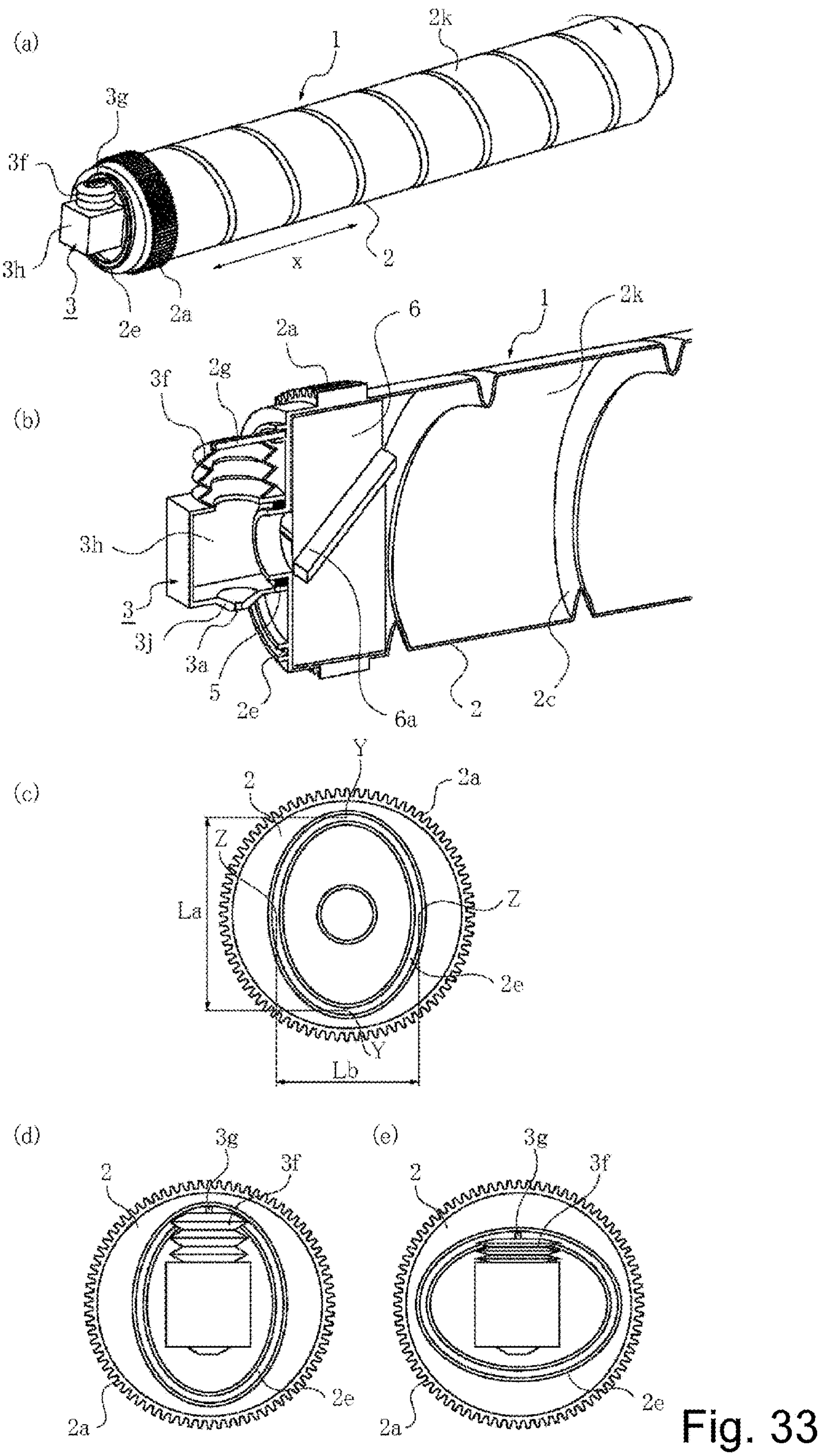

Part (a) of FIG. 33 is a perspective view illustrating a structure of a developer supply container according to Embodiment 10, (b) is a sectional perspective view illustrating a structure of the developer supply container, (c) illustrates a structure of an end of a cylindrical portion, and (d) and (e) illustrate suction and discharging operations of a pump portion.

Figure 34:
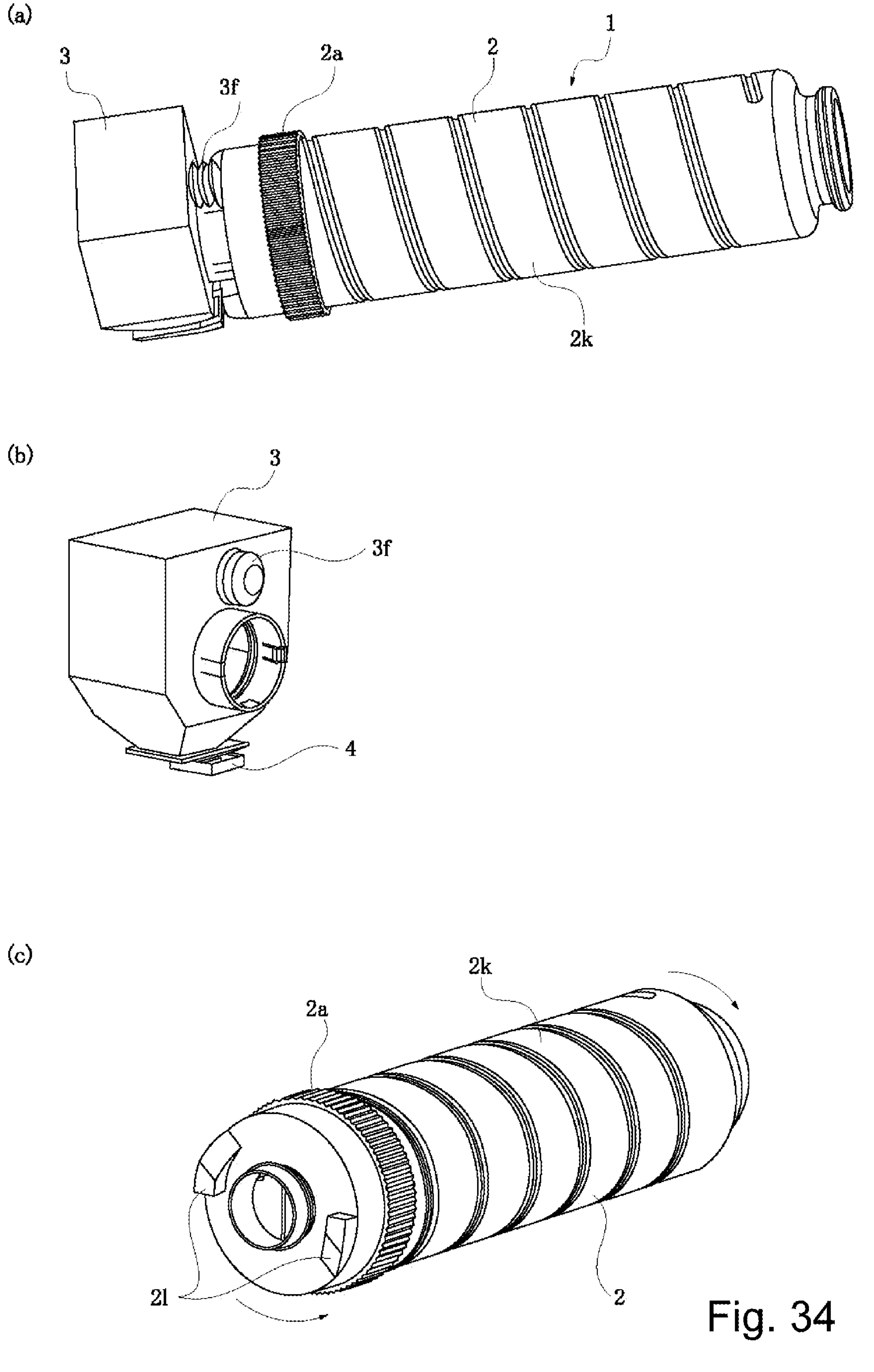

Part (a) of FIG. 34 is a perspective view illustrating a structure of a developer supply container according to Embodiment 11, (b) is a perspective view illustrating a structure of a flange portion, and (c) is a perspective view illustrating a structure of the cylindrical portion.

Figure 35:
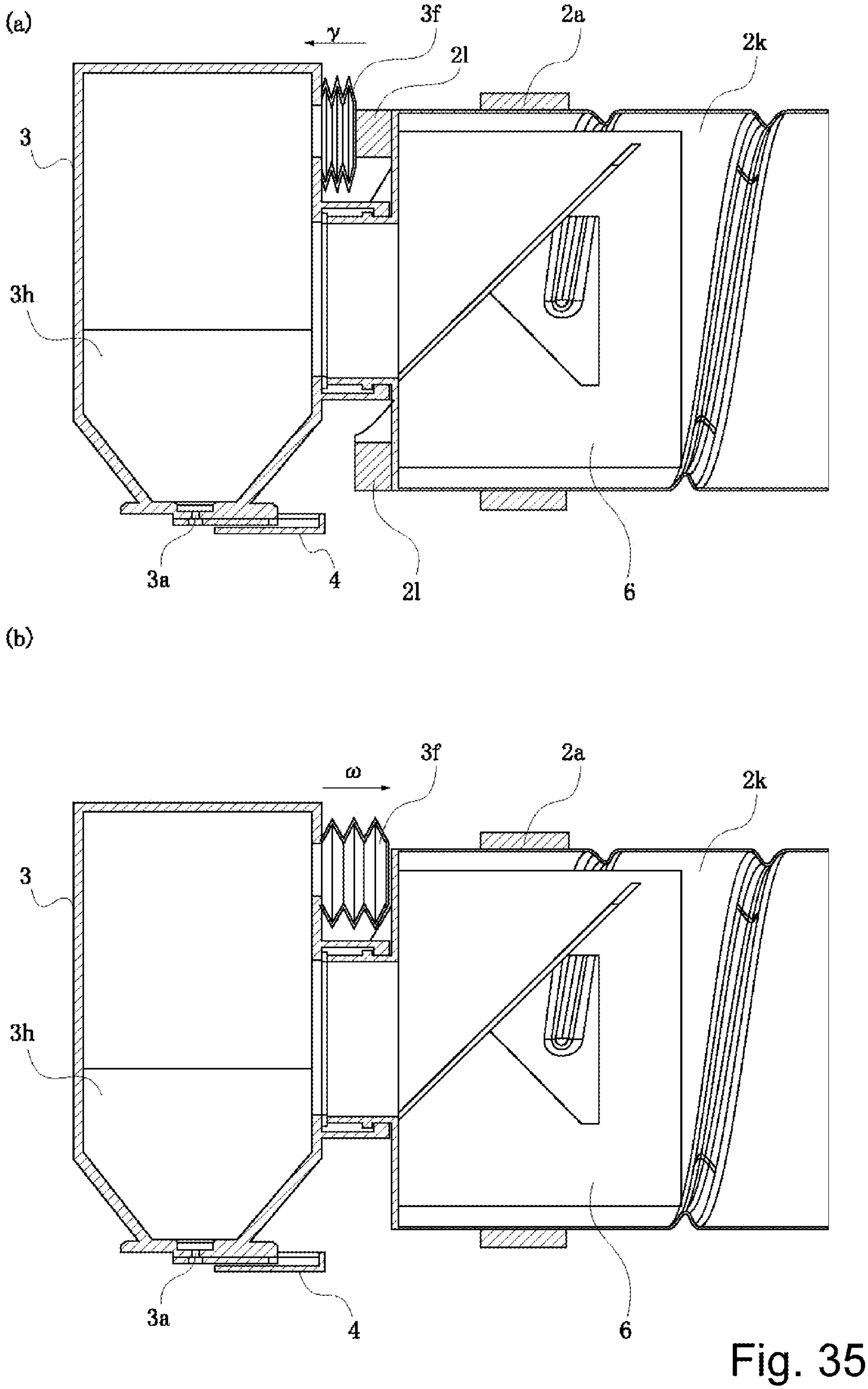

Parts (a) and (b) of FIG. 35 are sectional views illustrating suction and discharging operations of a pump portion.

Figure 36:
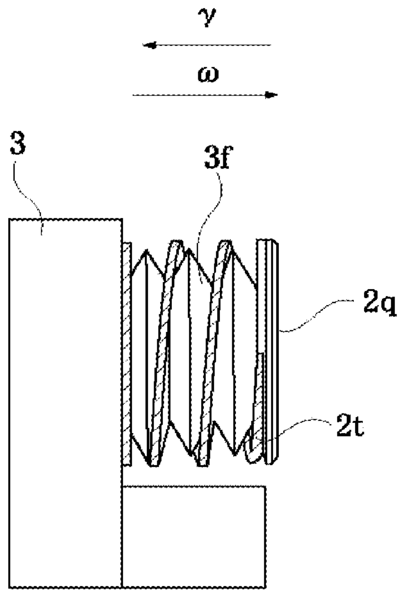

FIG. 36 illustrate a structure of the pump portion.

Figure 37:
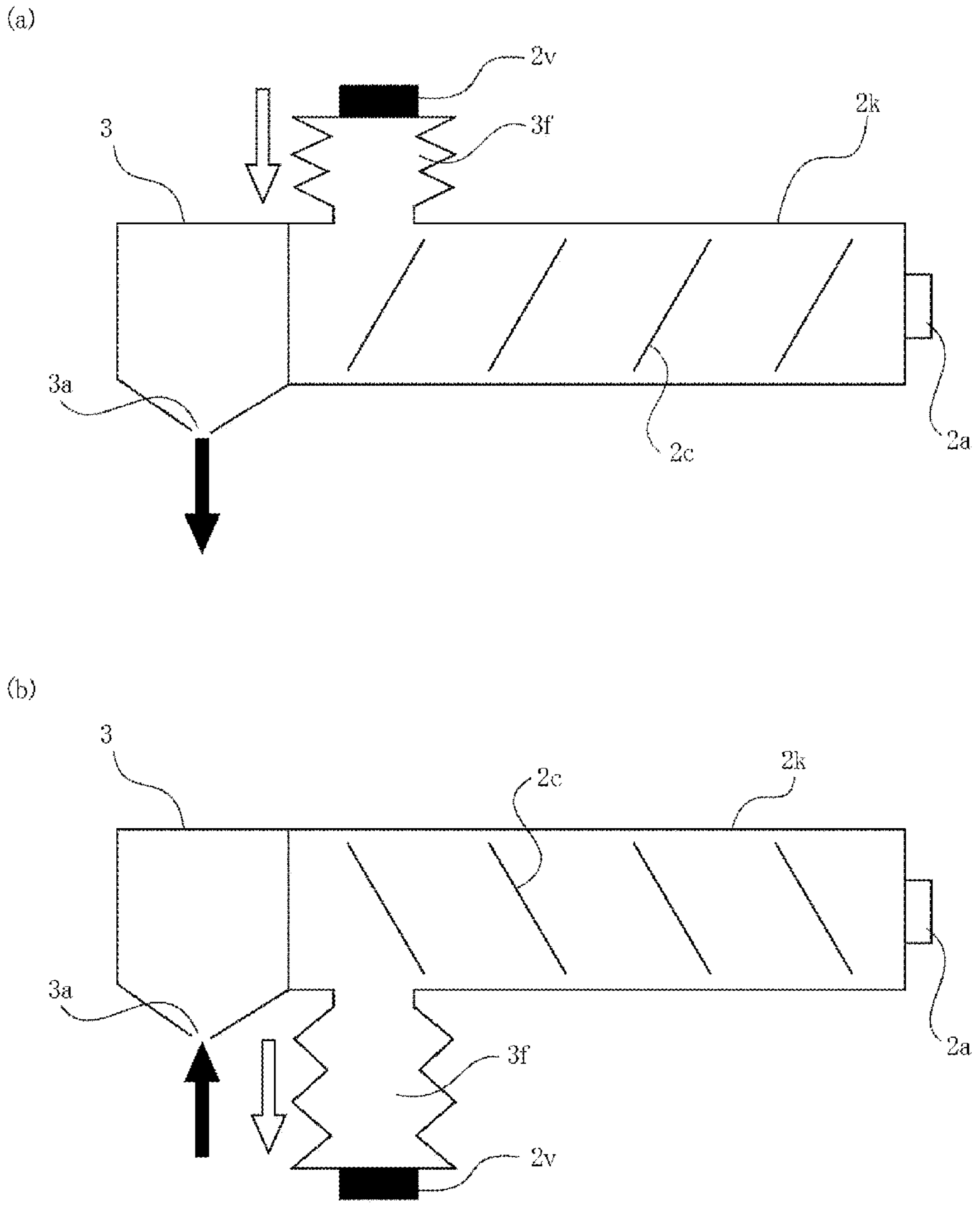

Parts (a) and (b) of FIG. 37 are sectional views schematically illustrating a structure of a developer supply container according to Embodiment 12.

Figure 38:
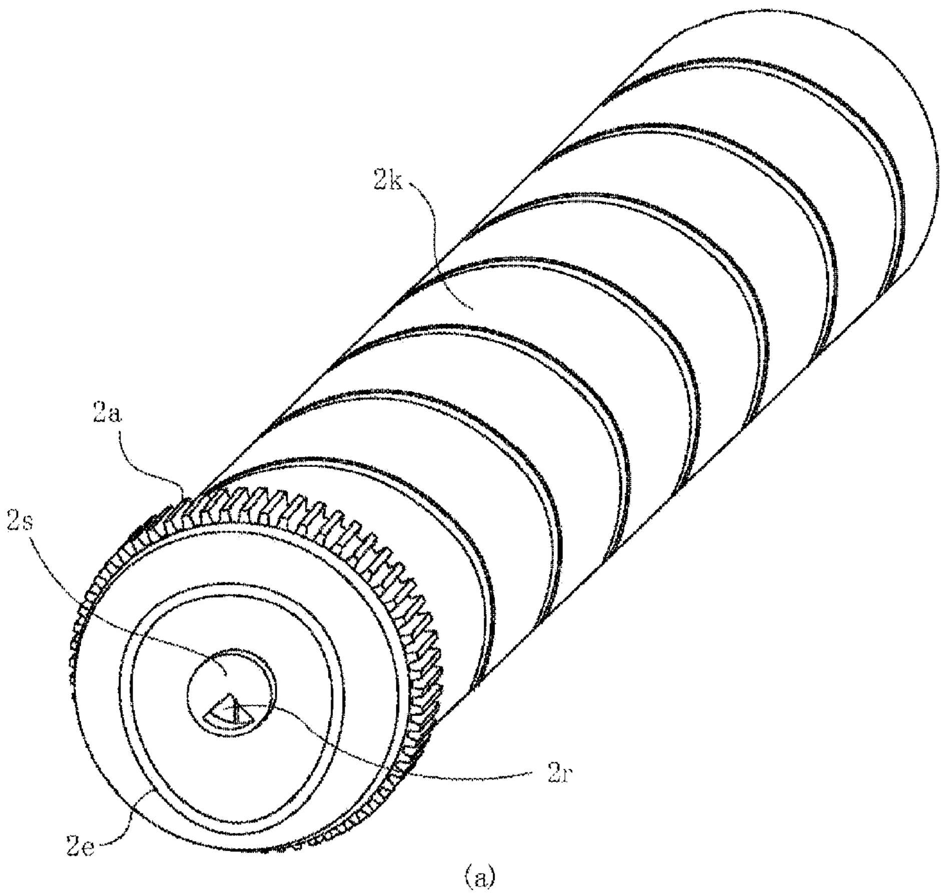
Figure 38:
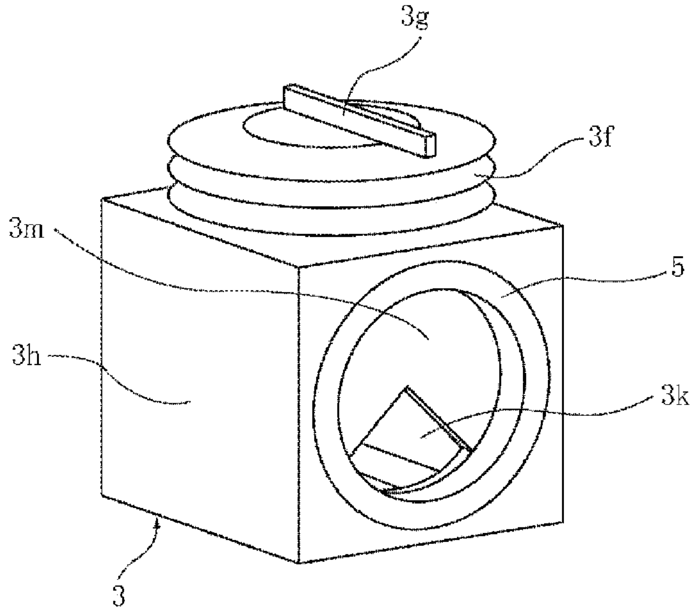

Parts (a) and (b) of FIG. 38 are perspective views illustrating a cylindrical portion and a flange portion of a developer supply container according to Embodiment 13.

Figure 39:
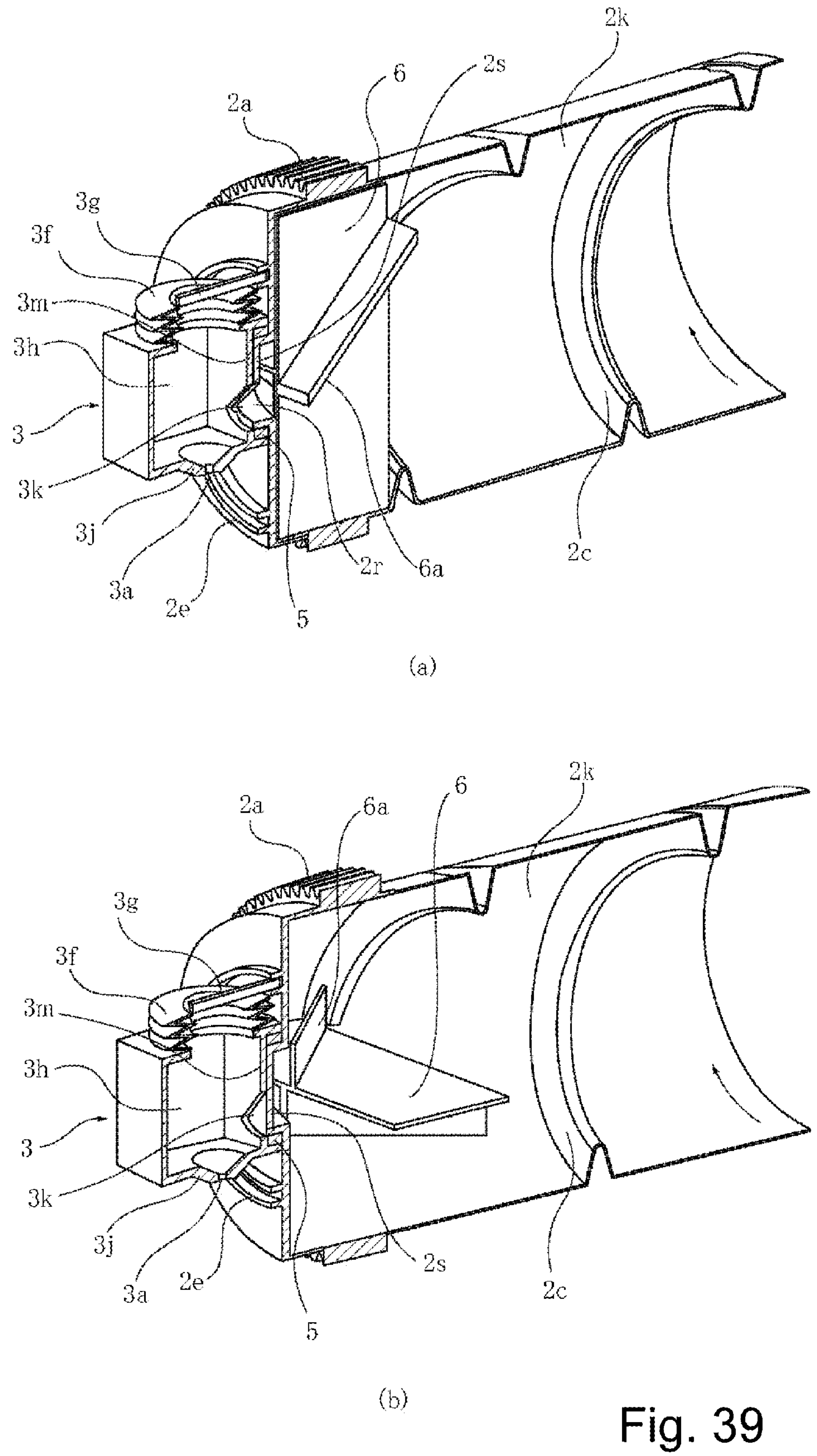

Parts (a) and (b) of FIG. 39 are partially sectional perspective views of a developer supply container according to Embodiment 13.

Figure 40:
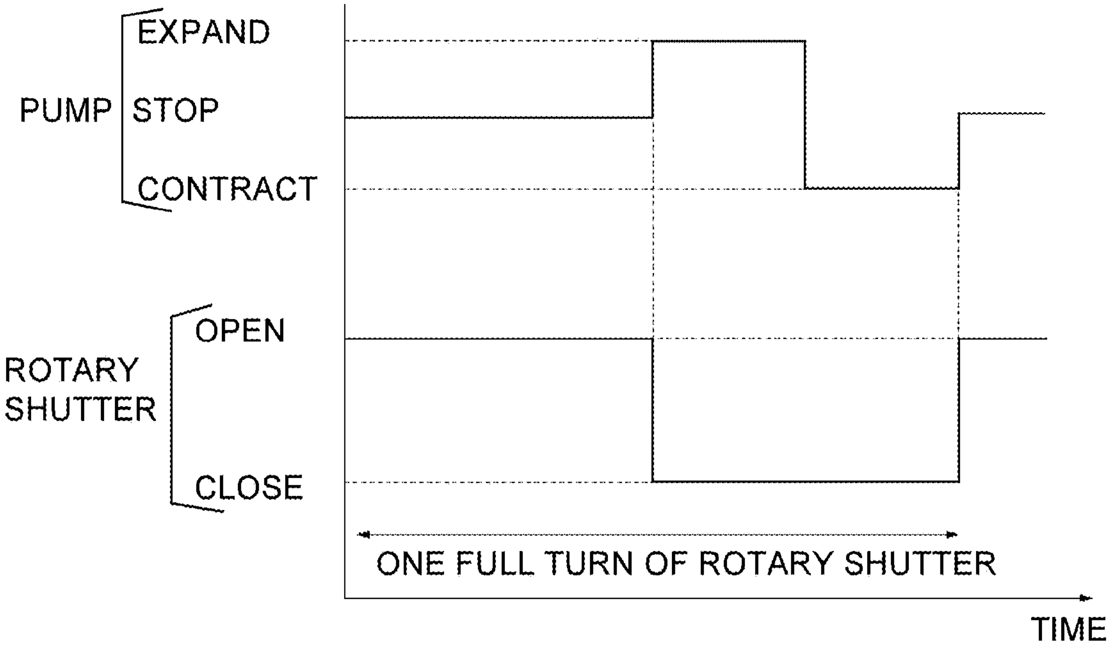

FIG. 40 is a time chart illustrating a relation between an operation state of a pump according to Embodiment 13 and opening and closing timing of a rotatable shutter.

Figure 41:
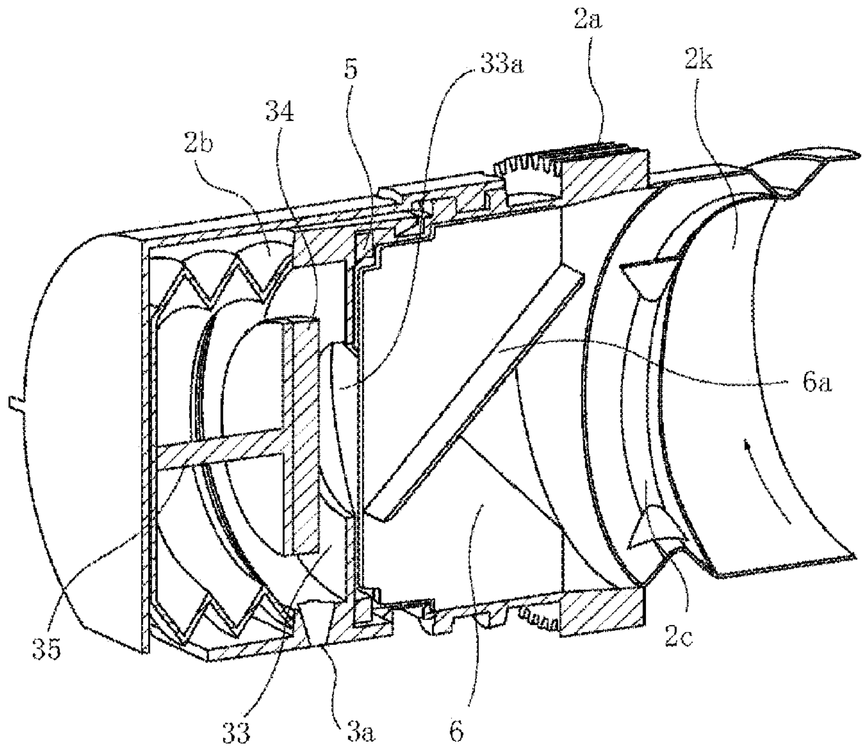

FIG. 41 is a partly sectional perspective view illustrating a developer supply container according to Embodiment 14.

Figure 42:
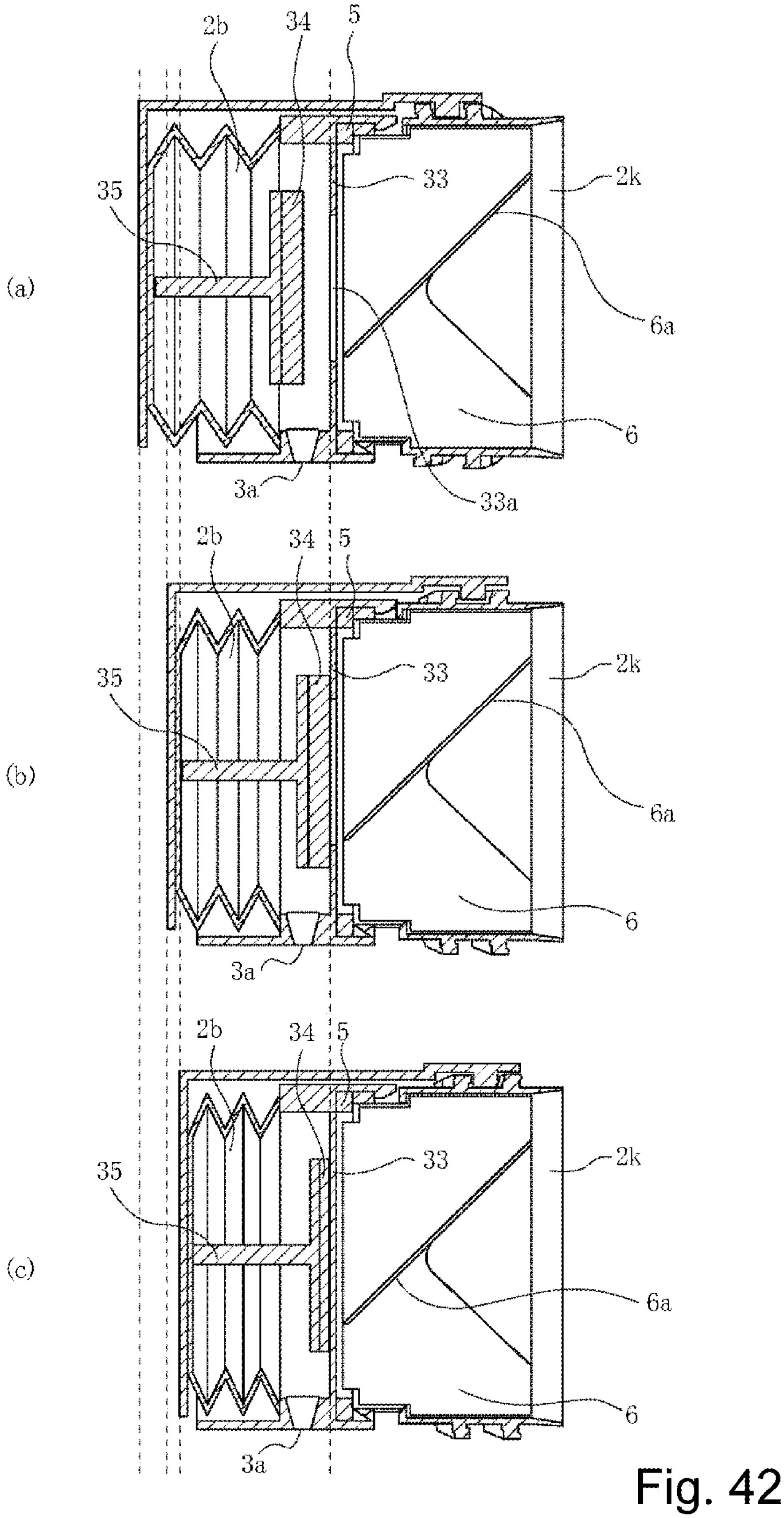

Parts (a)-(c) of FIG. 42 are partially sectional views illustrating operation state of a pump portion according to Embodiment 14.

Figure 43:
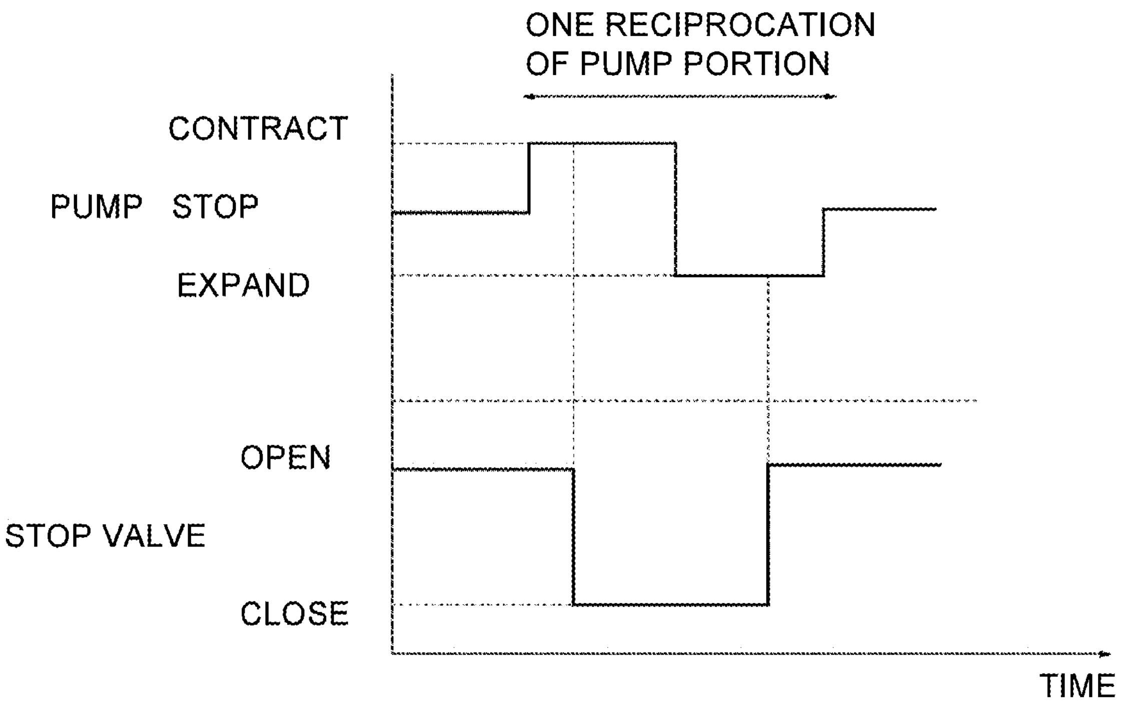

FIG. 43 is a time chart illustrating a relation between an operation state of a pump according to Embodiment 14 and opening and closing timing of a stop valve.

Figure 44:
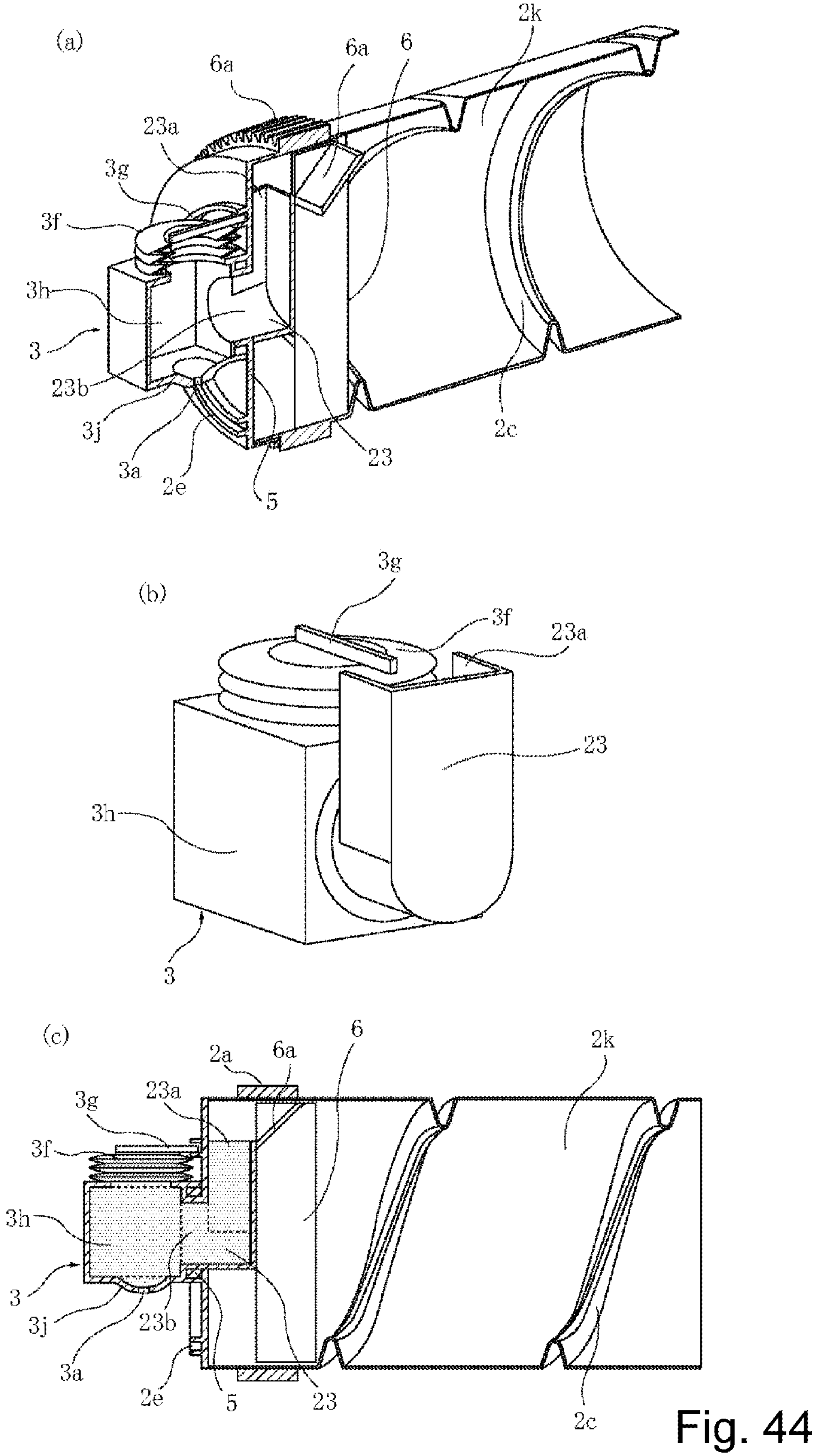

Part (a) of FIG. 44 is a partly sectional perspective view of a developer supply container according to Embodiment 15, (b) is a perspective view of a flange portion, and (c) is a sectional view of the developer supply container.

Figure 45:
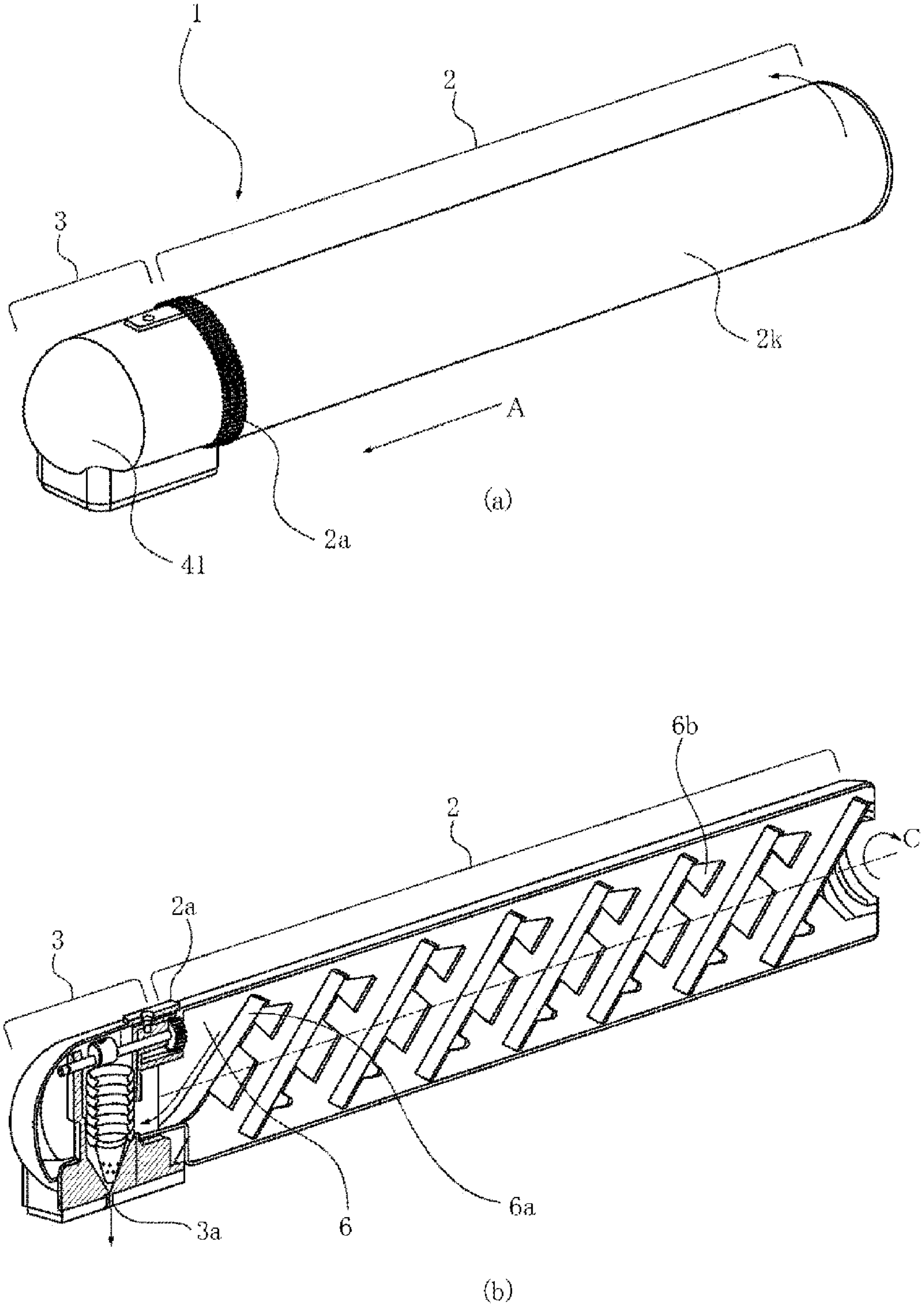

Part (a) of FIG. 45 is a perspective view illustrating a structure of a developer supply container according to Embodiment 16, and (b) is a sectional perspective view of the developer supply container.

Figure 46:
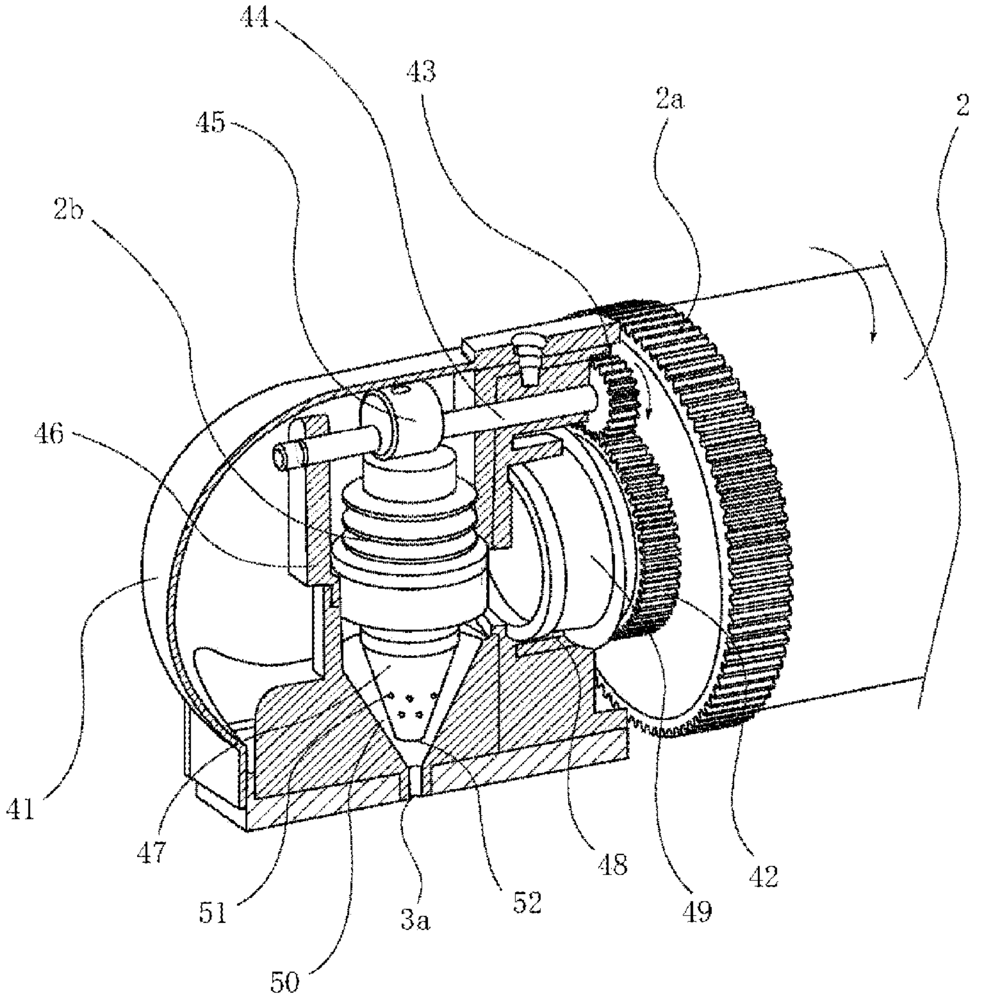

FIG. 46 is a partly sectional perspective view illustrating a structure of a developer supply container according to Embodiment 16.

Figure 47:
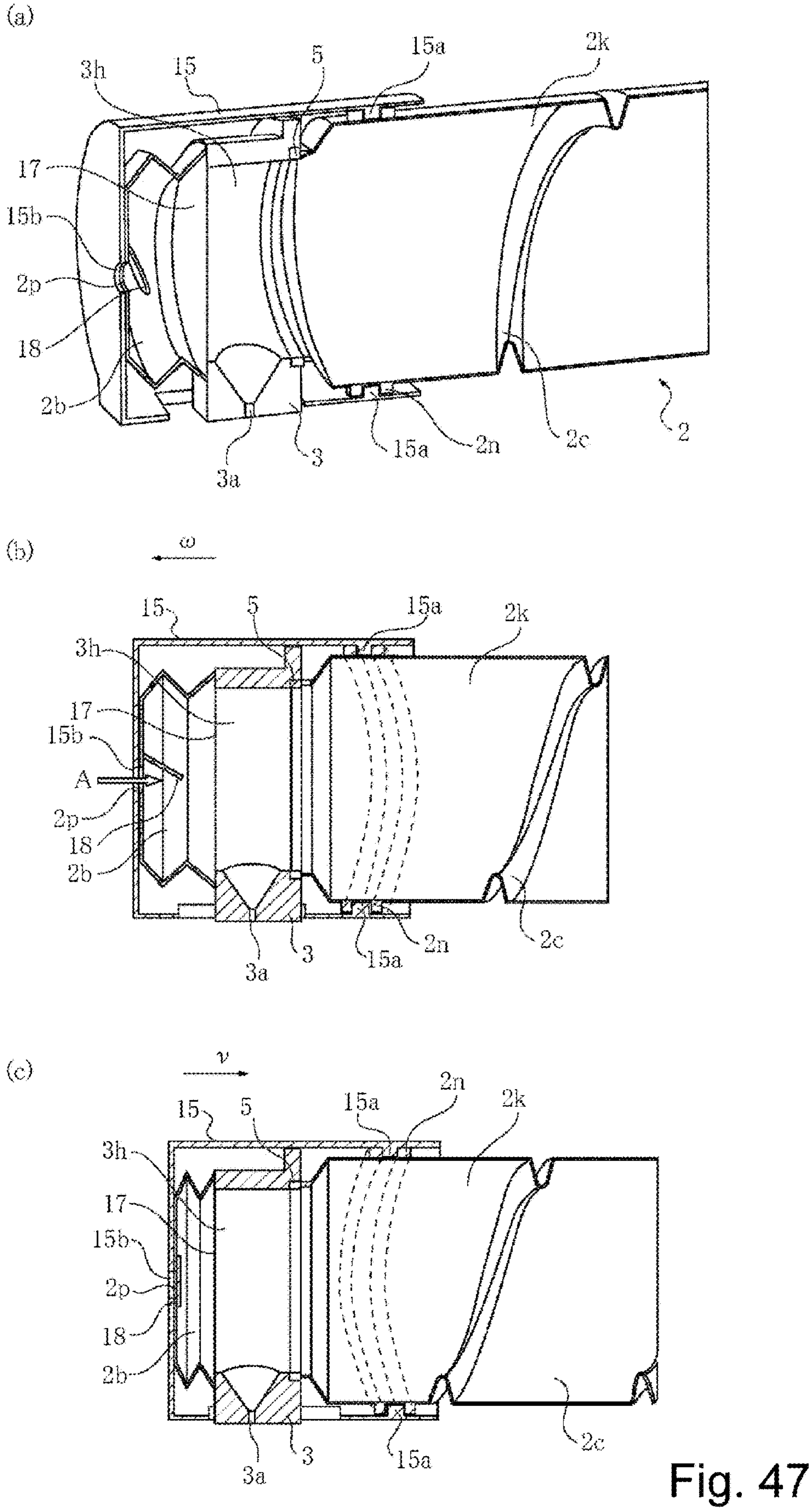

Part (a) of FIG. 47 is a sectional perspective view illustrating a structure of a developer supply container according to Embodiment 17, and (b) and (c) are partially sectional views illustrating the developer supply container.

Figure 48:
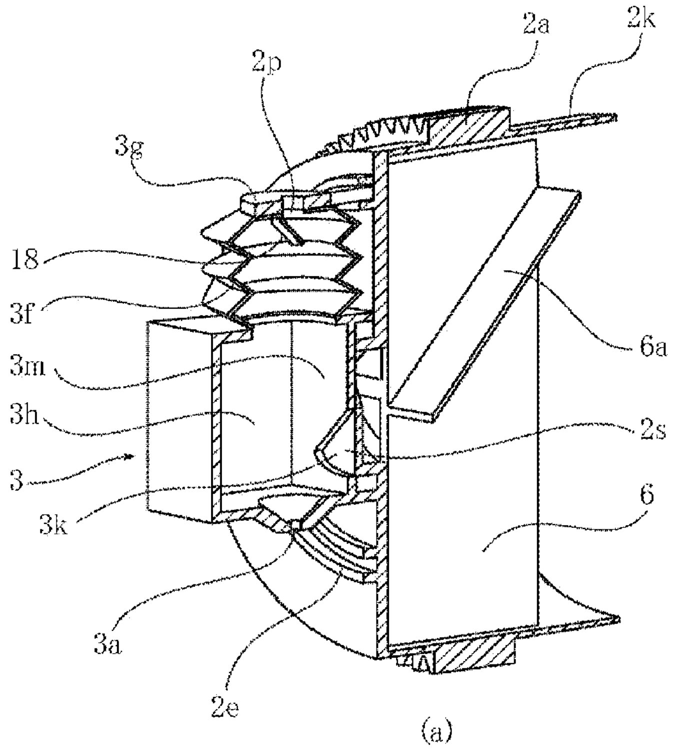
Figure 48:
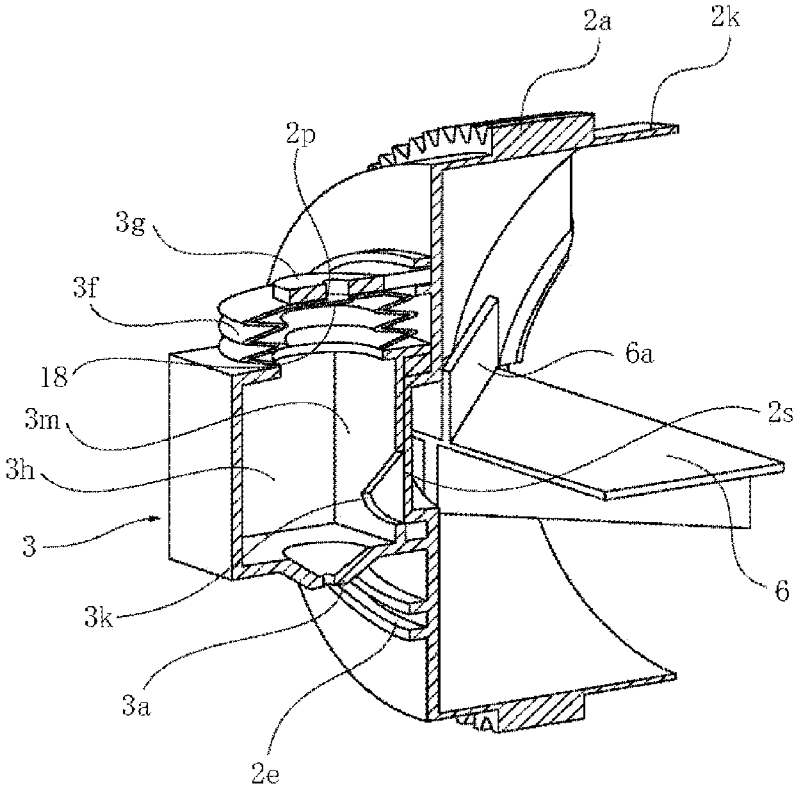

Parts (a) and (b) of FIG. 48 are partly sectional perspective views illustrating a structure of a developer supply container according to Embodiment 18.

PREFERRED EMBODIMENTS OF THE INVENTION

In the following, the description will be made as to a developer supply container and a developer supplying system according to the present invention in detail. In the following description, various structures of the developer supply container may be replaced with other known structures having similar functions within the scope of the concept of invention unless otherwise stated. In other words, the present invention is not limited to the specific structures of the embodiments which will be described hereinafter, unless otherwise stated.

Embodiment 1

First, basic structures of an image forming apparatus will be described, and then, a developer supplying system, that is, a developer replenishing apparatus and a developer supply container used in the image forming apparatus will be described.

(Image forming apparatus)

Figure 1:
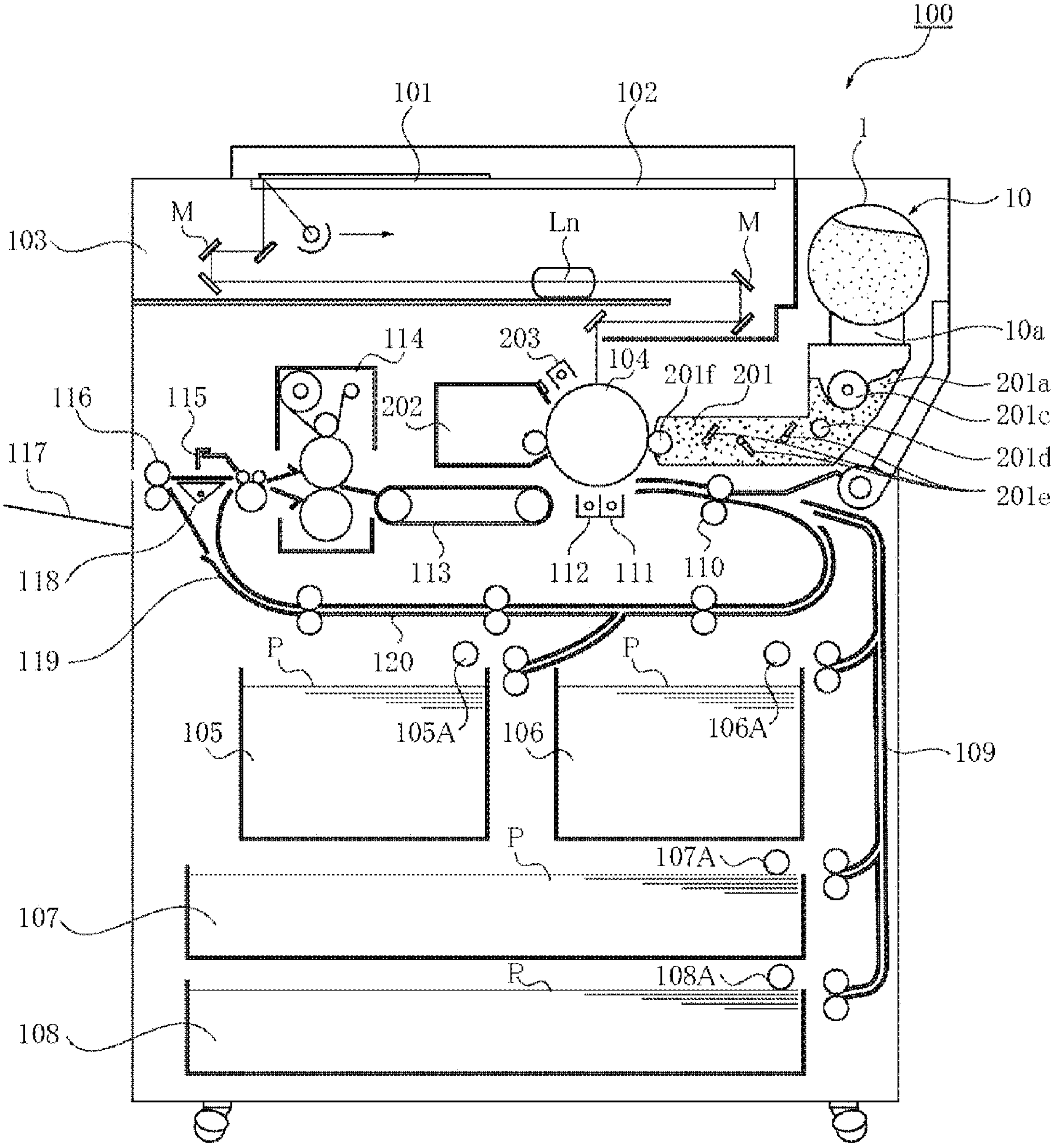
FIG. 1 is a sectional view illustrating a general arrangement of an image forming apparatus.

Referring to FIG. 1, the description will be made as to structures of a copying machine (electrophotographic image forming apparatus) employing an electrophotographic type process as an example of an image forming apparatus using a developer replenishing apparatus to which a developer supply container (so-called toner cartridge) is detachably mountable.

In the Figure, designated by 100 is a main assembly of the copying machine (main assembly of the image forming apparatus or main assembly of the apparatus). Designated by 101 is an original which is placed on an original supporting platen glass 102. A light image corresponding to image information of the original is imaged on an electrophotographic photosensitive member 104 (photosensitive member) by way of a plurality of mirrors M of an optical portion 103 and a lens Ln, so that an electrostatic latent image is formed. The electrostatic latent image is visualized with toner (one component magnetic toner) as a developer (dry powder) by a dry type developing device (one component developing device) 201*a*.

In this embodiment, the one component magnetic toner is used as the developer to be supplied from a developer supply container 1, but the present invention is not limited to the example and includes other examples which will be described hereinafter.

Specifically, in the case that a one component developing device using the one component non-magnetic toner is employed, the one component non-magnetic toner is supplied as the developer. In addition, in the case that a two component developing device using a two component developer containing mixed magnetic carrier and non-magnetic toner is employed, the non-magnetic toner is supplied as the developer. In such a case, both of the non-magnetic toner and the magnetic carrier may be supplied as the developer.

Designated by 105-108 are cassettes accommodating recording materials (sheets) S. Of the sheet S stacked in the cassettes 105-108, an optimum cassette is selected on the basis of a sheet size of the original 101 or information inputted by the operator (user) from a liquid crystal operating portion of the copying machine. The recording material is not limited to a sheet of paper, but OHP sheet or another material can be used as desired.

One sheet S supplied by a separation and feeding device 105A-108A is fed to registration rollers 110 along a feeding portion 109, and is fed at timing synchronized with rotation of a photosensitive member 104 and with scanning of an optical portion 103.

Designated by 111, 112 are a transfer charger and a separation charger. An image of the developer formed on the photosensitive member 104 is transferred onto the sheet S by a transfer charger 111. Then, the sheet S carrying the developed image (toner image) transferred thereonto is separated from the photosensitive member 104 by the separation charger 112.

Thereafter, the sheet S fed by the feeding portion 113 is subjected to heat and pressure in a fixing portion 114 so that the developed image on the sheet is fixed, and then passes through a discharging/reversing portion 115, in the case of one-sided copy mode, and subsequently the sheet S is discharged to a discharging tray 117 by discharging rollers 116.

In the case of a duplex copy mode, the sheet S enters the discharging/reversing portion 115 and a part thereof is ejected once to an outside of the apparatus by the discharging roller 116. The trailing end thereof passes through a flapper 118, and a flapper 118 is controlled when it is still nipped by the discharging rollers 116, and the discharging rollers 116 are rotated reversely, so that the sheet S is refed into the apparatus. Then, the sheet S is fed to the registration rollers 110 by way of re-feeding portions 119, 120, and then conveyed along the path similarly to the case of the one-sided copy mode and is discharged to the discharging tray 117.

In the main assembly of the apparatus 100, around the photosensitive member 104, there are provided image forming process equipment such as a developing device 201*a* as the developing means a cleaner portion 202 as a cleaning means, a primary charger 203 as charging means. The developing device 201*a* develops the electrostatic latent image formed on the photosensitive member 104 by the optical portion 103 in accordance with image information of the 101, by depositing the developer onto the latent image. The primary charger 203 uniformly charges a surface of the photosensitive member for the purpose of forming a desired electrostatic image on the photosensitive member 104. The cleaner portion 202 removes the developer remaining on the photosensitive member 104.

(Developer replenishing apparatus)

Referring to FIGS. 1-4, a developer replenishing apparatus 201 which is a constituent-element of the developer supplying system will be described. Part (a) of FIG. 2 is a partially sectional view of the developer replenishing apparatus 201, part (b) of FIG. 2 is a front view of a mounting portion 10 as seen in a mounting direction of the developer supply container 1, and part (c) of FIG. 2 is an enlarged perspective view of an inside of the mounting portion 10. FIG. 3 is partly enlarged sectional views of a control system, the developer supply container 1 and the developer replenishing apparatus 201. FIG. 4 is a flow chart illustrating a flow of developer supply operation by the control system.

As shown in FIG. 1, the developer replenishing apparatus 201 comprises the mounting portion (mounting space) 10, to which the developer supply container 1 is mounted demountably, a hopper 10*a* for storing temporarily the developer discharged from the developer supply container 1, and the developing device 201*a*. As shown in part (c) of FIG. 2, the developer supply container 1 is mountable in a direction indicated by M to the mounting portion 10. Thus, a longitudinal direction (rotational axis direction) of the developer supply container 1 is substantially the same as the direction M. The direction M is substantially parallel with a direction indicated by X of part (b) of FIG. 7 which will be described hereinafter. In addition, a dismounting direction of the developer supply container 1 from the mounting portion 10 is opposite the direction M.

As shown in parts (a) of FIGS. 1 and 2, the developing device 201*a* comprises a developing roller 201*f*, a stirring member 201*c* and feeding members 201*d*, 201*e*. The developer supplied from the developer supply container 1 is stirred by the stirring member 201*c*, is fed to the developing roller 201*f* by the feeding members 201*d*, 201*e*, and is supplied to the photosensitive member 104 by the developing roller 201*f*.

A developing blade 201*g* for regulating an amount of developer coating on the roller is provided relative to the developing roller 201*f*, and a leakage preventing sheet 201*h* is provided contacted to the developing roller 201*f* to prevent leakage of the developer between the developing device 201*a* and the developing roller 201*f*.

As shown in part (b) of FIG. 2, the mounting portion 10 is provided with a rotation regulating portion (holding mechanism) 11 for limiting movement of the flange portion 3 in the rotational moving direction by abutting to a flange portion 3 (FIG. 6) of the developer supply container 1 when the developer supply container 1 is mounted. In addition, as shown in part (c) of FIG. 2 a mounting portion 10 is provided with the regulating portion the holding mechanism) 12 for limiting movement of the flange portion 3 in a rotational axis direction by locking engagement with the flange portion 3 of the developer supply container 1 when the developer supply container 1 is mounted. The regulating portion 12 is a snap locking mechanism of resin material which elastically deforms by interference with the flange portion 3, and thereafter, restores upon being released from the flange portion 3 to lock the flange portion 3.

Furthermore, the mounting portion 10 is provided with a developer receiving port (developer reception hole) 13 for receiving the developer discharged from the developer supply container 1, and the developer receiving port is brought into fluid communication with a discharge opening the discharging port) 3*a* (FIG. 6) of the developer supply container 1 which will be described hereinafter, when the developer supply container 1 is mounted thereto. The developer is supplied from the discharge opening 3*a* of the developer supply container 1 to the developing device 201*a* through the developer receiving port 13. In this embodiment, a diameter φ of the developer receiving port 13 is approx. 2 mm (pin hole) which is the same as that of the discharge opening 3*a*, for the purpose of preventing as much as possible the contamination by the developer in the mounting portion 10.

As shown in FIG. 3, the hopper 10*a* comprises a feeding screw 10*b* for feeding the developer to the developing device 201*a* an opening 10*c* in fluid communication with the developing device 201*a* and a developer sensor 10*d* for detecting an amount of the developer accommodated in the hopper 10*a*.

As shown in part (b) of FIG. 2 and FIG. 3, the mounting portion 10 is provided with a driving gear 300 functioning as a driving mechanism (driver). The driving gear 300 receives a rotational force from a driving motor 500 through a driving gear train, and functions to apply a rotational force to the developer supply container 1 which is set in the mounting portion 10.

As shown in FIG. 3, the driving motor 500 is controlled by a control device (CPU) 600. As shown in FIG. 3, the control device 600 controls the operation of the driving motor 500 on the basis of information indicative of a developer remainder inputted from the remaining amount sensor 10*d*.

In this example, the driving gear 300 is rotatable unidirectionally to simplify the control for the driving motor 500. The control device 600 controls only ON (operation) and OFF (non-operation) of the driving motor 500. This simplifies the driving mechanism for the developer replenishing apparatus 201 as compared with a structure in which forward and backward driving forces are provided by periodically rotating the driving motor 500 (driving gear 300) in the forward direction and backward direction.

(Mounting/Dismounting Method of Developer Supply Container)

The description will be made as to mounting/dismounting method of the developer supply container 1.

First, the operator opens an exchange cover and inserts and mounts the developer supply container 1 to a mounting portion 10 of the developer replenishing apparatus 201. By the mounting operation, the flange portion 3 of the developer supply container 1 is held and fixed in the developer replenishing apparatus 201.

Thereafter, the operator closes the exchange cover to complete the mounting step. Thereafter, the control device 600 controls the driving motor 500, by which the driving gear 300 rotates at proper timing.

On the other hand, when the developer supply container 1 becomes empty, the operator opens the exchange cover and takes the developer supply container 1 out of the mounting portion 10. The operator inserts and mounts a new developer supply container 1 prepared beforehand and closes the exchange cover, by which the exchanging operation from the removal to the remounting of the developer supply container 1 is completed.

(Developer Supply Control by Developer Replenishing Apparatus)

Referring to a flow chart of FIG. 4, a developer supply control by the developer replenishing apparatus 201 will be described. The developer supply control is executed by controlling various equipment by the control device (CPU) 600.

In this example, the control device 600 controls the operation/non-operation of the driving motor 500 in accordance with an output of the developer sensor **10*d* by which the developer is not accommodated in the hopper 10*a*** beyond a predetermined amount.

More particularly, first, the developer sensor **10*d* checks the accommodated developer amount in the hopper 10*a*. When the accommodated developer amount detected by the developer sensor 10*d* is discriminated as being less than a predetermined amount, that is, when no developer is detected by the developer sensor 10*d*, the driving motor 500 is actuated to execute a developer supplying operation for a predetermined time period (S101**).

The accommodated developer amount detected with developer sensor **10*d* is discrimination ed as having reached the predetermined amount, that is, when the developer is detected by the developer sensor 10*d*, as a result of the developer supplying operation, the driving motor 500 is deactuated to stop the developer supplying operation (S102**). By the stop of the supplying operation, a series of developer supplying steps is completed.

Such developer supplying steps are carried out repeatedly whenever the accommodated developer amount in the hopper **10*a*** becomes less than a predetermined amount as a result of consumption of the developer by the image forming operations.

In this example, the developer discharged from the developer supply container 1 is stored temporarily in the hopper **10*a*, and then is supplied into the developing device 201*a*, but the following structure of the developer replenishing apparatus 201** can be employed.

More particularly, as shown in FIG. 5, the above-described hopper **10*a* is omitted, and the developer is supplied directly into the developing device 201*a* from the developer supply container 1. FIG. 5 shows an example using a two component developing device 800 as a developer replenishing apparatus 201. The developing device 800 comprises a stirring chamber into which the developer is supplied, and a developer chamber for supplying the developer to the developing sleeve 800*a*, wherein the stirring chamber and the developer chamber are provided with stirring screws 800*b* rotatable in such directions that the developer is fed in the opposite directions from each other. The stirring chamber and the developer chamber are communicated with each other in the opposite longitudinal end portions, and the two component developer are circulated the two chambers. The stirring chamber is provided with a magnetometric sensor 800*c* for detecting a toner content of the developer, and on the basis of the detection result of the magnetometric sensor 800*c*, the control device 600 controls the operation of the driving motor 500**. In such a case, the developer supplied from the developer supply container is non-magnetic toner or non-magnetic toner plus magnetic carrier.

In this example, as will be described hereinafter, the developer in the developer supply container 1 is hardly discharged through the discharge opening **3*a* only by the gravitation, but the developer is discharged by a discharging operation by a pump portion 2*b*, and therefore, variation in the discharge amount can be suppressed. Therefore, the developer supply container 1 which will be described hereinafter is usable for the example of FIG. 5 lacking the hopper 10*a***.

(Developer Supply Container)

Referring to FIGS. 6 and 7, the structure of the developer supply container 1 which is a constituent-element of the developer supplying system will be described. Part (a) of FIG. 6 is a perspective view of an entirety of the developer supply container 1, part (b) of FIG. 6 is a partially enlarged view around the discharge opening **3*a* of the developer supply container 1, and parts (c) and (d) of FIG. 6 are a front view and a sectional view of the developer supply container 1 mounted to the mounting portion 10. Part (a) of FIG. 7 is a perspective view illustrating a developer accommodating portion 2, part (b) of FIG. 7 is a sectional perspective view illustrating an inside of the developer supply container 1, part (c) FIG. 7 is a sectional view of the flange portion 3, and part (d) of FIG. 7 is a sectional view of the developer supply container 1**.

As shown in part (a) of FIG. 6, the developer supply container 1 includes a developer accommodating portion 2 (container body) having a hollow cylindrical inside space for accommodating the developer. In this example, a cylindrical portion **2*k* and the pump portion 2*b* functions as the developer accommodating portion 2. Furthermore, the developer supply container 1 is provided with a flange portion 3 (non-rotatable portion) at one end of the developer accommodating portion 2 with respect to the longitudinal direction (developer feeding direction). The developer accommodating portion 2 is rotatable relative to the flange portion 3. A cross-sectional configuration of the cylindrical portion 2*k*** may be non-circular as long as the non-circular shape does not adversely affect the rotating operation in the developer supplying step. For example, it may be oval configuration, polygonal configuration or the like.

In this example, as shown in part (d) of FIG. 7, a total length L1 of the cylindrical portion **2*k* functioning as the developer accommodating chamber is approx. 300 mm, and an outer diameter R1 is approx. 70 mm. A total length L2 of the pump portion 2*b* (in the state that it is most expanded in the expansible range in use) is approx. 50 mm, and a length L3 of a region in which a gear portion 2***a* of the flange portion 3 is provided is approx. 20 mm. A length L4 of a region of a discharging portion 3*h* functioning as a developer discharging chamber is approx. 25 mm. A maximum outer diameter R2 (in the state that it is most expanded in the expansible range in use in the diametrical direction) is approx. 65 mm, and a total volume capacity accommodating the developer in the developer supply container 1 is the 1250 $cm^3$. In this example, the developer can be accommodated in the cylindrical portion 2*k* and the pump portion 2*b* and in addition the discharging portion 3*h*, that is, they function as a developer accommodating portion.

As shown in FIGS. 6, 7, in this example, in the state that the developer supply container 1 is mounted to the developer replenishing apparatus 201, the cylindrical portion 2*k* and the discharging portion 3*h* are substantially on line along a horizontal direction. That is, the cylindrical portion 2*k* has a sufficiently long length in the horizontal direction as compared with the length in the vertical direction, and one end part with respect to the horizontal direction is connected with the discharging portion 3*h*. For this reason, an amount of the developer existing above the discharge opening 3*a* which will be described hereinafter can be made smaller as compared with the case in which the cylindrical portion 2*k* is above the discharging portion 3*h* in the state that the developer supply container 1 is mounted to the developer replenishing apparatus 201. Therefore, the developer in the neighborhood of the discharge opening 3*a* is less compressed, thus accomplishing smooth suction and discharging operation.

(Material of Developer Supply Container)

In this example, as will be described hereinafter, the developer is discharged through the discharge opening 3*a* by changing a pressure (internal pressure) of the developer supply container 1 by the pump portion 2*b*. Therefore, the material of the developer supply container 1 is preferably such that it provides an enough rigidity to avoid collision or extreme expansion.

In addition, in this example, the developer supply container 1 is in fluid communication with an outside only through the discharge opening 3*a*, and is sealed except for the discharge opening 3*a*. Such a hermetical property as is enough to maintain a stabilized discharging performance in the discharging operation of the developer through the discharge opening 3*a* is provided by the pressurization and pressure reduction of the developer supply container 1 by the pump portion 2*b*.

Under the circumstances, this example employs polystyrene resin material as the materials of the developer accommodating portion 2 and the discharging portion 3*h* and employs polypropylene resin material as the material of the pump portion 2*b*.

As for the material for the developer accommodating portion 2 and the discharging portion 3*h*, other resin materials such as ABS (acrylonitrile, butadiene, styrene copolymer resin material), polyester, polyethylene, polypropylene, for example are usable if they have enough durability against the pressure. Alternatively, they may be metal.

As for the material of the pump portion 2*b*, any material is usable if it is expansible and contractable enough to change the internal pressure of the developer supply container 1 by the volume change. The examples includes thin formed ABS (acrylonitrile, butadiene, styrene copolymer resin material), polystyrene, polyester, polyethylene materials. Alternatively, other expandable-and-contractable materials such as rubber are usable.

They may be integrally molded of the same material through an injection molding method, a blow molding method or the like if the thicknesses are properly adjusted for the pump portion 2*b*, developer accommodating portion 2 and the discharging portion 3*h*, respectively.

There is a liability that during transportation (air transportation) of the developer supply container 1 and/or in long term unused period, the internal pressure of the container may abruptly changes due to abrupt variation of the ambient conditions. For an example, when the apparatus is used in a region having a high altitude, or when the developer supply container 1 kept in a low ambient temperature place is transferred to a high ambient temperature room, the inside of the developer supply container 1 may be pressurized as compared with the ambient air pressure. In such a case, the container may deform, and/or the developer may splash when the container is unsealed.

In view of this, the developer supply container 1 is provided with an opening of a diameter φ 3 mm, and the opening is provided with a filter. The filter is TEMISH (registered Trademark) available from Nitto Denko Kabushiki Kaisha, Japan, which is provided with a property preventing developer leakage to the outside but permitting air passage between inside and outside of the container. Here, in this example, despite the fact that such a countermeasurement is taken, the influence thereof to the sucking operation and the discharging operation through the discharge opening 3*a* by the pump portion 2*b* can be ignored, and therefore, the hermetical property of the developer supply container 1 is kept in effect.

In the following, the description will be made as to the flange portion 3, the cylindrical portion 2*k*, and the pump portion 2*b*.

(Flange Portion)

As shown in part (b) of FIG. 6, the flange portion 3 is provided with a hollow discharging portion (developer discharging chamber) 3*h* for temporarily storing the developer having been fed from the inside of the developer accommodating portion (inside of the developer accommodating chamber) 2 (see parts (b) and (c) of FIG. 7 if necessary). A bottom portion of the discharging portion 3*h* is provided with the small discharge opening 3*a* for permitting discharge of the developer to the outside of the developer supply container 1, that is, for supplying the developer into the developer replenishing apparatus 201. The size of the discharge opening 3*a* will be described hereinafter.

An inner shape of the bottom portion of the inner of the discharging portion 3*h* (inside of the developer discharging chamber) is like a funnel converging toward the discharge opening 3*a* in order to reduce as much as possible the amount of the developer remaining therein (parts (b) and (c) of FIG. 7 if necessary).

The flange portion 3 is provided with a shutter 4 for opening and closing the discharge opening 3*a*. The shutter 4 is provided at a position such that when the developer supply container 1 is mounted to the mounting portion 10, it is abutted to an abutting portion 21 (see part (c) of FIG. 2 if necessary) provided in the mounting portion 10. Therefore, the shutter 4 slides relative to the developer supply container 1 in the rotational axis direction (opposite from the M direction) of the developer accommodating portion 2 with the mounting operation of the developer supply container 1 to the mounting portion 10. As a result, the discharge opening 3*a* is exposed through the shutter 4, thus completing the unsealing operation.

At this time, the discharge opening 3*a* is positionally aligned with the developer receiving port 13 of the mounting portion 10, and therefore, they are brought into fluid communication with each other, thus enabling the developer supply from the developer supply container 1.

The flange portion 3 is constructed such that when the developer supply container 1 is mounted to the mounting portion 10 of the developer replenishing apparatus 201, it is stationary substantially.

More particularly, as shown in part (c) of FIG. 6, the flange portion 3 is regulated (prevented) from rotating in the rotational direction about the rotational axis of the developer accommodating portion 2 by a rotational moving direction regulating portion 11 provided in the mounting portion 10. In other words, the flange portion 3 is retained such that it is substantially non-rotatable by the developer replenishing apparatus 201 (although the rotation within the play is possible).

Furthermore, the flange portion 3 is locked with the rotational axis direction regulating portion 12 provided in the mounting portion 10 with the mounting operation of the developer supply container 1. More particularly, a flange portion 3 is brought into abutment to the rotational axis direction regulating portion 12 in midstream of the mounting operation of the developer supply container 1 to elastically deform the rotational axis direction regulating portion 12. Thereafter, the flange portion 3 abuts to the inner wall portion **10*f* (part (d) of FIG. 6) which is a stopper provided in the mounting portion 10, thus completing the mounting step of the developer supply container 1. Substantially simultaneously with the completion of the mounting, the interference with the flange portion 3 is released, so that the elastic deformation of the rotational axis direction regulating portion 12** restores.

As a result, as shown in part (d) of FIG. 6, the rotational axis direction regulating portion 12 is locked with an edge portion of the flange portion 3 (functioning as a locking portion), so that the state in which the movement in the rotational axis direction of the developer accommodating portion 2 is prevented (regulated) substantially is established. At this time, slight negligible movement due to the play is permitted.

When the operator dismounts the developer supply container 1 from the mounting portion 10, the rotational axis direction regulating portion 12 is elastically deformed by the flange portion 3 to be released from the flange portion 3. The rotational axis direction of the developer accommodating portion 2 is substantially the same as the rotational axis direction of the gear portion **2*a* (FIG. 7**).

As described in the foregoing, in this example, the flange portion 3 is provided with a holding portion to be held by the holding mechanism (12 in part (c) of FIG. 2) of the developer replenishing apparatus 201 so as to prevent the movement in the rotational axis direction of the developer accommodating portion 2. In addition, the flange portion 3 is provided with a holding portion to be held by a holding mechanism (11 in part (c) of FIG. 2) of the developer replenishing apparatus 201 so as to prevent the rotation in the rotational moving direction of the developer accommodating portion 2.

Therefore, in the state that the developer supply container 1 is mounted to the developer replenishing apparatus 201, the discharging portion **3*h* provided in the flange portion 3 is prevented substantially in the movement of the developer accommodating portion 2** both in the rotational axis direction and the rotational moving direction (movement within the play is permitted).

On the other hand, the developer accommodating portion 2 is not limited in the rotational moving direction by the developer replenishing apparatus 201, and therefore, is rotatable in the developer supplying step. However, the developer accommodating portion 2 is substantially prevented in the movement in the rotational axis direction by the flange portion 3 (although the movement within the play is permitted).

(Discharge Opening of Flange Portion)

In this example, the size of the discharge opening **3*a* of the developer supply container 1 is so selected that in the orientation of the developer supply container 1 for supplying the developer into the developer replenishing apparatus 201, the developer is not discharged to a sufficient extent, only by the gravitation. The opening size of the discharge opening 3*a* is so small that the discharging of the developer from the developer supply container is insufficient only by the gravitation, and therefore, the opening is called pin hole hereinafter. In other words, the size of the opening is determined such that the discharge opening 3*a*** is substantially clogged. This is expectedly advantageous in the following points.

(1) the developer does not easily leak through the discharge opening **3*a***.

(2) excessive discharging of the developer at time of opening of the discharge opening **3*a*** can be suppressed.

(3) the discharging of the developer can rely dominantly on the discharging operation by the pump portion.

The inventors have investigated as to the size of the discharge opening **3*a*** not enough to discharge the toner to a sufficient extent only by the gravitation. The verification experiment (measuring method) and criteria will be described.

A rectangular parallelopiped container of a predetermined volume in which a discharge opening (circular) is formed at the center portion of the bottom portion is prepared, and is filled with 200 g of developer; then, the filling port is sealed, and the discharge opening is plugged; in this state, the container is shaken enough to loosen the developer. The rectangular parallelopiped container has a volume of 1000 $cm^3$, 90 mm in length, 92 mm width and 120 mm in height.

Thereafter, as soon as possible the discharge opening is unsealed in the state that the discharge opening is directed downwardly, and the amount of the developer discharged through the discharge opening is measured. At this time, the rectangular parallelopiped container is sealed completely except for the discharge opening. In addition, the verification experiments were carried out under the conditions of the temperature of 24° C. and the relative humidity of 55%.

Using these processes, the discharge amounts are measured while changing the kind of the developer and the size of the discharge opening. In this example, when the amount of the discharged developer is not more than 2 g, the amount is negligible, and therefore, the size of the discharge opening at that time is deemed as being not enough to discharge the developer sufficiently only by the gravitation.

The developers used in the verification experiment are shown in Table 1. The kinds of the developer are one component magnetic toner, non-magnetic toner for two component developer developing device and a mixture of the non-magnetic toner and the magnetic carrier.

As for property values indicative of the property of the developer, the measurements are made as to angles of rest indicating flowabilities, and fluidity energy indicating easiness of loosing of the developer layer, which is measured by a powder flowability analyzing device (Powder Rheometer FT4 available from Freeman Technology)

TABLE 1

| Developers | Volume average particle size of toner (μm) | Developer component | Angle of rest (deg.) | Fluidity energy (Bulk density of 0.5 g/cm$^3$) |
|---|---|---|---|---|
| A | 7 | Two-component non-magnetic | 18 | $2.09 \times 10^{-3}$ J |
| B | 6.5 | Two-component non-magnetic toner + carrier | 22 | $6.80 \times 10^{-4}$ J |
| C | 7 | One-component magnetic toner | 35 | $4.30 \times 10^{-4}$ J |
| D | 5.5 | Two-component non-magnetic toner + carrier | 40 | $3.51 \times 10^{-3}$ J |
| E | 5 | Two-component non-magnetic toner + carrier | 27 | $4.14 \times 10^{-3}$ J |

Referring to FIG. 8, a measuring method for the fluidity energy will be described. Here, FIG. 8 is a schematic view of a device for measuring the fluidity energy.

The principle of the powder flowability analyzing device is that a blade is moved in a powder sample, and the energy required for the blade to move in the powder, that is, the fluidity energy, is measured. The blade is of a propeller type, and when it rotates, it moves in the rotational axis direction simultaneously, and therefore, a free end of the blade moves helically.

The propeller type blade 54 is made of SUS (type=C210) and has a diameter of 48 mm, and is twisted smoothly in the counterclockwise direction. More specifically, from a center of the blade of 48 mm×10 mm, a rotation shaft extends in a normal line direction relative to a rotation plane of the blade, a twist angle of the blade at the opposite outermost edge portions (the positions of 24 mm from the rotation shaft) is 70°, and a twist angle at the positions of 12 mm from the rotation shaft is 35°.

The fluidity energy is total energy provided by integrating with time a total sum of a rotational torque and a vertical load when the helical rotating blade 54 enters the powder layer and advances in the powder layer. The value thus obtained indicates easiness of loosening of the developer powder layer, and large fluidity energy means less easiness and small fluidity energy means greater easiness.

In this measurement, as shown in FIG. 8, the developer T is filled up to a powder surface level of 70 mm (L2 in FIG. 8) into the cylindrical container 53 having a diameter φ of 50 mm (volume=200 cc, L1 (FIG. 8)=50 mm) which is the standard part of the device. The filling amount is adjusted in accordance with a bulk density of the developer to measure. The blade 54 of φ48 mm which is the standard part is advanced into the powder layer, and the energy required to advance from depth 10 mm to depth 30 mm is displayed.

The set conditions at the time of measurement are,

The rotational speed of the blade 54 (tip speed=peripheral speed of the outermost edge portion of the blade) is 60 mm/s:

The blade advancing speed in the vertical direction into the powder layer is such a speed that an angle θ (helix angle) formed between a track of the outermost edge portion of the blade 54 during advancement and the surface of the powder layer is 10°:

The advancing speed into the powder layer in the perpendicular direction is 11 mm/s (blade advancement speed in the powder layer in the vertical direction=(rotational speed of blade)×tan (helix angle×π/180)): and The measurement is carried out under the condition of temperature of 24° C. and relative humidity of 55%.

The bulk density of the developer when the fluidity energy of the developer is measured is close to that when the experiments for verifying the relation between the discharge amount of the developer and the size of the discharge opening, is less changing and is stable, and more particularly is adjusted to be 0.5 g/cm$^3$.

The verification experiments were carried out for the developers (Table 1) with the measurements of the fluidity energy in such a manner. FIG. 9 is a graph showing relations between the diameters of the discharge openings and the discharge amounts with respect to the respective developers.

From the verification results shown in FIG. 9, it has been confirmed that the discharge amount through the discharge opening is not more than 2 g for each of the developers A-E, if the diameter φ of the discharge opening is not more than 4 mm (12.6 mm$^2$ in the opening area (circle ratio=3.14)). When the diameter ø discharge opening exceeds 4 mm, the discharge amount increases sharply.

The diameter ø of the discharge opening is preferably not more than 4 mm (12.6 mm$^2$ of the opening area) when the fluidity energy of the developer (0.5 g/cm$^3$ of the bulk density) is not less than $4.3\times10^4$ kg-m$^2$/s$^2$ (J) and not more than $4.14\times10^3$ kg-m$^2$/s$^2$ (J).

As for the bulk density of the developer, the developer has been loosened and fluidized sufficiently in the verification experiments, and therefore, the bulk density is lower than that expected in the normal use condition (left state), that is, the measurements are carried out in the condition in which the developer is more easily discharged than in the normal use condition.

The verification experiments were carries out as to the developer A with which the discharge amount is the largest in the results of FIG. 9, wherein the filling amount in the container were changed in the range of 30-300 g while the diameter φ of the discharge opening is constant at 4 mm. The verification results are shown in FIG. 10. From the results of FIG. 10, it has been confirmed that the discharge amount through the discharge opening hardly changes even if the filling amount of the developer changes.

From the foregoing, it has been confirmed that by making the diameter ø of the discharge opening not more than 4 mm (12.6 mm$^2$ in the area), the developer is not discharged sufficiently only by the gravitation through the discharge opening in the state that the discharge opening is directed downwardly (supposed supplying attitude into the developer replenishing apparatus 201) irrespective of the kind of the developer or the bulk density state.

On the other hand, the lower limit value of the size of the discharge opening 3*a* is preferably such that the developer to be supplied from the developer supply container 1 (one component magnetic toner, one component non-magnetic toner, two component non-magnetic toner or two component magnetic carrier) can at least pass therethrough. More particularly, the discharge opening is preferably larger than a particle size of the developer (volume average particle size in the case of toner, number average particle size in the case of carrier) contained in the developer supply container 1. For example, in the case that the supply developer comprises two component non-magnetic toner and two component magnetic carrier, it is preferable that the discharge opening is larger than a larger particle size, that is, the number average particle size of the two component magnetic carrier.

Specifically, in the case that the supply developer comprises two component non-magnetic toner having a volume average particle size of 5.5 μm and a two component magnetic carrier having a number average particle size of 40 μm, the diameter of the discharge opening 3*a* is preferably not less than 0.05 mm (0.002 $mm^2$ in the opening area).

If, however, the size of the discharge opening 3*a* is too close to the particle size of the developer, the energy required for discharging a desired amount from the developer supply container 1, that is, the energy required for operating the pump portion 2*b* is large. It may be the case that a restriction is imparted to the manufacturing of the developer supply container 1. In order to mold the discharge opening 3*a* in a resin material part using an injection molding method, a metal mold part for forming the discharge opening 3*a* is used, and the durability of the metal mold part will be a problem. From the foregoing, the diameter φ of the discharge opening 3*a* is preferably not less than 0.5 mm.

In this example, the configuration of the discharge opening 3*a* is circular, but this is not inevitable. A square, a rectangular, an ellipse or a combination of lines and curves or the like are usable if the opening area is not more than 12.6 $mm^2$ which is the opening area corresponding to the diameter of 4 mm.

However, a circular discharge opening has a minimum circumferential edge length among the configurations having the same opening area, the edge being contaminated by the deposition of the developer. Therefore, the amount of the developer dispersing with the opening and closing operation of the shutter 4 is small, and therefore, the contamination is decreased. In addition, with the circular discharge opening, a resistance during discharging is also small, and a discharging property is high. Therefore, the configuration of the discharge opening 3*a* is preferably circular which is excellent in the balance between the discharge amount and the contamination prevention.

From the foregoing, the size of the discharge opening 3*a* is preferably such that the developer is not discharged sufficiently only by the gravitation in the state that the discharge opening 3*a* is directed downwardly (supposed supplying attitude into the developer replenishing apparatus 201). More particularly, a diameter ø of the discharge opening 3*a* is not less than 0.05 mm (0.002 $mm^2$ in the opening area) and not more than 4 mm (12.6 $mm^2$ in the opening area). Furthermore, the diameter ø of the discharge opening 3*a* is preferably not less than 0.5 mm (0.2 $mm^2$ in the opening area and not more than 4 mm (12.6 $mm^2$ in the opening area). In this example, on the basis of the foregoing investigation, the discharge opening 3*a* is circular, and the diameter φ of the opening is 2 mm.

In this example, the number of discharge openings 3*a* is one, but this is not inevitable, and a plurality of discharge openings 3*a* a total opening area of the opening areas satisfies the above-described range. For example, in place of one developer receiving port 13 having a diameter φ of 2 mm, two discharge openings 3*a* each having a diameter q of 0.7 mm are employed. However, in this case, the discharge amount of the developer per unit time tends to decrease, and therefore, one discharge opening 3*a* having a diameter φ of 2 mm is preferable.

(Cylindrical Portion)

Referring to FIGS. 6, 7, the cylindrical portion 2*k* functioning as the developer accommodating chamber will be described.

As shown in FIGS. 6, 7, the developer accommodating portion 2 includes the hollow cylindrical portion 2*k* expanding in the rotational axis direction of the developer accommodating portion 2. An inner surface of the cylindrical portion 2*k* is provided with a feeding portion 2*c* which is projected and extended helically, the feeding portion 2*c* functioning as means for feeding the developer accommodated in the developer accommodating portion 2 toward the discharging portion 3*h* (discharge opening 3*a*) functioning as the developer discharging chamber, with rotation of the cylindrical portion 2*k*.

The cylindrical portion 2*k* is fixed to the pump portion 2*b* at one longitudinal end thereof by an adhesive material so that they are rotatable integrally with each other. The cylindrical portion 2*k* is formed by a blow molding method from an above-described resin material.

In order to increase a filling capacity by increasing the volume of the developer supply container 1, it would be considered that the height of the flange portion 3 as the developer accommodating portion is increased to increase the volume thereof. However, with such a structure, the gravitation to the developer adjacent the discharge opening 3*a* increases due to the increased weight of the developer. As a result, the developer adjacent the discharge opening 3*a* tends to be compacted with the result of obstruction to the suction/discharging through the discharge opening 3*a*. In this case, in order to loosen the developer compacted by the suction through the discharge opening 3*a* or in order to discharge the developer by the discharging, the internal pressure (peak values of the negative pressure, positive pressure) of the developer accommodating portion has to be increased by increasing the amount of the volume change of the pump portion 2*b*. As a result, the driving force for driving the pump portion 2*b* has to be increased, and the load to the main assembly of the image forming apparatus 100 may be increased to an extreme extent.

In this example, the cylindrical portion 2*k* extends in the horizontal direction from the flange portion 3, and therefore, the thickness of the developer layer on the discharge opening 3*a* in the developer supply container 1 can be made small as compared with the above-described high structure. By doing so, the developer does not tend to be compacted by the gravitation, and therefore, the developer can be discharged stably without large load to the main assembly of the image forming apparatus 100.

(Pump Portion)

Referring to FIGS. 7, 11, the description will be made as to the pump portion (reciprocable pump) 2*b* in which the volume thereof changes with reciprocation. Part (a) of FIG. 11 a sectional view of the developer supply container 1 in which the pump portion 2*b* is expanded to the maximum extent in operation of the developer supplying step, and part (b) of FIG. 11 a sectional view of the developer supply container 1 in which the pump portion 2*b* is compressed to the maximum extent in operation of the developer supplying step.

The pump portion 2*b* of this example functions as a suction and discharging mechanism for repeating the suction operation and the discharging operation alternately through the discharge opening 3*a*. In other words, the pump portion 2*b* functions as an air flow generating mechanism for generating repeatedly and alternately air flow into the developer supply container and air flow out of the developer supply container through the discharge opening 3*a*.

As shown in part (b) of FIG. 7, the pump portion 2*b* is provided between the discharging portion 3*h* and the cylindrical portion 2*k*, and is fixedly connected to the cylindrical portion 2*k*. Thus, the pump portion 2*b* is rotatable integrally with the cylindrical portion 2*k*.

In the pump portion 2*b* of this example, the developer can be accommodated therein. The developer accommodating space in the pump portion 2*b* has a significant function of fluidizing the developer in the suction operation, as will be described hereinafter.

In this example, the pump portion 2*b* is a displacement type pump (bellow-like pump) of resin material in which the volume thereof changes with the reciprocation. More particularly, as shown in (a)-(b) of FIG. 7, the bellow-like pump includes crests and bottoms periodically and alternately. The pump portion 2*b* repeats the compression and the expansion alternately by the driving force received from the developer replenishing apparatus 201. In this example, the volume change by the expansion and contraction is 15 $cm^3$ (cc). As shown in part (d) of FIG. 7, a total length L2 (most expanded state within the expansion and contraction range in operation) of the pump portion 2*b* is approx. 50 mm, and a maximum outer diameter (largest state within the expansion and contraction range in operation) R2 of the pump portion 2*b* is approx. 65 mm.

With use of such a pump portion 2*b*, the internal pressure of the developer supply container 1 (developer accommodating portion 2 and discharging portion 3*h*) higher than the ambient pressure and the internal pressure lower than the ambient pressure are produced alternately and repeatedly at a predetermined cyclic period (approx. 0.9 sec in this example). The ambient pressure is the pressure of the ambient condition in which the developer supply container 1 is placed. As a result, the developer in the discharging portion 3*h* can be discharged efficiently through the small diameter discharge opening 3*a* (diameter of approx. 2 mm).

As shown in part (b) of FIG. 7, the pump portion 2*b* is connected to the discharging portion 3*h* rotatably relative thereto in the state that a discharging portion 3*h* side end is compressed against a ring-like sealing member 5 provided on an inner surface of the flange portion 3.

By this, the pump portion 2*b* rotates sliding on the sealing member 5, and therefore, the developer does not leak from the pump portion 2*b*, and the hermetical property is maintained, during rotation. Thus, in and out of the air through the discharge opening 3*a* are carries out properly, and the internal pressure of the developer supply container 1 (pump portion 2*b*, developer accommodating portion 2 and discharging portion 3*h*) are changed properly, during supply operation.

(Drive Receiving Mechanism)

The description will be made as to a drive receiving mechanism (drive inputting portion, driving force receiving portion) of the developer supply container 1 for receiving the rotational force for rotating the feeding portion 2*c* from the developer replenishing apparatus 201.

As shown in part (a) of FIG. 7, the developer supply container 1 is provided with a gear portion 2*a* which functions as a drive receiving mechanism (drive inputting portion, driving force receiving portion) engageable (driving connection) with a driving gear 300 (functioning as driving mechanism) of the developer replenishing apparatus 201. The gear portion 2*a* is fixed to one longitudinal end portion of the pump portion 2*b*. Thus, the gear portion 2*a*, the pump portion 2*b*, and the cylindrical portion 2*k* are integrally rotatable.

Therefore, the rotational force inputted to the gear portion 2*a* from the driving gear 300 is transmitted to the cylindrical portion 2*k* (feeding portion 2*c*) a pump portion 2*b*.

In other words, in this example, the pump portion 2*b* functions as a drive transmission mechanism for transmitting the rotational force inputted to the gear portion 2*a* to the feeding portion 2*c* of the developer accommodating portion 2.

For this reason, the bellow-like pump portion 2*b* of this example is made of a resin material having a high property against torsion or twisting about the axis within a limit of not adversely affecting the expanding-and-contracting operation.

In this example, the gear portion 2*a* is provided at one longitudinal end (developer feeding direction) of the developer accommodating portion 2, that is, at the discharging portion 3*h* side end, but this is not inevitable, and the gear portion 2*a* may be provided at the other longitudinal end side of the developer accommodating portion 2, that is, the trailing end portion. In such a case, the driving gear 300 is provided at a corresponding position.

In this example, a gear mechanism is employed as the driving connection mechanism between the drive inputting portion of the developer supply container 1 and the driver of the developer replenishing apparatus 201, but this is not inevitable, and a known coupling mechanism, for example is usable. More particularly, in such a case, the structure may be such that a non-circular recess is provided in a bottom surface of one longitudinal end portion (righthand side end surface of (d) of FIG. 7) as a drive inputting portion, and correspondingly, a projection having a configuration corresponding to the recess as a driver for the developer replenishing apparatus 201, so that they are in driving connection with each other.

(Drive Converting Mechanism)

A drive converting mechanism (drive converting portion) for the developer supply container 1 will be described. In this example, a cam mechanism is taken as an example of the drive converting mechanism, but this is not inevitable, and other mechanisms which will be described hereinafter, and other known mechanisms can be employed.

The developer supply container 1 is provided with the cam mechanism which functions as the drive converting mechanism (drive converting portion) for converting the rotational force for rotating the feeding portion 2*c* received by the gear portion 2*a* to a force in the reciprocating directions of the pump portion 2*b*.

In this example, one drive inputting portion (gear portion 2*a*) receives the driving force for driving the feeding portion 2*c* and the pump portion 2*b*, and the rotational force received by the gear portion 2*a* is converted to a reciprocation force in the developer supply container 1 side.

Because of this structure, the structure of the drive inputting mechanism for the developer supply container 1 is simplified as compared with the case of providing the developer supply container 1 with two separate drive inputting portions. In addition, the drive is received by a single driving gear of developer replenishing apparatus 201, and therefore, the driving mechanism of the developer replenishing apparatus 201 is also simplified.

In the case that the reciprocation force is received from the developer replenishing apparatus 201, there is a liability that the driving connection between the developer replenishing apparatus 201 and the developer supply container 1 is not proper, and therefore, the pump portion 2*b* is not driven. More particularly, when the developer supply container 1 is taken out of the image forming apparatus 100 and then is mounted again, the pump portion 2*b* may not be properly reciprocated.

For example, when the drive input to the pump portion 2*b* stops in a state that the pump portion 2*b* is compressed from the normal length, the pump portion 2*b* restores spontaneously to the normal length when the developer supply container is taken out. In this case, the position of the drive inputting portion for the pump portion changes when the developer supply container 1 is taken out, despite the fact that a stop position of the drive outputting portion of the image forming apparatus 100 side remains unchanged. As a result, the driving connection is not properly established between the drive outputting portion of the image forming apparatus 100 side and pump portion 2*b* drive inputting portion of the developer supply container 1 side, and therefore, the pump portion 2*b* cannot be reciprocated. Then, the developer supply is not carries out, and sooner or later, the image formation becomes impossible.

Such a problem may similarly arise when the expansion and contraction state of the pump portion 2*b* is changed by the user while the developer supply container 1 is outside the apparatus.

Such a problem similarly arises when developer supply container 1 is exchanged with a new one.

The structure of this example is substantially free of such a problem. This will be described in detail.

As shown in FIGS. 7, 11, the outer surface of the cylindrical portion 2*k* of the developer accommodating portion 2 is provided with a plurality of cam projections 2*d* functioning as a rotatable portion substantially at regular intervals in the circumferential direction. More particularly, two cam projections 2*d* are disposed on the outer surface of the cylindrical portion 2*k* at diametrically opposite positions, that is, approx. 180° opposing positions.

The number of the cam projections 2*d* may be at least one. However, there is a liability that a moment is produced in the drive converting mechanism and so on by a drag at the time of expansion or contraction of the pump portion 2*b*, and therefore, smooth reciprocation is disturbed, and therefore, it is preferable that a plurality of them are provided so that the relation with the configuration of the cam groove 3*b* which will be described hereinafter is maintained.

On the other hand, a cam groove 3*b* engaged with the cam projections 2*d* is formed in an inner surface of the flange portion 3 over an entire circumference, and it functions as a follower portion. Referring to FIG. 12, the cam groove 3*b* will be described. In FIG. 12, an arrow A indicates a rotational moving direction of the cylindrical portion 2*k* (moving direction of cam projection 2*d*), an arrow B indicates a direction of expansion of the pump portion 2*b*, and an arrow C indicates a direction of compression of the pump portion 2*b*. Here, an angle α is formed between a cam groove 3*c* and a rotational moving direction A of the cylindrical portion 2*k*, and an angle β is formed between a cam groove 3*d* and the rotational moving direction A. In addition, an amplitude (=length of expansion and contraction of pump portion 2*b*) in the expansion and contracting directions B, C of the pump portion 2*b* of the cam groove is L.

As shown in FIG. 12 illustrating the cam groove 3*b* in a developed view, a groove portion 3*c* inclining from the cylindrical portion 2*k* side toward the discharging portion 3*h* side and a groove portion 3*d* inclining from the discharging portion 3*h* side toward the cylindrical portion 2*k* side are connected alternately. In this example, α=β.

Therefore, in this example, the cam projection 2*d* and the cam groove 3*b* function as a drive transmission mechanism to the pump portion 2*b*. More particularly, the cam projection 2*d* and the cam groove 3*b* function as a mechanism for converting the rotational force received by the gear portion 2*a* from the driving gear 300 to the force (force in the rotational axis direction of the cylindrical portion 2*k*) in the directions of reciprocal movement of the pump portion 2*b* and for transmitting the force to the pump portion 2*b*.

More particularly, the cylindrical portion 2*k* is rotated with the pump portion 2*b* by the rotational force inputted to the gear portion 2*a* from the driving gear 300, and the cam projections 2*d* are rotated by the rotation of the cylindrical portion 2*k*. Therefore, by the cam groove 3*b* engaged with the cam projection 2*d*, the pump portion 2*b* reciprocates in the rotational axis direction (X direction of FIG. 7) together with the cylindrical portion 2*k*. The X direction is substantially parallel with the M direction of FIGS. 2, 6.

In other words, the cam projection 2*d* and the cam groove 3*b* convert the rotational force inputted from the driving gear 300 so that the state in which the pump portion 2*b* is expanded (part (a) of FIG. 11) and the state in which the pump portion 2*b* is contracted (part (b) of FIG. 11) are repeated alternately.

Thus, in this example, the pump portion 2*b* rotates with the cylindrical portion 2*k*, and therefore, when the developer in the cylindrical portion 2*k* moves in the pump portion 2*b*, the developer can be stirred (loosened) by the rotation of the pump portion 2*b*. In this example, the pump portion 2*b* is provided between the cylindrical portion 2*k* and the discharging portion 3*h*, and therefore, stirring action can be imparted on the developer fed to the discharging portion 3*h*, which is further advantageous.

Furthermore, as described above, in this example, the cylindrical portion 2*k* reciprocates together with the pump portion 2*b*, and therefore, the reciprocation of the cylindrical portion 2*k* can stir (loosen) the developer inside cylindrical portion 2*k*.

(Set Conditions of Drive Converting Mechanism)

In this example, the drive converting mechanism effects the drive conversion such that an amount (per unit time) of developer feeding to the discharging portion 3*h* by the rotation of the cylindrical portion 2*k* is larger than a discharging amount (per unit time) to the developer replenishing apparatus 201 from the discharging portion 3*h* by the pump function.

This is, because if the developer discharging power of the pump portion 2*b* is higher than the developer feeding power of the feeding portion 2*c* to the discharging portion 3*h*, the amount of the developer existing in the discharging portion 3*h* gradually decreases. In other words, it is avoided that the time period required for supplying the developer from the developer supply container 1 to the developer replenishing apparatus 201 is prolonged.

In the drive converting mechanism of this example, the feeding amount of the developer by the feeding portion 2*c* to the discharging portion 3*h* is 2.0 g/s, and the discharge amount of the developer by pump portion 2*b* is 1.2 g/s.

In addition, in the drive converting mechanism of this example, the drive conversion is such that the pump portion 2*b* reciprocates a plurality of times per one full rotation of the cylindrical portion 2*k*. This is for the following reasons.

In the case of the structure in which the cylindrical portion 2*k* is rotated inner the developer replenishing apparatus 201, it is preferable that the driving motor 500 is set at an output required to rotate the cylindrical portion 2*k* stably at all times. However, from the standpoint of reducing the energy consumption in the image forming apparatus 100 as much as possible, it is preferable to minimize the output of the driving motor 500. The output required by the driving motor 500 is calculated from the rotational torque and the rotational frequency of the cylindrical portion 2*k*, and therefore, in order to reduce the output of the driving motor 500, the rotational frequency of the cylindrical portion 2*k* is minimized.

However, in the case of this example, if the rotational frequency of the cylindrical portion 2*k* is reduced, a number of operations of the pump portion 2*b* per unit time decreases, and therefore, the amount of the developer (per unit time) discharged from the developer supply container 1 decreases. In other words, there is a possibility that the developer amount discharged from the developer supply container 1 is insufficient to quickly meet the developer supply amount required by the main assembly of the image forming apparatus 100.

If the amount of the volume change of the pump portion 2*b* is increased, the developer discharging amount per unit cyclic period of the pump portion 2*b* can be increased, and therefore, the requirement of the main assembly of the image forming apparatus 100 can be met, but doing so gives rise to the following problem.

If the amount of the volume change of the pump portion 2*b* is increased, a peak value of the internal pressure (positive pressure) of the developer supply container 1 in the discharging step increases, and therefore, the load required for the reciprocation of the pump portion 2*b* increases.

For this reason, in this example, the pump portion 2*b* operates a plurality of cyclic periods per one full rotation of the cylindrical portion 2*k*. By this, the developer discharge amount per unit time can be increased as compared with the case in which the pump portion 2*b* operates one cyclic period per one full rotation of the cylindrical portion 2*k*, without increasing the volume change amount of the pump portion 2*b*. Corresponding to the increase of the discharge amount of the developer, the rotational frequency of the cylindrical portion 2*k* can be reduced.

Verification experiments were carried out as to the effects of the plural cyclic operations per one full rotation of the cylindrical portion 2*k*. In the experiments, the developer is filled into the developer supply container 1, and a developer discharge amount and a rotational torque of the cylindrical portion 2*k* are measured. Then, the output (=rotational torque×rotational frequency) of the driving motor 500 required for rotation a cylindrical portion 2*k* is calculated from the rotational torque of the cylindrical portion 2*k* and the preset rotational frequency of the cylindrical portion 2*k*. The experimental conditions are that the number of operations of the pump portion 2*b* per one full rotation of the cylindrical portion 2*k* is two, the rotational frequency of the cylindrical portion 2*k* is 30 rpm, and the volume change of the pump portion 2*b* is 15 $cm^3$.

As a result of the verification experiment, the developer discharging amount from the developer supply container 1 is approx. 1.2 g/s. The rotational torque of the cylindrical portion 2*k* (average torque in the normal state) is 0.64N·m, and the output of the driving motor 500 is approx. 2W (motor load (W)=0.1047×rotational torque (N·m)×rotational frequency (rpm), wherein 0.1047 is the unit conversion coefficient) as a result of the calculation.

Comparative experiments were carried out in which the number of operations of the pump portion 2*b* per one full rotation of the cylindrical portion 2*k* was one, the rotational frequency of the cylindrical portion 2*k* was 60 rpm, and the other conditions were the same as the above-described experiments. In other words, the developer discharge amount was made the same as with the above-described experiments, i.e. approx. 1.2 g/s.

As a result of the comparative experiments, the rotational torque of the cylindrical portion 2*k* (average torque in the normal state) is 0.66N·m, and the output of the driving motor 500 is approx. 4W by the calculation.

From these experiments, it has been confirmed that the pump portion 2*b* carries out preferably the cyclic operation a plurality of times per one full rotation of the cylindrical portion 2*k*. In other words, it has been confirmed that by doing so, the discharging performance of the developer supply container 1 can be maintained with a low rotational frequency of the cylindrical portion 2*k*. With the structure of this example, the required output of the driving motor 500 may be low, and therefore, the energy consumption of the main assembly of the image forming apparatus 100 can be reduced.

(Position of Drive Converting Mechanism)

As shown in FIGS. 7, 11, in this example, the drive converting mechanism (cam mechanism constituted by the cam projection 2*d* and the cam groove 3*b*) is provided outside of developer accommodating portion 2. More particularly, the drive converting mechanism is disposed at a position separated from the inside spaces of the cylindrical portion 2*k*, the pump portion 2*b* and the flange portion 3, so that the drive converting mechanism does not contact the developer accommodated inside the cylindrical portion 2*k*, the pump portion 2*b* and the flange portion 3.

By this, a problem which may arise when the drive converting mechanism is provided in the inside space of the developer accommodating portion 2 can be avoided. More particularly, the problem is that by the developer entering portions of the drive converting mechanism where sliding motions occur, the particles of the developer are subjected to heat and pressure to soften and therefore, they agglomerate into masses (coarse particle), or they enter into a converting mechanism with the result of torque increase. The problem can be avoided.

(Developer Supplying Step)

Referring to FIG. 11, a developer supplying step by the pump portion will be described.

In this example, as will be described hereinafter, the drive conversion of the rotational force is carries out by the drive converting mechanism so that the suction step (suction operation through discharge opening 3*a*) and the discharging step (discharging operation through the discharge opening 3*a*) are repeated alternately. The suction step and the discharging step will be described.

(Suction Step)

First, the suction step (suction operation through discharge opening 3*a*) will be described.

As shown in part (a) of FIG. 11, the suction operation is effected by the pump portion 2*b* being expanded in a direction indicated by ω by the above-described drive converting mechanism (cam mechanism).

More particularly, by the suction operation, a volume of a portion of the developer supply container 1 (pump portion 2*b*, cylindrical portion 2*k* and flange portion 3) which can accommodate the developer increases.

At this time, the developer supply container 1 is substantially hermetically sealed except for the discharge opening 3*a*, and the discharge opening 3*a* is plugged substantially by the developer T. Therefore, the internal pressure of the developer supply container 1 decreases with the increase of the volume of the portion of the developer supply container 1 capable of containing the developer T.

At this time, the internal pressure of the developer supply container 1 is lower than the ambient pressure (external air pressure). For this reason, the air outside the developer supply container 1 enters the developer supply container 1 through the discharge opening 3*a* by a pressure difference between the inside and the outside of the developer supply container 1.

At this time, the air is taken-in from the outside of the developer supply container 1, and therefore, the developer T in the neighborhood of the discharge opening 3*a* can be loosened (fluidized). More particularly, the air impregnated into the developer powder existing in the neighborhood of the discharge opening 3*a*, thus reducing the bulk density of the developer powder T and fluidizing.

Since the air is taken into the developer supply container 1 through the discharge opening 3*a*, the internal pressure of the developer supply container 1 changes in the neighborhood of the ambient pressure (external air pressure) despite the increase of the volume of the developer supply container 1.

In this manner, by the fluidization of the developer T, the developer T does not pack or clog in the discharge opening 3*a*, so that the developer can be smoothly discharged through the discharge opening 3*a* in the discharging operation which will be described hereinafter. Therefore, the amount of the developer T (per unit time) discharged through the discharge opening 3*a* can be maintained substantially at a constant level for a long term.

(Discharging Step)

The discharging step (discharging operation through the discharge opening 3*a*) will be described.

As shown in part (b) of FIG. 11, the discharging operation is effected by the pump portion 2*b* being compressed in a direction indicated by γ by the above-described drive converting mechanism (cam mechanism). More particularly, by the discharging operation, a volume of a portion of the developer supply container 1 (pump portion 2*b*, cylindrical portion 2*k* and flange portion 3) which can accommodate the developer decreases. At this time, the developer supply container 1 is substantially hermetically sealed except for the discharge opening 3*a*, and the discharge opening 3*a* is plugged substantially by the developer T until the developer is discharged. Therefore, the internal pressure of the developer supply container 1 rises with the decrease of the volume of the portion of the developer supply container 1 capable of containing the developer T.

Since the internal pressure of the developer supply container 1 is higher than the ambient pressure (the external air pressure), the developer T is pushed out by the pressure difference between the inside and the outside of the developer supply container 1, as shown in part (b) of FIG. 11. That is, the developer T is discharged from the developer supply container 1 into the developer replenishing apparatus 201.

Also air in the developer supply container 1 is also discharged with the developer T, and therefore, the internal pressure of the developer supply container 1 decreases.

As described in the foregoing, according to this example, the discharging of the developer can be effected efficiently using one reciprocation type pump, and therefore, the mechanism for the developer discharging can be simplified.

(Change of Internal Pressure of Developer Supply Container)

Verification experiments were carried out as to a change of the internal pressure of the developer supply container 1. The verification experiments will be described.

The developer is filled such that the developer accommodating space in the developer supply container 1 is filled with the developer; and the change of the internal pressure of the developer supply container 1 is measured when the pump portion 2*b* is expanded and contracted in the range of 15 $cm^3$ of volume change. The internal pressure of the developer supply container 1 is measured using a pressure gauge (AP-C40 available from Kabushiki Kaisha KEYENCE) connected with the developer supply container 1.

FIG. 13 shows a pressure change when the pump portion 2*b* is expanded and contracted in the state that the shutter 4 of the developer supply container 1 filled with the developer is open, and therefore, in the communicatable state with the outside air.

In FIG. 13, the abscissa represents the time, and the ordinate represents a relative pressure in the developer supply container 1 relative to the ambient pressure (reference (0)) (+ is a positive pressure side, and − is a negative pressure side).

When the internal pressure of the developer supply container 1 becomes negative relative to the outside ambient pressure by the increase of the volume of the developer supply container 1, the air is taken in through the discharge opening 3*a* by the pressure difference. When the internal pressure of the developer supply container 1 becomes positive relative to the outside ambient pressure by the decrease of the volume of the developer supply container 1, a pressure is imparted to the inside developer. At this time, the inside pressure eases corresponding to the discharged developer and air.

By the verification experiments, it has been confirmed that by the increase of the volume of the developer supply container 1, the internal pressure of the developer supply container 1 becomes negative relative to the outside ambient pressure, and the air is taken in by the pressure difference. In addition, it has been confirmed that by the decrease of the volume of the developer supply container 1, the internal pressure of the developer supply container 1 becomes positive relative to the outside ambient pressure, and the pressure is imparted to the inside developer so that the developer is discharged. In the verification experiments, an absolute value of the negative pressure is 0.5 kPa, and an absolute value of the positive pressure is 1.3 kPa.

As described in the foregoing, with the structure of the developer supply container 1 of this example, the internal pressure of the developer supply container 1 switches between the negative pressure and the positive pressure alternately by the suction operation and the discharging operation of the pump portion 2*b*, and the discharging of the developer is carried out properly.

As described in the foregoing, the example, a simple and easy pump capable of effecting the suction operation and the discharging operation of the developer supply container 1 is provided, by which the discharging of the developer by the air can be carries out stably while providing the developer loosening effect by the air.

In other words, with the structure of the example, even when the size of the discharge opening 3*a* is extremely small, a high discharging performance can be assured without imparting great stress to the developer since the developer can be passed through the discharge opening 3*a* in the state that the bulk density is small because of the fluidization.

In addition, in this example, the inside of the displacement type pump portion 2*b* is utilized as a developer accommodating space, and therefore, when the internal pressure is reduced by increasing the volume of the pump portion 2*b*, a additional developer accommodating space can be formed. Therefore, even when the inside of the pump portion 2*b* is filled with the developer, the bulk density can be decreased (the developer can be fluidized) by impregnating the air in the developer powder. Therefore, the developer can be filled in the developer supply container 1 with a higher density than in the conventional art.

(Developer Loosening Effect in Suction Step)

Verification has been carried out as to the developer loosening effect by the suction operation through the discharge opening 3*a* in the suction step. When the developer loosening effect by the suction operation through the discharge opening 3*a* is significant, a low discharge pressure (small volume change of the pump) is enough, in the subsequent discharging step, to start immediately the discharging of the developer from the developer supply container 1. This verification is to demonstrate remarkable enhancement of the developer loosening effect in the structure of this example. This will be described in detail.

Part (a) of FIG. 14 and part (a) of FIG. 15 are block diagrams schematically showing a structure of the developer supplying system used in the verification experiment. Part (b) of FIG. 14 and part (b) of FIG. 15 are schematic views showing a phenomenon-occurring in the developer supply container. The system of FIG. 14 is analogous to this example, and a developer supply container C is provided with a developer accommodating portion C1 and a pump portion P. By the expanding-and-contracting operation of the pump portion P, the suction operation and the discharging operation through a discharge opening (diameter φ is 2 mm (unshown)) of the developer supply container C are carried out alternately to discharge the developer into a hopper H. On the other hand, the system of FIG. 15 is a comparison example wherein a pump portion P is provided in the developer replenishing apparatus side, and by the expanding-and-contracting operation of the pump portion P, an air-supply operation into the developer accommodating portion C1 and the suction operation from the developer accommodating portion C1 are carried out alternately to discharge the developer into a hopper H. In FIGS. 14, 15, the developer accommodating portions C1 have the same internal volumes, the hoppers H have the same internal volumes, and the pump portions P have the same internal volumes (volume change amounts).

First, 200 g of the developer is filled into the developer supply container C.

Then, the developer supply container C is shaken for 15 minutes in view of the state later transportation, and thereafter, it is connected to the hopper H.

The pump portion P is operated, and a peak value of the internal pressure in the suction operation is measured as a condition of the suction step required for starting the developer discharging immediately in the discharging step. In the case of FIG. 14, the start position of the operation of the pump portion P corresponds to 480 $cm^3$ of the volume of the developer accommodating portion C1, and in the case of FIG. 15, the start position of the operation of the pump portion P corresponds to 480 $cm^3$ of the volume of the hopper H.

In the experiments of the structure of FIG. 15, the hopper H is filled with 200 g of the developer beforehand to make the conditions of the air volume the same as with the structure of FIG. 14. The internal pressures of the developer accommodating portion C1 and the hopper H are measured by the pressure gauge (AP-C40 available from Kabushiki Kaisha KEYENCE) connected to the developer accommodating portion C1.

As a result of the verification, according to the system analogous to this example shown in FIG. 14, if the absolute value of the peak value (negative pressure) of the internal pressure at the time of the suction operation is at least 1.0 kPa, the developer discharging can be immediately started in the subsequent discharging step. In the comparison example system shown in FIG. 15, on the other hand, unless the absolute value of the peak value (positive pressure) of the internal pressure at the time of the suction operation is at least 1.7 kPa, the developer discharging cannot be immediately started in the subsequent discharging step.

It has been confirmed that using the system of FIG. 14 similar to the example, the suction is carries out with the volume increase of the pump portion P, and therefore, the internal pressure of the developer accommodating portion C1 can be lower (negative pressure side) than the ambient pressure (pressure outside the container), so that the developer loosening effect is remarkably high. This is because as shown in part (b) of FIG. 14, the volume increase of the developer accommodating portion C1 with the expansion of the pump portion P provides pressure reduction state (relative to the ambient pressure) of the upper portion air layer of the developer layer T. For this reason, the forces are applied in the directions to increase the volume of the developer layer T due to the decompression (wave line arrows), and therefore, the developer layer can be loosened efficiently. Furthermore, in the system of FIG. 14, the air is taken in from the outside into the developer accommodating portion C1 by the decompression (white arrow), and the developer layer T is solved also when the air reaches the air layer R, and therefore, it is a very good system.

In the case of the system of the comparison example shown in FIG. 15, the internal pressure of the developer accommodating portion C1 is raised by the air-supply operation to the developer accommodating portion C1 up to a positive pressure (higher than the ambient pressure), and therefore, the developer is agglomerated, and the developer loosening effect is not obtained. This is because as shown in part (b) of FIG. 15, the air is fed forcedly from the outside of the developer accommodating portion C1, and therefore, the air layer R above the developer layer T becomes positive relative to the ambient pressure. For this reason, the forces are applied in the directions to decrease the volume of the developer layer T due to the pressure (wave line arrows), and therefore, the developer layer T is packed. Accordingly, with the system of FIG. 15, there is a liability that the packing of the developer layer T disables subsequent proper developer discharging step.

In order to prevent the packing of the developer layer T by the pressure of the air layer R, it would be considered that an air vent with a filter or the like is provided at a position opposing the air layer R thereby reducing the pressure rise. However, in such a case, the flow resistance of the filter or the like leads to a pressure rise of the air layer R. Even if the pressure rise were eliminated, the loosening effect by the pressure reduction state of the air layer R described above cannot be provided.

From the foregoing, the significance of the function of the suction operation a discharge opening with the volume increase of the pump portion by employing the system of this example has been confirmed.

(Modified Example of Set Condition of Cam Groove)

Referring to FIGS. 16-21, modified examples of the set condition of the cam groove 3*b* will be described. FIGS. 16-21 are developed views of cam grooves 3*b*. Referring to the developed views of FIGS. 16-21, the description will be made as to the influence to the operational condition of the pump portion 2*b* when the configuration of the cam groove 3*b* is changed.

Here, in each of FIGS. 16-21, an arrow A indicates a rotational moving direction of the developer accommodating portion 2 (moving direction of the cam projection 2*d*); an arrow B indicates the expansion direction of the pump portion 2*b*; and an arrow C indicates a compression direction of the pump portion 2*b*. In addition, a groove portion of the cam groove 3*b* for compressing the pump portion 2*b* is indicated as a cam groove 3*c*, and a groove portion for expanding the pump portion 2*b* is indicated as a cam groove 3*d*. Furthermore, an angle formed between the cam groove 3*c* and the rotational moving direction A of the developer accommodating portion 2 is $\alpha$; an angle formed between the cam groove 3*d* and the rotational moving direction A is $\beta$; and an amplitude (expansion and contraction length of the pump portion 2*b*), in the expansion and contracting directions B, C of the pump portion 2*b*, of the cam groove is L.

First, the description will be made as to the expansion and contraction length L of the pump portion 2*b*.

When the expansion and contraction length L is shortened, the volume change amount of the pump portion 2*b* decreases, and therefore, the pressure difference from the external air pressure is reduced. Then, the pressure imparted to the developer in the developer supply container 1 decreases, with the result that the amount of the developer discharged from the developer supply container 1 per one cyclic period (one reciprocation, that is, one expansion and contracting operation of the pump portion 2*b*) decreases.

From this consideration, as shown in FIG. 16, the amount of the developer discharged when the pump portion 2*b* is reciprocated once, can be decreased as compared with the structure of FIG. 12, if an amplitude L' is selected so as to satisfy $L'<L$ under the condition that the angles $\alpha$ and $\beta$ are constant. On the contrary, if $L'>L$, the developer discharge amount can be increased.

As regards the angles $\alpha$ and $\beta$ of the cam groove, when the angles are increased, for example, the movement distance of the cam projection 2*d* when the developer accommodating portion 2 rotates for a constant time increases if the rotational speed of the developer accommodating portion 2 is constant, and therefore, as a result, the expansion-and-contraction speed of the pump portion 2*b* increases.

On the other hand, when the cam projection 2*d* moves in the cam groove 3*b*, the resistance received from the cam groove 3*b* is large, and therefore, a torque required for rotating the developer accommodating portion 2 increases as a result.

For this reason, as shown in FIG. 17, if the angle $\beta'$ of the cam groove 3*d* of the cam groove 3*d* is selected so as to satisfy $\alpha'>\alpha$ and $\beta'>\beta$ without changing the expansion and contraction length L, the expansion-and-contraction speed of the pump portion 2*b* can be increased as compared with the structure of the FIG. 12. As a result, the number of expansion and contracting operations of the pump portion 2*b* per one rotation of the developer accommodating portion 2 can be increased. Furthermore, since a flow speed of the air entering the developer supply container 1 through the discharge opening 3*a* increases, the loosening effect to the developer existing in the neighborhood of the discharge opening 3*a* is enhanced.

On the contrary, if the selection satisfies $\alpha'<\alpha$ and $\beta'<\beta$, the rotational torque of the developer accommodating portion 2 can be decreased. When a developer having a high flowability is used, for example, the expansion of the pump portion 2*b* tends to cause the air entered through the discharge opening 3*a* to blow out the developer existing in the neighborhood of the discharge opening 3*a*. As a result, there is a possibility that the developer cannot be accumulated sufficiently in the discharging portion 3*h*, and therefore, the developer discharge amount decreases. In this case, by decreasing the expanding speed of the pump portion 2*b* in accordance with this selection, the blowing-out of the developer can be suppressed, and therefore, the discharging power can be improved.

If, as shown in FIG. 18, the angle of the cam groove 3*b* is selected so as to satisfy $\alpha<\beta$, the expanding speed of the pump portion 2*b* can be increased as compared with a compressing speed. On the contrary, as shown in FIG. 20, if the angle $\alpha>$ the angle $\beta$, the expanding speed of the pump portion 2*b* can be reduced as compared with the compressing speed.

By doing so, when the developer is in a highly packed state, for example, the operation force of the pump portion 2*b* is larger in a compression stroke of the pump portion 2*b* than in an expansion stroke thereof, with the result that the rotational torque for the developer accommodating portion 2 tends to be higher in the compression stroke of the pump portion 2*b*. However, in this case, if the cam groove 3*b* is constructed as shown in FIG. 18, the developer loosening effect in the expansion stroke of the pump portion 2*b* can be enhanced as compared with the structure of FIG. 12. In addition, the resistance received by the cam projection 2*d* from the cam groove 3*b* in the compression stroke of the pump portion 2*b* is small, and therefore, the increase of the rotational torque in the compression of the pump portion 2*b* can be suppressed.

As shown in FIG. 19, a cam groove 3*e* substantially parallel with the rotational moving direction (arrow A in the Figure) of the developer accommodating portion 2 may be provided between the cam grooves 3*c*, 3*d*. In this case, the cam does not function while the cam projection 2*d* is moving in the cam groove 3*e*, and therefore, a step in which the pump portion 2*b* does not carry out the expanding-and-contracting operation can be provided.

By doing so, if a process in which the pump portion 2*b* is at rest in the expanded state is provided, the developer loosening effect is improved, since then in an initial stage of the discharging in which the developer is present always in the neighborhood of the discharge opening 3*a*, the pressure reduction state in the developer supply container 1 is maintained during the rest period.

On the other hand, in a last part of the discharging, the developer is not stored sufficiently in the discharging portion 3*h*, because the amount of the developer inside the developer supply container 1 is small and because the developer existing in the neighborhood of the discharge opening 3*a* is blown out by the air entered through the discharge opening 3*a*.

In other words, the developer discharge amount tends to gradually decrease, but even in such a case, by continuing to feed the developer by rotating is developer accommodating portion 2 during the rest period with the expanded state, the discharging portion 3*h* can be filled sufficiently with the developer. Therefore, a stabilization developer discharge amount can be maintained until the developer supply container 1 becomes empty.

In addition, in the structure of FIG. 12, by making the expansion and contraction length L of the cam groove longer, the developer discharging amount per one cyclic period of the pump portion 2*b* can be increased. However, in this case, the amount of the volume change of the pump portion 2*b* increases, and therefore, the pressure difference from the external air pressure also increases. For this reason, the driving force required for driving the pump portion 2*b* also increases, and therefore, there is a liability that a drive load required by the developer replenishing apparatus 201 is excessively large.

Under the circumstances, in order to increase the developer discharge amount per one cyclic period of the pump portion 2*b* without giving rise to such a problem, the angle of the cam groove 3*b* is selected so as to satisfy $\alpha>\beta$, by which the compressing speed of a pump portion 2*b* can be increased as compared with the expanding speed.

Verification experiments were carried out as to the structure of FIG. 20.

In the experiments, the developer is filled in the developer supply container 1 having the cam groove 3*b* shown in FIG. 20; the volume change of the pump portion 2*b* is carried out in the order of the compressing operation and then the expanding operation to discharge the developer; and the discharge amounts are measured. The experimental conditions are that the amount of the volume change of the pump portion 2*b* is 50 $cm^3$, the compressing speed of the pump portion 2*b* the 180 $cm^3/s$, and the expanding speed of the pump portion 2*b* is 60 $cm^3/s$. The cyclic period of the operation of the pump portion 2*b* is approx. 1.1 seconds.

The developer discharge amounts are measured in the case of the structure of FIG. 12. However, the compressing speed and the expanding speed of the pump portion 2*b* are 90 $cm^3/s$, and the amount of the volume change of the pump portion 2*b* and one cyclic period of the pump portion 2*b* is the same as in the example of FIG. 20.

The results of the verification experiments will be described. Part (a) of FIG. 22 shows the change of the internal pressure of the developer supply container 1 in the volume change of the pump 2*b*. In part (a) of FIG. 22, the abscissa represents the time, and the ordinate represents a relative pressure in the developer supply container 1 (+ is positive pressure side, is negative pressure side) relative to the ambient pressure (reference (0)). Solid lines and broken lines are for the developer supply container 1 having the cam groove 3*b* of FIG. 20, and that of FIG. 12, respectively.

In the compressing operation of the pump portion 2*b*, the internal pressures rise with elapse of time and reach the peaks upon completion of the compressing operation, in both examples. At this time, the pressure in the developer supply container 1 changes within a positive range relative to the ambient pressure (external air pressure), and therefore, the inside developer is pressurized, and the developer is discharged through the discharge opening 3*a*.

Subsequently, in the expanding operation of the pump portion 2*b*, the volume of the pump portion 2*b* increases for the internal pressures of the developer supply container 1 decrease, in both examples. At this time, the pressure in the developer supply container 1 changes from the positive pressure to the negative pressure relative to the ambient pressure (external air pressure), and the pressure continues to apply to the inside developer until the air is taken in through the discharge opening 3*a*, and therefore, the developer is discharged through the discharge opening 3*a*.

That is, in the volume change of the pump portion 2*b*, when the developer supply container 1 is in the positive pressure state, that is, when the inside developer is pressurized, the developer is discharged, and therefore, the developer discharge amount in the volume change of the pump portion 2*b* increases with a time-integration amount of the pressure.

As shown in part (a) of FIG. 22, the peak pressure at the time of completion of the compressing operation of the pump 2*b* is 5.7 kPa with the structure of FIG. 20 and is 5.4 kPa with the structure of the FIG. 12, and it is higher in the structure of FIG. 20 despite the fact that the volume change amounts of the pump portion 2*b* are the same. This is because by increasing the compressing speed of the pump portion 2*b*, the inside of the developer supply container 1 is pressurized abruptly, and the developer is concentrated to the discharge opening 3*a* at once, with the result that a discharge resistance in the discharging of the developer through the discharge opening 3*a* becomes large. Since the discharge openings 3*a* have small diameters in both examples, the tendency is remarkable. Since the time required for one cyclic period of the pump portion is the same in both examples as shown in (a) of FIG. 22, the time integration amount of the pressure is larger in the example of the FIG. 20.

Following Table 2 shows measured data of the developer discharge amount per one cyclic period operation of the pump portion 2*b*.

TABLE 2

| | Amount of developer discharge (g) |
|---|---|
| FIG. 12 | 3.4 |
| FIG. 20 | 3.7 |
| FIG. 21 | 4.5 |

As shown in Table 2, the developer discharge amount is 3.7 g in the structure of FIG. 20, and is 3.4 g in the structure of FIG. 12, that is, it is larger in the case of FIG. 20 structure. From these results and, the results of part (a) of the FIG. 22, it has been confirmed that the developer discharge amount per one cyclic period of the pump portion 2*b* increases with the time integration amount of the pressure.

From the foregoing, by increasing the developer discharging amount per one cyclic period of the pump portion 2*b* can be increased by making the compressing speed of the pump portion 2*b* higher as compared with the expansion speed and making the peak pressure in the compressing operation of the pump portion 2*b* higher.

The description will be made as to another method for increasing the developer discharging amount per one cyclic period of the pump portion 2*b*.

With the cam groove 3*b* shown in FIG. 21, similarly to the case of FIG. 19, a cam groove 3*e* substantially parallel with the rotational moving direction of the developer accommodating portion 2 is provided between the cam groove 3*c* and the cam groove 3*d*. However, in the case of the cam groove 3*b* shown in FIG. 21, the cam groove 3*e* is provided at such a position that in a cyclic period of the pump portion 2*b*, the operation of the pump portion 2*b* stops in the state that the pump portion 2*b* is compressed, after the compressing operation of the pump portion 2*b*.

With the structure of the FIG. 21, the developer discharge amount was measured similarly. In the verification experiments for this, the compressing speed and the expanding speed of the pump portion 2*b* is 180 $cm^3/s$, and the other conditions are the same as with FIG. 20 example.

The results of the verification experiments will be described. Part (b) of the FIG. 22 shows changes of the internal pressure of the developer supply container 1 in the expanding-and-contracting operation of the pump 2*b*. Solid lines and broken lines are for the developer supply container 1 having the cam groove 3*b* of FIG. 21 and that of FIG. 20, respectively.

Also in the case of FIG. 21, the internal pressure rises with elapse of time during the compressing operation of the pump portion 2*b*, and reaches the peak upon completion of the compressing operation. At this time, similarly to FIG. 20, the pressure in the developer supply container 1 changes within the positive range, and therefore, the inside developer are discharged. The compressing speed of the pump portion 2*b* in the example of the FIG. 21 is the same as with FIG. 20 example, and therefore, the peak pressure upon completion of the compressing operation of the pump 2*b* is 5.7 kPa which is equivalent to the FIG. 20 example.

Subsequently, when the pump portion 2*b* stops in the compression state, the internal pressure of the developer supply container 1 gradually decreases. This is because the pressure produced by the compressing operation of the pump 2*b* remains after the operation stop of the pump 2*b*, and the inside developer and the air are discharged by the pressure. However, the internal pressure can be maintained at a level higher than in the case that the expanding operation is started immediately after completion of the compressing operation, and therefore, a larger amount of the developer is discharged during it.

When the expanding operation starts thereafter, similarly to the example of the FIG. 20, the internal pressure of the developer supply container 1 decreases, and the developer is discharged until the pressure in the developer supply container 1 becomes negative, since the inside developer is pressed continuously.

As time integration values of the pressure are compared as shown is part (b) of FIG. 22, it is larger in the case of FIG. 21, because the high internal pressure is maintained during the rest period of the pump portion 2*b* under the condition that the time durations in unit cyclic periods of the pump portion 2*b* in these examples are the same.

As shown in Table 2, the measured developer discharge amounts per one cyclic period of the pump portion 2*b* is 4.5 g in the case of FIG. 21, and is larger than in the case of FIG. 20 (3.7 g). From the results of the Table 2 and the results shown in part (b) of FIG. 22, it has been confirmed that the developer discharge amount per one cyclic period of the pump portion 2*b* increases with time integration amount of the pressure.

Thus, in the example of FIG. 21, the operation of the pump portion 2*b* is stopped in the compressed state, after the compressing operation. For this reason, the peak pressure in the developer supply container 1 in the compressing operation of the pump 2*b* is high, and the pressure is maintained at a level as high as possible, by which the developer discharging amount per one cyclic period of the pump portion 2*b* can be further increased.

As described in the foregoing, by changing the configuration of the cam groove 3*b*, the discharging power of the developer supply container 1 can be adjusted, and therefore, the apparatus of this embodiment can respond to a developer amount required by the developer replenishing apparatus 201 and to a property or the like of the developer to use.

In FIGS. 12, 16-21, the discharging operation and the suction operation of the pump portion 2*b* are alternately carried out, but the discharging operation and/or the suction operation may be temporarily stopped partway, and a predetermined time after the discharging operation and/or the suction operation may be resumed.

For example, it is a possible alternative that the discharging operation of the pump portion 2*b* is not carried out monotonically, but the compressing operation of the pump portion is temporarily stopped partway, and then, the compressing operation is compressed to effect discharge. The same applies to the suction operation. Furthermore, the discharging operation and/or the suction operation may be multi-step type, as long as the developer discharge amount and the discharging speed are satisfied. Thus, even when the discharging operation and/or the suction operation are divided into multi-steps, the situation is still that the discharging operation and the suction operation are alternately repeated.

As described in the foregoing, in this example, the driving force for rotating the feeding portion (helical projection 2*c*) and the driving force for reciprocating the pump portion (bellow-like pump 2*b*) are received by a single drive inputting portion (gear portion 2*a*). Therefore, the structure of the drive inputting mechanism of the developer supply container can be simplified. In addition, by the single driving mechanism (driving gear 300) provided in the developer replenishing apparatus, the driving force is applied to the developer supply container, and therefore, the driving mechanism for the developer replenishing apparatus can be simplified. Furthermore, a simple and easy mechanism can be employed positioning the developer supply container relative to the developer replenishing apparatus.

With the structure of the example, the rotational force for rotating the feeding portion received from the developer replenishing apparatus is converted by the drive converting mechanism of the developer supply container, by which the pump portion can be reciprocated properly. In other words, in a system in which the developer supply container receives the reciprocating force from the developer replenishing apparatus, the appropriate drive of the pump portion is assured.

Embodiment 2

Referring to FIG. 23 (parts (a) and (b)), structures of the Embodiment 2 will be described. Part (a) of the FIG. 23 is a schematic perspective view of the developer supply container 1, and part (b) of the FIG. 23 is a schematic sectional view illustrating a state in which a pump portion 2*b* expands. In this example, the same reference numerals as in Embodiment 1 are assigned to the elements having the corresponding functions in this embodiment, and the detailed description thereof is omitted.

In this example, a drive converting mechanism (cam mechanism) is provided together with a pump portion 2*b* in a position dividing a cylindrical portion 2*k* with respect to a rotational axis direction of the developer supply container 1, as is significantly different from Embodiment 1. The other structures are substantially similar to the structures of Embodiment 1.

As shown in part (a) of FIG. 23, in this example, the cylindrical portion 2*k* which feeds the developer toward a discharging portion 3*h* with rotation comprises a cylindrical portion 2*kl* and a cylindrical portion 2*k*2. The pump portion 2*b* is provided between the cylindrical portion 2*kl* and the cylindrical portion 2*k*2.

A cam flange portion 15 functioning as a drive converting mechanism is provided at a position corresponding to the pump portion 2*b*. An inner surface of the cam flange portion 15 is provided with a cam groove 15*a* extending over the entire circumference. On the other hand, an outer surface of the cylindrical portion 2*k*2 is provided a cam projection 2*d* functioning as a drive converting mechanism and is locked with the cam groove 15*a*.

The developer replenishing apparatus 201 is provided with a portion similar to the rotational moving direction regulating portion 11 (FIG. 2), and a lower surface thereof which functions as a holding portion for the cam flange portion 15 is held substantially non-rotatably by the portion of the developer replenishing apparatus 201. Furthermore, the developer replenishing apparatus 201 is provided with a portion similar to the rotational axis direction regulating portion 12 (FIG. 2), and one end, with respect to the rotational axis direction, the lower surface functioning as a holding portion for the cam flange portion 15 is held substantially non-rotatably by the portion.

Therefore, when a rotational force is inputted to a gear portion 2*a*, the pump portion 2*b* reciprocates together with the cylindrical portion 2*k*2 in the directions ω and γ.

As described in the foregoing, also in this example, in which the pump portion is disposed at the position dividing the cylindrical portion, the pump portion 2*b* can be reciprocated by the rotational force received from the developer replenishing apparatus 201.

Also in this example, the suction operation and the discharging operation can be effected by a single pump, and therefore, the structure of the developer discharging mechanism can be simplified. The suction operation can be effected while the inner pressure of the developer accommodating portion is reduced, and therefore, high loosening effect can be provided.

Here, the structure of Embodiment 1 in which the pump portion 2*b* is directly connected with the discharging portion 3*h* is preferable from the standpoint that the pumping action of the pump portion 2*b* can be efficiently applied to the developer stored in the discharging portion 3*h*.

In addition, the structure of Embodiment 1 is preferable in that that of Embodiment 2 requires an additional cam flange portion (drive converting mechanism) which are has to be held substantially stationarily by the developer replenishing apparatus 201. Furthermore, the structure of Embodiment 1 is preferable in that Embodiment 2 requires an additional mechanism, in the developer replenishing apparatus 201, for limiting movement of the cam flange portion 15 in the rotational axis direction of the cylindrical portion 2*k*.

This is because in Embodiment 1, the flange portion 3 is supported by the developer replenishing apparatus 201 in order to make the position of the discharge opening 3*a* substantially stationary, and one of the cam mechanisms constituting the drive converting mechanism is provided in the flange portion 3. That is the drive converting mechanism is simplified in this manner.

Embodiment 3

Referring to FIG. 24, the structures of Embodiment 3 will be described. In this example, the same reference numerals as in the foregoing embodiments are assigned to the elements having the corresponding functions in this embodiment, and the detailed description thereof is omitted.

This example is significantly different from Embodiment 1 in that a drive converting mechanism (cam mechanism) is provided at an upstream end of the developer supply container 1 with respect to the feeding direction for the developer and in that the developer in the cylindrical portion 2*k* is fed using a stirring member 2*m*. The other structures are substantially similar to the structures of Embodiment 1.

As shown in FIG. 24, in this example, the stirring member 2*m* is provided in the cylindrical portion 2*k* as the feeding portion and rotates relative to the cylindrical portion 2*k*. The stirring member 2*m* rotates by the rotational force received by the gear portion 2*a*, relative to the cylindrical portion 2*k* fixed to the developer replenishing apparatus 201 non-rotatably, by which the developer is fed in a rotational axis direction toward the discharging portion 3*h* while being stirred. More particularly, the stirring member 2*m* is provided with a shaft portion and a feeding blade portion fixed to the shaft portion.

In this example, the gear portion 2*a* as the drive inputting portion is provided at one longitudinal end portion of the developer supply container 1 (righthand side in FIG. 24), and the gear portion 2*a* is connected co-axially with the stirring member 2*m*.

In addition, a hollow cam flange portion 3*i* which is integral with the gear portion 2*a* is provided at one longitudinal end portion of the developer supply container (righthand side in FIG. 24) so as to rotate co-axially with the gear portion 2*a*. The cam flange portion 3*i* is provided with a cam groove 3*b* which extends in an inner surface over the entire inner circumference, and the cam groove 3*b* is engaged with two cam projections 2*d* provided on an outer surface of the cylindrical portion 2*k* at substantially diametrically opposite positions, respectively.

One end portion (discharging portion 3*h* side) of the cylindrical portion 2*k* is fixed to the pump portion 2*b*, and the pump portion 2*b* is fixed to a flange portion 3 at one end portion (discharging portion 3*h* side) thereof. They are fixed by welding method. Therefore, in the state that it is mounted to the developer replenishing apparatus 201, the pump portion 2*b* and the cylindrical portion 2*k* are substantially non-rotatable relative to the flange portion 3.

Also in this example, similarly to the Embodiment 1, when the developer supply container 1 is mounted to the developer replenishing apparatus 201, the flange portion 3 (discharging portion 3*h*) is prevented from the movements in the rotational moving direction and the rotational axis direction by the developer replenishing apparatus 201.

Therefore, when the rotational force is inputted from the developer replenishing apparatus 201 to the gear portion 2*a*, the cam flange portion 3*i* rotates together with the stirring member 2*m*. As a result, the cam projection 2*d* is driven by the cam groove 3*b* of the cam flange portion 3*i* so that the cylindrical portion 2*k* reciprocates in the rotational axis direction to expand and contract the pump portion 2*b*.

In this manner, by the rotation of the stirring member 2*m*, the developer is fed to the discharging portion 3*h*, and the developer in the discharging portion 3*h* is finally discharged through a discharge opening 3*a* by the suction and discharging operation of the pump portion 2*b*.

As described in the foregoing, also in the structure of this example, similarly to the Embodiments 1-2, both of the rotating operation of the stirring member 2*m* provided in the cylindrical portion 2*k* and the reciprocation of the pump portion 2*b* can be performed by the rotational force received by the gear portion 2*a* from the developer replenishing apparatus 201.

Also in this example, the suction operation and the discharging operation can be effected by a single pump, and therefore, the structure of the developer discharging mechanism can be simplified. In addition, by the suction operation through the fine discharge opening, the inside of the developer supply container is compressed and decompressed (negative pressure), and therefore, the developer can be properly loosened.

In the case of this example, the stress applied to the developer in the developer feeding step at the cylindrical portion 2*k* tends to be relatively large, and the driving torque is relatively large, and from this standpoint, the structures of Embodiments 1 and 2 are preferable.

Embodiment 4

Referring to FIG. 25 (parts (a)-(d)), structures of the Embodiment 4 will be described. Part (a) of FIG. 25 is a schematic perspective view of a developer supply container 1, (b) is an enlarged sectional view of the developer supply container 1, and (c)-(d) are enlarged perspective views of the cam portions. In this example, the same reference numerals as in the foregoing Embodiments are assigned to the elements having the corresponding functions in this embodiment, and the detailed description thereof is omitted.

This example is substantially the same as Embodiment 1 except that the pump portion 2*b* is made non-rotatable by a developer replenishing apparatus 201.

In this example, as shown in parts (a) and (b) of FIG. 25, relaying portion 2*f* is provided between a pump portion 2*b* and a cylindrical portion 2*k* of a developer accommodating portion 2. The relaying portion 2*f* is provided with two cam projections 2*d* on the outer surface thereof at the positions substantially diametrically opposed to each other, and one end thereof (discharging portion 3*h* side) is connected to and fixed to the pump portion 2*b* (welding method).

Another end (discharging portion 3*h* side) of the pump portion 2*b* is fixed to a flange portion 3 (welding method), and in the state that it is mounted to the developer replenishing apparatus 201, it is substantially non-rotatable.

A sealing member 5 is compressed between the discharging portion 3*h* side end of the cylindrical portion 2*k* and the relaying portion 2*f*, and the cylindrical portion 2*k* is unified so as to be rotatable relative to the relaying portion 2*f*. The outer peripheral portion of the cylindrical portion 2*k* is provided with a rotation receiving portion (projection) 2*g* for receiving a rotational force from a cam gear portion 7, as will be described hereinafter.

On the other hand, the cam gear portion 7 which is cylindrical is provided so as to cover the outer surface of the relaying portion 2*f*. The cam gear portion 7 is engaged with the flange portion 3 so as to be substantially stationary (movement within the limit of play is permitted), and is rotatable relative to the flange portion 3.

As shown in part (c) of FIG. 25, the cam gear portion 7 is provided with a gear portion 7*a* as a drive inputting portion for receiving the rotational force from the developer replenishing apparatus 201, and a cam groove 7*b* engaged with the cam projection 2*d*. In addition, as shown in part (d) of FIG. 25, the cam gear portion 7 is provided with a rotational engaging portion (recess) 7*c* engaged with the rotation receiving portion 2*g* to rotate together with the cylindrical portion 2*k*. Thus, by the above-described engaging relation, the rotational engaging portion (recess) 7*c* is permitted to move relative to the rotation receiving portion 2*g* in the rotational axis direction, but it can rotate integrally in the rotational moving direction.

The description will be made as to a developer supplying step of the developer supply container 1 in this example.

When the gear portion 7*a* receives a rotational force from the driving gear 300 of the developer replenishing apparatus 201, and the cam gear portion 7 rotates, the cam gear portion 7 rotates together with the cylindrical portion 2*k* because of the engaging relation with the rotation receiving portion 2*g* by the rotational engaging portion 7*c*. That is, the rotational engaging portion 7*c* and the rotation receiving portion 2*g* function to transmit the rotational force which is received by the gear portion 7*a* from the developer replenishing apparatus 201, to the cylindrical portion 2*k* (feeding portion 2*c*).

On the other hand, similarly to Embodiments 1-3, when the developer supply container 1 is mounted to the developer replenishing apparatus 201, the flange portion 3 is non-rotatably supported by the developer replenishing apparatus 201, and therefore, the pump portion 2*b* and the relaying portion 2*f* fixed to the flange portion 3 is also non-rotatable.

In addition, the movement of the flange portion 3 in the rotational axis direction is prevented by the developer replenishing apparatus 201.

Therefore, when the cam gear portion 7 rotates, a cam function occurs between the cam groove 7*b* of the cam gear portion 7 and the cam projection 2*d* of the relaying portion 2*f*. Thus, the rotational force inputted to the gear portion 7*a* from the developer replenishing apparatus 201 is converted to the force reciprocating the relaying portion 2*f* and the cylindrical portion 2*k* in the rotational axis direction of the developer accommodating portion 2. As a result, the pump portion 2*b* which is fixed to the flange portion 3 at one end position (left side in part (b) of the FIG. 25) with respect to the reciprocating direction expands and contracts in interrelation with the reciprocation of the relaying portion 2*f* and the cylindrical portion 2*k*, thus effecting a pump operation.

In this manner, with the rotation of the cylindrical portion 2*k*, the developer is fed to the discharging portion 3*h* by the feeding portion 2*c*, and the developer in the discharging portion 3*h* is finally discharged through a discharge opening 3*a* by the suction and discharging operation of the pump portion 2*b*.

As described in the foregoing, in this example, the rotational force received from the developer replenishing apparatus 201 is transmitted and converted simultaneously to the force rotating the cylindrical portion 2*k* and to the force reciprocating (expanding-and-contracting operation) the pump portion 2*b* in the rotational axis direction.

Therefore, also in this example, similarly to Embodiments 1-3, by the rotational force received from the developer replenishing apparatus 201, both of the rotating operation of the cylindrical portion 2*k* (feeding portion 2*c*) and the reciprocation of the pump portion 2*b* can be effected.

Also in this example, the suction operation and the discharging operation can be effected by a single pump, and therefore, the structure of the developer discharging mechanism can be simplified. In addition, by the suction operation through the fine discharge opening, a pressure reduction state (negative pressure state) can be provided inner the developer supply container, and therefore, the developer can be loosened properly.

Embodiment 5

Referring to parts (a) and (b) of the FIG. 26, Embodiment 5 will be described. Part (a) of the FIG. 26 is a schematic perspective view of a developer supply container 1, and part (b) is an enlarged sectional view of the developer supply container 1. In this example, the same reference numerals as in the foregoing Embodiments are assigned to the elements having the corresponding functions in this embodiment, and the detailed description thereof is omitted.

This example is significantly different from Embodiment 1 in that a rotational force received from a driving mechanism 300 of a developer replenishing apparatus 201 is converted to a reciprocating force for reciprocating a pump portion 2*b*, and then the reciprocating force is converted to a rotational force, by which a cylindrical portion 2*k* is rotated.

In this example, as shown in part (b) of the FIG. 26, a relaying portion 2*f* is provided between the pump portion 2*b* and the cylindrical portion 2*k*. The relaying portion 2*f* includes two cam projections 2*d* at substantially diametrically opposite positions, respectively, and one end sides thereof (discharging portion 3*h* side) are connected and fixed to the pump portion 2*b* by welding method.

Another end (discharging portion 3*h* side) of the pump portion 2*b* is fixed to a flange portion 3 (welding method), and in the state that it is mounted to the developer replenishing apparatus 201, it is substantially non-rotatable.

Between the one end portion of the cylindrical portion 2*k* and the relaying portion 2*f*, a sealing member 5 is compressed, and the cylindrical portion 2*k* is unified such that it is rotatable relative to the relaying portion 2*f*. An outer periphery portion of the cylindrical portion 2*k* is provided with two cam projections 2*i* at substantially diametrically opposite positions, respectively.

On the other hand, a cylindrical cam gear portion 7 is provided so as to cover the outer surfaces of the pump portion 2*b* and the relaying portion 2*f*. The cam gear portion 7 is engaged so that it is non-movable relative to the flange portion 3 in a rotational axis direction of the cylindrical portion 2*k* but it is rotatable relative thereto. The cam gear portion 7 is provided with a gear portion 7*a* as a drive inputting portion for receiving the rotational force from the developer replenishing apparatus 201, and a cam groove 7*b* engaged with the cam projection 2*d*.

Furthermore, there is provided a cam flange portion 15 covering the outer surfaces of the relaying portion 2*f* and the cylindrical portion 2*k*. When the developer supply container 1 is mounted to a mounting portion 10 of the developer replenishing apparatus 201, cam flange portion 15 is substantially non-movable. The cam flange portion 15 is provided with a cam projection 2*i* and a cam groove 15*a*.

A developer supplying step in this example will be described.

The gear portion 7*a* receives a rotational force from a driving gear 300 of the developer replenishing apparatus 201 by which the cam gear portion 7 rotates. Then, since the pump portion 2*b* and the relaying portion 2*f* are held non-rotatably by the flange portion 3, a cam function occurs between the cam groove 7*b* of the cam gear portion 7 and the cam projection 2*d* of the relaying portion 2*f*.

More particularly, the rotational force inputted to the gear portion 7*a* from the developer replenishing apparatus 201 is converted to a force reciprocation the relaying portion 2*f* in the rotational axis direction of the cylindrical portion 2*k*. As a result, the pump portion 2*b* which is fixed to the flange portion 3 at one end with respect to the reciprocating direction the left side of the part (b) of the FIG. 26) expands and contracts in interrelation with the reciprocation of the relaying portion 2*f*, thus effecting the pump operation.

When the relaying portion 2*f* reciprocates, a cam function works between the cam groove 15*a* of the cam flange portion 15 and the cam projection 2*i* by which the force in the rotational axis direction is converted to a force in the rotational moving direction, and the force is transmitted to the cylindrical portion 2*k*. As a result, the cylindrical portion 2*k* (feeding portion 2*c*) rotates. In this manner, with the rotation of the cylindrical portion 2*k*, the developer is fed to the discharging portion 3*h* by the feeding portion 2*c*, and the developer in the discharging portion 3*h* is finally discharged through a discharge opening 3*a* by the suction and discharging operation of the pump portion 2*b*.

As described in the foregoing, in this example, the rotational force received from the developer replenishing apparatus 201 is converted to the force reciprocating the pump portion 2*b* in the rotational axis direction (expanding-and-contracting operation), and then the force is converted to a force rotation the cylindrical portion 2*k* and is transmitted.

Therefore, also in this example, similarly to Embodiments 1-4, by the rotational force received from the developer replenishing apparatus 201, both of the rotating operation of the cylindrical portion 2*k* (feeding portion 2*c*) and the reciprocation of the pump portion 2*b* can be effected.

Also in this example, the suction operation and the discharging operation can be effected by a single pump, and therefore, the structure of the developer discharging mechanism can be simplified. In addition, by the suction operation through the fine discharge opening, the inside of the developer supply container is compressed and decompressed (negative pressure), and therefore, the developer can be properly loosened.

However, in this example, the rotational force inputted from the developer replenishing apparatus 201 is converted to the reciprocating force and then is converted to the force in the rotational moving direction with the result of complicated structure of the drive converting mechanism, and therefore, Embodiments 1-4 in which the re-conversion is unnecessary are preferable.

Embodiment 6

Referring to parts (a)-(b) of FIG. 27 and parts (a)-(d) of FIG. 28, Embodiment 6 will be described. Part (a) of FIG. 27 is a schematic perspective view of a developer supply container 1, part (b) is an enlarged sectional view of the developer supply container 1, and parts (a)-(d) of FIG. 28 are enlarged views of a drive converting mechanism. In parts (a)-(d) of FIG. 28, a gear ring 8 and a rotational engaging portion 8*b* are shown as always taking top positions for better illustration of the operations thereof. In this example, the same reference numerals as in the foregoing embodiments are assigned to the elements having the corresponding functions in this embodiment, and the detailed description thereof is omitted.

In this example, the drive converting mechanism employs a bevel gear, as is contrasted to the foregoing examples.

As shown in part (b) of FIG. 27, a relaying portion 2*f* is provided between a pump portion 2*b* and a cylindrical portion 2*k*. The relaying portion 2*f* is provided with an engaging projection 2*h* engaged with a connecting portion 14 which will be described hereinafter.

Another end (discharging portion 3*h* side) of the pump portion 2*b* is fixed to a flange portion 3 (welding method), and in the state that it is mounted to the developer replenishing apparatus 201, it is substantially non-rotatable.

A sealing member 5 is compressed between the discharging portion 3*h* side end of the cylindrical portion 2*k* and the relaying portion 2*f*, and the cylindrical portion 2*k* is unified so as to be rotatable relative to the relaying portion 2*f*. An outer periphery portion of the cylindrical portion 2*k* is provided with a rotation receiving portion (projection) 2*g* for receiving a rotational force from the gear ring 8 which will be described hereinafter.

On the other hand, a cylindrical gear ring 8 is provided so as to cover the outer surface of the cylindrical portion 2*k*. The gear ring 8 is rotatable relative to the flange portion 3.

As shown in parts (a) and (b) of FIG. 27, the gear ring 8 includes a gear portion 8*a* for transmitting the rotational force to the bevel gear 8 which will be described hereinafter and a rotational engaging portion (recess) 8*b* for engaging with the rotation receiving portion 2*g* to rotate together with the cylindrical portion 2*k*. By the above-described engaging relation, the rotational engaging portion (recess) 7*c* is permitted to move relative to the rotation receiving portion 2*g* in the rotational axis direction, but it can rotate integrally in the rotational moving direction.

On the outer surface of the flange portion 3, the bevel 9 is provided so as to be rotatable relative to the flange portion 3. Furthermore, the bevel 9 and the engaging projection 2*h* are connected by a connecting portion 14.

A developer supplying step of the developer supply container 1 will be described.

When the cylindrical portion 2*k* rotates by the gear portion 2*a* of the developer accommodating portion 2 receiving the rotational force from the driving gear 300 of the developer replenishing apparatus 201, gear ring 8 rotates with the cylindrical portion 2*k* since the cylindrical portion 2*k* is in engagement with the gear ring 8 by the receiving portion 2*g*. That is, the rotation receiving portion 2*g* and the rotational engaging portion 8*b* function to transmit the rotational force inputted from the developer replenishing apparatus 201 to the gear portion 2*a* to the gear ring 8.

On the other hand, when the gear ring 8 rotates, the rotational force is transmitted to the bevel gear 9 from the gear portion 8*a* so that the bevel gear 9 rotates. The rotation of the bevel gear 9 is converted to reciprocating motion of the engaging projection 2*h* through the connecting portion 14, as shown in parts (a)-(d) of the FIG. 28. By this, the relaying portion 2*f* having the engaging projection 2*h* is reciprocated. As a result, the pump portion 2*b* expands and contracts in interrelation with the reciprocation of the relaying portion 2*f* to effect a pump operation.

In this manner, with the rotation of the cylindrical portion 2*k*, the developer is fed to the discharging portion 3*h* by the feeding portion 2*c*, and the developer in the discharging portion 3*h* is finally discharged through a discharge opening 3*a* by the suction and discharging operation of the pump portion 2*b*.

Therefore, also in this example, similarly to Embodiments 1-5, by the rotational force received from the developer replenishing apparatus 201, both of the rotating operation of the cylindrical portion 2*k* (feeding portion 2*c*) and the reciprocation of the pump portion 2*b* can be effected.

Also in this example, the suction operation and the discharging operation can be effected by a single pump, and therefore, the structure of the developer discharging mechanism can be simplified. In addition, by the suction operation through the fine discharge opening, the inside of the developer supply container is compressed and decompressed (negative pressure), and therefore, the developer can be properly loosened.

In the case of the drive converting mechanism using the bevel gear 9, the number of the parts is large, and from this standpoint, Embodiments 1-5 are preferable.

Embodiment 7

Referring to FIG. 29 (parts (a)-(c)), structures of the Embodiment 7 will be described. Part (a) of FIG. 29 is an enlarged perspective view of a drive converting mechanism, and (b)-(c) are enlarged views thereof as seen from the top. In parts (b) and (c) of FIG. 29, a gear ring 8 and a rotational engaging portion 8*b* are schematically shown as being at the top for the convenience of illustration of the operation. In this example, the same reference numerals as in the foregoing embodiments are assigned to the elements having the corresponding functions in this embodiment, and the detailed description thereof is omitted.

In this embodiment, the drive converting mechanism includes a magnet (magnetic field generating means) as is significantly different from Embodiment 6.

As shown in FIG. 29 (FIG. 28 if necessary), the bevel gear 9 is provided with a rectangular parallelopiped shape magnet, and an engaging projection 2*h* of a relaying portion 2*f* is provided with a bar-like magnet 20 having a magnetic pole directed to the magnet 19. The rectangular parallelopiped shape magnet 19 has a N pole at one longitudinal end thereof and a S pole as the other end, and the orientation thereof changes with the rotation of the bevel gear 9. The bar-like magnet 20 has a S pole at one longitudinal end adjacent an outside of the container and a N pole at the other end, and it is movable in the rotational axis direction. The magnet 20 is non-rotatable by an elongated guide groove formed in the outer peripheral surface of the flange portion 3.

With such a structure, when the magnet 19 is rotated by the rotation of the bevel gear 9, the magnetic pole facing the magnet and exchanges, and therefore, attraction and repelling between the magnet 19 and the magnet 20 are repeated alternately. As a result, a pump portion 2*b* fixed to the relaying portion 2*f* is reciprocated in the rotational axis direction.

As described in the foregoing, similarly to Embodiments 1-6, the rotating operation of the feeding portion 2*c* (cylindrical portion 2*k*) and the reciprocation of the pump portion 2*b* are both effected by the rotational force received from the developer replenishing apparatus 201, in this embodiment.

Also in this example, the suction operation and the discharging operation can be effected by a single pump, and therefore, the structure of the developer discharging mechanism can be simplified. In addition, by the suction operation through the fine discharge opening, the inside of the developer supply container is compressed and decompressed (negative pressure), and therefore, the developer can be properly loosened.

In this example, the bevel gear 9 is provided with the magnet, but this is not inevitable, and another way of use of magnetic force (magnetic field) is applicable.

From the standpoint of certainty of the drive conversion, Embodiments 1-6 are preferable. In the case that the developer accommodated in the developer supply container 1 is a magnetic developer (one component magnetic toner, two component magnetic carrier), there is a liability that the developer is trapped in an inner wall portion of the container adjacent to the magnet. Then, an amount of the developer remaining in the developer supply container 1 may be large, and from this standpoint, the structures of Embodiments 1-6 are preferable.

Embodiment 8

Referring to parts (a)-(b) of FIG. 30 and parts (a)-(b) of FIG. 31, Embodiment 6 will be described. Part (a) of the FIG. 30 is a schematic view illustrating an inside of a developer supply container 1, (b) is a sectional view in a state that the pump portion 2*b* is expanded to the maximum in the developer supplying step, showing (c) is a sectional view of the developer supply container 1 in a state that the pump portion 2*b* is compressed to the maximum in the developer supplying step. Part (a) of FIG. 31 is a schematic view illustrating an inside of the developer supply container 1, and (b) is a perspective view of a rear end portion of the cylindrical portion 2*k*. In this example, the same reference numerals as in Embodiment 1 are assigned to the elements having the corresponding functions in this embodiment, and the detailed description thereof is omitted.

This embodiment is significantly different from the structures of the above-described embodiments in that the pump portion 2*b* is provided at a leading end portion of the developer supply container 1 and in that the pump portion 2*b* does not have the functions of transmitting the rotational force received from the driving gear 300 to the cylindrical portion 2*k*. More particularly, the pump portion 2*b* is provided outside a drive conversion path of the drive converting mechanism, that is, outside a drive transmission path extending from the coupling portion 2*a* (part (b) of FIG. 31) received the rotational force from the driving gear 300 to the cam groove 2*n*.

This structure is employed in consideration of the fact that with the structure of Embodiment 1, after the rotational force inputted from the driving gear 300 is transmitted to the cylindrical portion 2*k* through the pump portion 2*b*, it is converted to the reciprocation force, and therefore, the pump portion 2*b* receives the rotational moving direction always in the developer supplying step operation. Therefore, there is a liability that in the developer supplying step the pump portion 2*b* is twisted in the rotational moving direction with the results of deterioration of the pump function. This will be described in detail.

As shown in part (a) of FIG. 30, an opening portion of one end portion (discharging portion 3*h* side) of the pump portion 2*b* is fixed to a flange portion 3 (welding method), and when the container is mounted to the developer replenishing apparatus 201, the pump portion 2*b* is substantially non-rotatable with the flange portion 3.

On the other hand, a cam flange portion 15 is provided covering the outer surface of the flange portion 3 and/or the cylindrical portion 2*k*, and the cam flange portion 15 functions as a drive converting mechanism. As shown in FIG. 30, the inner surface of the cam flange portion 15 is provided with two cam projections 15*a* at diametrically opposite positions, respectively. In addition, the cam flange portion 15 is fixed to the closed side (opposite the discharging portion 3*h* side) of the pump portion 2*b*.

On the other hand, the outer surface of the cylindrical portion 2*k* is provided with a cam groove 2*n* functioning as the drive converting mechanism, the cam groove 2*n* extending over the entire circumference, and the cam projection 15*a* is engaged with the cam groove 2*n*.

Furthermore, in this embodiment, as is different from Embodiment 1, as shown in part (b) of the FIG. 31, one end surface of the cylindrical portion 2*k* (upstream side with respect to the feeding direction of the developer) is provided with a non-circular (rectangular in this example) male coupling portion 2*a* functioning as the drive inputting portion. On the other hand, the developer replenishing apparatus 201 includes non-circular (rectangular) female coupling portion) for driving connection with the male coupling portion 2*a* to apply a rotational force. The female coupling portion, similarly to Embodiment 1, is driven by a driving motor 500.

In addition, the flange portion 3 is prevented, similarly to Embodiment 1, from moving in the rotational axis direction and in the rotational moving direction by the developer replenishing apparatus 201. On the other hand, the cylindrical portion 2*k* is connected with the flange portion 3 through a seal portion 5, and the cylindrical portion 2*k* is rotatable relative to the flange portion 3. The seal portion 5 is a sliding type seal which prevents incoming and outgoing leakage of air (developer) between the cylindrical portion 2*k* and the flange portion 3 within a range not influential to the developer supply using the pump portion 2*b* and which permits rotation of the cylindrical portion 2*k*.

The developer supplying step of the developer supply container 1 will be described.

The developer supply container 1 is mounted to the developer replenishing apparatus 201, and then the cylindrical portion 2*k* receptions the rotational force from the female coupling portion of the developer replenishing apparatus 201, by which the cam groove 2*n* rotates.

Therefore, the cam flange portion 15 reciprocates in the rotational axis direction relative to the flange portion 3 and the cylindrical portion 2*k* by the cam projection 15*a* engaged with the cam groove 2*n*, while the cylindrical portion 2*k* and the flange portion 3 are prevented from movement in the rotational axis direction by the developer replenishing apparatus 201.

Since the cam flange portion 15 and the pump portion 2*b* are fixed with each other, the pump portion 2*b* reciprocates with the cam flange portion 15 (w direction and γ direction). As a result, as shown in parts (b) and (c) of FIG. 30, the pump portion 2*b* expands and contracts in interrelation with the reciprocation of the cam flange portion 15, thus effecting a pumping operation.

As described in the foregoing, also in this example, similar to the above-described embodiments, the rotational force received from the developer replenishing apparatus 201 is converted a force operating the pump portion 2*b*, in the developer supply container 1, so that the pump portion 2*b* can be operated properly.

In addition, the rotational force received from the developer replenishing apparatus 201 is converted to the reciprocation force without using the pump portion 2*b*, by which the pump portion 2*b* is prevented from being damaged due to the torsion in the rotational moving direction. Therefore, it is unnecessary to increase the strength of the pump portion 2*b*, and the thickness of the pump portion 2*b* may be small, and the material thereof may be an inexpensive one.

Furthermore, in the structure of the this example, the pump portion 2*b* is not provided between the discharging portion 3*h* and the cylindrical portion 2*k* as in Embodiments 1-7, but is disposed at a position away from the cylindrical portion 2*k* of the discharging portion 3*h*, and therefore, the amount of the developer remaining in the developer supply container 1 can be reduced.

Also in this example, the suction operation and the discharging operation can be effected by a single pump, and therefore, the structure of the developer discharging mechanism can be simplified. In addition, by the suction operation through the fine discharge opening, the inside of the developer supply container is compressed and decompressed (negative pressure), and therefore, the developer can be properly loosened.

As shown in part (a) of FIG. 31, it is a possible alternative that an inside space of the pump portion 2*b* is not used as a developer accommodating space, but a filter 17 not passing the toner but passing the air may be provided to partition between the pump portion 2*b* and the discharging portion 3*h*. With such a structure, when the pump portion 2*b* is compressed, the developer in the recessed portion of the bellow portion is not stressed. However, the structure of parts (a)-(c) of FIG. 30 is preferable from the standpoint that in the expanding stroke of the pump portion 2*b*, an additional developer accommodating space can be formed, that is, an additional space through which the developer can move is provided, so that the developer is easily loosened.

Embodiment 9

Referring to FIG. 32 (parts (a)-(c)), structures of the Embodiment 9 will be described. Parts (a)-(c) of FIG. 32 are enlarged sectional views of a developer supply container 1. In parts (a)-(c) of FIG. 32, the structures except for the pump are substantially the same as structures shown in FIGS. 30 and 31, and therefore, the detailed description there of is omitted In this example, the pump does not have the alternating peak folding portions and bottom folding portions, but it has a film-like pump 16 capable of expansion and contraction substantially without a folding portion, as shown in FIG. 32.

In this embodiment, the film-like pump 16 is made of rubber, but this is not inevitable, and flexible material such as resin film is usable.

With such a structure, when the cam flange portion 15 reciprocates in the rotational axis direction, the film-like pump 16 reciprocates together with the cam flange portion 15. As a result, as shown in parts (b) and (c) of FIG. 32, the film-like pump 16 expands and contracts interrelated with the reciprocation of the cam flange portion 15 in the directions of ω and γ, thus effecting a pumping operation.

Also in this embodiment, similarly to Embodiments 1-8, the rotational force received from the developer replenishing apparatus is converted to a force effective to operate the pump portion in the developer supply container, and therefore, the pump portion can be properly operated.

Also in this example, the suction operation and the discharging operation can be effected by a single pump, and therefore, the structure of the developer discharging mechanism can be simplified. In addition, by the suction operation through the fine discharge opening, a pressure reduction state (negative pressure state) can be provided inner the developer supply container, and therefore, the developer can be loosened properly.

Embodiment 10

Referring to FIG. 33 (parts (a)-(e)), structures of the Embodiment 10 will be described. Part (a) of FIG. 33 is a schematic perspective view of the developer supply container 1, and (b) is an enlarged sectional view of the developer supply container 1, and (c)-(e) are schematic enlarged views of a drive converting mechanism. In this example, the same reference numerals as in the foregoing embodiments are assigned to the elements having the corresponding functions in this embodiment, and the detailed description thereof is omitted.

In this example, the pump portion is reciprocated in a direction perpendicular to a rotational axis direction, as is contrasted to the foregoing embodiments.

(Drive Converting Mechanism)

Bellow type this example, as shown in parts (a)-(e) of FIG. 33, at an upper portion of the flange portion 3, that is, the discharging portion 3*h*, a pump portion 3*f* of bellow type is connected. In addition, to a top end portion of the pump portion 3*f*, a cam projection 3*g* functioning as a drive converting portion is fixed by bonding. On the other hand, at one longitudinal end surface of the developer accommodating portion 2, a cam groove 2*e* engageable with a cam projection 3*g* is formed and it function as a drive converting portion.

As shown in part (b) of FIG. 33, the developer accommodating portion 2 is fixed so as to be rotatable relative to discharging portion 3*h* in the state that a discharging portion 3*h* side end compresses a sealing member 5 provided on an inner surface of the flange portion 3.

Also in this example, with the mounting operation of the developer supply container 1, both sides of the discharging portion 3*h* (opposite end surfaces with respect to a direction perpendicular to the rotational axis direction X) are supported by the developer replenishing apparatus 201. Therefore, during the developer supply operation, the discharging portion 3*h* is substantially non-rotatable.

In addition, with the mounting operation of the developer supply container 1, a projection 3*j* provided on the outer bottom surface portion of the discharging portion 3*h* is locked by a recess provided in a mounting portion 10. Therefore, during the developer supply operation, the discharging portion 3*h* is fixed so as to be substantially non-rotatable in the rotational axis direction Here, the configuration of the cam groove 2*e* is elliptical configuration as shown in (c)-(e) of FIG. 33, As shown in (b) of FIG. 33, a plate-like partition wall 6 is provided and is effective to feed, to the discharging portion 3*h*, a developer fed by a helical projection (feeding portion) 2*c* from the cylindrical portion 2*k*. The partition wall 6 divides a part of the developer accommodating portion 2 substantially into two parts and is rotatable integrally with the developer accommodating portion 2. The partition wall 6 is provided with an inclined projection 6*a* slanted relative to the rotational axis direction of the developer supply container 1. The inclined projection 6*a* is connected with an inlet portion of the discharging portion 3*h*.

Therefore, the developer fed from the feeding portion 2*c* is scooped up by the partition wall 6 in interrelation with the rotation of the cylindrical portion 2*k*. Thereafter, with a further rotation of the cylindrical portion 2*k*, the developer slide down on the surface of the partition wall 6 by the gravity, and is fed to the discharging portion 3*h* side by the inclined projection 6*a*. The inclined projection 6*a* is provided on each of the sides of the partition wall 6 so that the developer is fed into the discharging portion 3*h* every one half rotation of the cylindrical portion 2*k*.

(Developer Supplying Step)

The description will be made as to developer supplying step from the developer supply container 1 in this example.

When the operator mounts the developer supply container 1 to the developer replenishing apparatus 201, the flange portion 3 (discharging portion 3*h*) is prevented from movement in the rotational moving direction and in the rotational axis direction by the developer replenishing apparatus 201. In addition, the pump portion 3*f* and the cam projection 3*g* are fixed to the flange portion 3, and are prevented from movement in the rotational moving direction and in the rotational axis direction, similarly.

And, by the rotational force inputted from a driving gear 300 (FIG. 6) to a gear portion 2*a*, the developer accommodating portion 2 rotates, and therefore, the cam groove 2*e* also rotates. On the other hand, the cam projection 3*g* which is fixed so as to be non-rotatable receives the force through the cam groove 2*e*, so that the rotational force inputted to the gear portion 2*a* is converted to a force reciprocating the pump portion 3*f* substantially vertically. In this example, the cam projection 3*g* is bonded on the upper surface of the pump portion 3*f*, but this is not inevitable and another structure is usable if the pump portion 3*f* is properly moved up and down. For example, a known snap hook engagement is usable, or a round rod-like cam projection 3*g* and a pump portion 3*f* having a hole engageable with the cam projection 3*g* may be used in combination.

Here, part (d) of FIG. 33 illustrates a state in which the pump portion 3*f* is most expanded, that is, the cam projection 3*g* is at the intersection between the ellipse of the cam groove 2*e* and the major axis La (point Y in (c) of FIG. 33). Part (e) of FIG. 33 illustrates a state in which the pump portion 3*f* is most contracted, that is, the cam projection 3*g* is at the intersection between the ellipse of the cam groove 2*e* and the minor axis La (point Z in (c) of FIG. 33).

The state of (d) of FIG. 33 and the state of (e) of FIG. 33 are repeated alternately at predetermined cyclic period so that the pump portion 3*f* effects the suction and discharging operation. That is the developer is discharged smoothly.

With such rotation of the cylindrical portion 2*k*, the developer is fed to the discharging portion 3*h* by the feeding portion 2*c* and the inclined projection 6*a*, and the developer in the discharging portion 3*h* is finally discharged through the discharge opening 3*a* by the suction and discharging operation of the pump portion 3*f*.

As described, also in this example, similarly to Embodiments 1-9, by the gear portion 2*a* receiving the rotational force from the developer replenishing apparatus 201, both of the rotating operation of the feeding portion 2*c* (cylindrical portion 2*k*) and the reciprocation of the pump portion 3*f* can be effected.

Since, in this example, the pump portion 3*f* is provided at a top of the discharging portion 3*h* (in the state that the developer supply container 1 is mounted to the developer replenishing apparatus 201), the amount of the developer unavoidably remaining in the pump portion 3*f* can be minimized as compared with Embodiment 1.

Also in this example, the suction operation and the discharging operation can be effected by a single pump, and therefore, the structure of the developer discharging mechanism can be simplified. In addition, by the suction operation through the fine discharge opening, the inside of the developer supply container is compressed and decompressed (negative pressure), and therefore, the developer can be properly loosened.

In this example, the pump portion 3*f* is a bellow-like pump, but it may be replaced with a film-like pump described in Embodiment 9.

In this example, the cam projection 3*g* as the drive transmitting portion is fixed by an adhesive material to the upper surface of the pump portion 3*f*, but the cam projection 3*g* is not necessarily fixed to the pump portion 3*f*. For example, a known snap hook engagement is usable, or a round rod-like cam projection 3*g* and a pump portion 3*f* having a hole engageable with the cam projection 3*g* may be used in combination. With such a structure, the similar advantageous effects can be provided.

Embodiment 11

Referring to FIGS. 34-35, the description will be made as to structures of Embodiment 11. Part of (a) of FIG. 34 is a schematic perspective view of a developer supply container 1, (b) is a schematic perspective view of a flange portion 3, (c) is a schematic perspective view of a cylindrical portion 2*k*, part (a)-(b) of FIG. 35 are enlarged sectional views of the developer supply container 1, and FIG. 36 is a schematic view of a pump portion 3*f*. In this example, the same reference numerals as in the foregoing embodiments are assigned to the elements having the corresponding functions in this embodiment, and the detailed description thereof is omitted.

In this example, a rotational force is converted to a force for forward operation of the pump portion 3*f* without converting the rotational force to a force for backward operation of the pump portion 3*f*, as is contrasted to the foregoing embodiments.

In this example, as shown in FIGS. 34-36, a bellow type pump portion 3*f* is provided at a side of the flange portion 3 adjacent the cylindrical portion 2*k*. An outer surface of the cylindrical portion 2*k* is provided with a gear portion 2*a* which extends on the full circumference. At an end of the cylindrical portion 2*k* adjacent a discharging portion 3*h*, two compressing projections 2*l* for compressing the pump portion 3*f* by abutting to the pump portion 3*f* by the rotation of the cylindrical portion 2*k* are provided at diametrically opposite positions, respectively. A configuration of the compressing projection 21 at a downstream side with respect to the rotational moving direction is slanted to gradually compress the pump portion 3*f* so as to reduce the impact upon abutment to the pump portion 3*f*. On the other hand, a configuration of the compressing projection 21 at the upstream side with respect to the rotational moving direction is a surface perpendicular to the end surface of the cylindrical portion 2*k* to be substantially parallel with the rotational axis direction of the cylindrical portion 2*k* so that the pump portion 3*f* instantaneously expands by the restoring elastic force thereof.

Similarly to Embodiment 10, the inside of the cylindrical portion 2*k* is provided with a plate-like partition wall 6 for feeding the developer fed by a helical projection 2*c* to the discharging portion 3*h*.

The description will be made as to developer supplying step from the developer supply container 1 in this example.

After the developer supply container 1 is mounted to the developer replenishing apparatus 201, cylindrical portion 2*k* which is the developer accommodating portion 2 rotates by the rotational force inputted from the driving gear 300 to the gear portion 2*a*, so that the compressing projection 2*l* rotates. At this time, when the compressing projections 2*l* abut to the pump portion 3*f*, the pump portion 3*f* is compressed in the direction of an arrow γ, as shown in part (a) of FIG. 35, so that a discharging operation is effected.

On the other hand, when the rotation of the cylindrical portion 2*k* continues until the pump portion 3*f* is released from the compressing projection 21, the pump portion 3*f* expands in the direction of an arrow ω by the self-restoring force, as shown in part (b) of FIG. 35, so that it restores to the original shape, by which the suction operation is effected.

The operations shown in FIG. 35 are alternately repeated, by which the pump portion 3*f* effects the suction and discharging operations. That is, the developer is discharged smoothly.

With the rotation of the cylindrical portion 2*k* in this manner, the developer is fed to the discharging portion 3*h* by the helical projection (feeding portion) 2*c* and the inclined projection (feeding portion) 6*a* (FIG. 33), so that the developer in the discharging portion 3*h* is finally discharged through the discharge opening 3*a* by the discharging operation of the pump portion 3*f*.

Thus, in this example, similarly to Embodiments 1-10, the rotational force received from the developer replenishing apparatus 201, both of the rotating operation of developer supply container 1 and the reciprocation of the pump portion 3*f* can be effected.

Also in this example, the suction operation and the discharging operation can be effected by a single pump, and therefore, the structure of the developer discharging mechanism can be simplified. In addition, by the suction operation through the fine discharge opening, the inside of the developer supply container is compressed and decompressed (negative pressure), and therefore, the developer can be properly loosened.

In this example, the pump portion 3*f* is compressed by the contact to the compressing projection 2*l*, and expands by the self-restoring force of the pump portion 3*f* when it is released from the compressing projection 2*l*, but the structure may be opposite.

More particularly, when the pump portion 3*f* is contacted by the compressing projection 2*l*, they are locked, and with the rotation of the cylindrical portion 2*k*, the pump portion 3*f* is forcedly expanded. With further rotation of the cylindrical portion 2*k*, the pump portion 3*f* is released, by which the pump portion 3*f* restores to the original shape by the self-restoring force (restoring elastic force). Thus, the suction operation and the discharging operation are alternately repeated.

In this example, two compressing projections 21 functioning as the drive converting mechanism are provided at the diametrically opposite positions, but this is not inevitable, and the number thereof may be one or three, for example. In addition, in place of one compressing projection, the following structure may be employed as the drive converting mechanism. For example, the configuration of the end surface opposing the pump portion of the cylindrical portion 2*k* is not a perpendicular surface relative to the rotational axis of the cylindrical portion 2*k* as in this example, but is a surface inclined relative to the rotational axis. In this case, the inclined surface acts on the pump portion to be equivalent to the compressing projection. In another alternative, a shaft portion is extended from a rotation axis at the end surface of the cylindrical portion 2*k* opposed to the pump portion toward the pump portion in the rotational axis direction, and a swash plate (disk) inclined relative to the rotational axis of the shaft portion is provided. In this case, the swash plate acts on the pump portion, and therefore, it is equivalent to the compressing projection.

In this example, there is a liability that when the pump portion 3*f* repeats the expanding-and-contracting operations for a long term, the self-restoring force of the pump portion 3*f* may be deteriorated, and from this standpoint, Embodiments 1-10 are preferable. Using the structure shown in FIG. 36, such a problem may be obviated.

As shown in FIG. 36, the compression plate 2*q* is fixed to the end surface of the pump portion 3*f* adjacent the cylindrical portion 2*k*. In addition, a spring 2*t* is provided around the pump portion 3*f* between the outer surface of the flange portion 3 and the compression plate 2*q*, and it functions as an urging member. The spring 2*t* normally urges the pump portion 3*f* in the expanding direction.

With such a structure, the self-restoration of the pump portion 3*f* when the pump portion 3*f* is released from the compressing projection 2*l* can be assisted, and therefore, the suction operation can be assured even when the expanding-and-contracting operation of the pump portion 3*f* are repeated for a long term.

Embodiment 12

Referring to FIG. 37 (parts (a) and (b)), structures of the Embodiment 12 will be described. Parts (a) and (b) of FIG. 37 are sectional views schematically illustrating a developer supply container 1.

In this example, the pump portion 3*f* is provided at the cylindrical portion 2*k*, and the pump portion 3*f* rotates together with the cylindrical portion 2*k*. In addition, in this example, the pump portion 3*f* is provided with a weight 2*v*, by which the pump portion 3*f* reciprocates with the rotation. The other structures of this example are similar to those of Embodiment 1 (FIGS. 3 and 7), and the detailed description thereof is omitted by assigning the same reference numerals to the corresponding elements.

As shown in part (a) of FIG. 37, the cylindrical portion 2*k*, the flange portion 3 and the pump portion 3*f* function as a developer accommodating space of the developer supply container 1. The pump portion 3*f* is connected to an outer periphery portion of the cylindrical portion 2*k*, and the action of the pump portion 3*f* works to the cylindrical portion 2*k* and the discharging portion 3*h*.

A drive converting mechanism of this example will be described.

One end surface of the cylindrical portion 2*k* with respect to the rotational axis direction is provided with coupling portion (rectangular configuration projection) 2*a* functioning as a drive inputting portion, and the coupling portion 2*a* receives a rotational force from the developer replenishing apparatus 201. On the top of one end of the pump portion 3*f* with respect to the reciprocation direction, the weight 2*v* are fixed. In this example, the weight functions as the drive converting mechanism.

Thus, with the integral rotation of the cylindrical portion 2*k* and the pump 3*f*, the pump portion 3*f* expands and contract in the up and down directions by the gravitation to the weight 2*v*.

More particularly, in the state of part (a) of FIG. 37, the weight takes a position upper than the pump portion 3*f*, and the pump portion 3*f* is contracted by the weight 2*v* in the direction of the gravitation (white arrow). At this time, the developer is discharged through the discharge opening 3*a* (black arrow).

On the other hand, in the state of part of FIG. 37, weight takes a position lower than the pump portion 3*f*, and the pump portion 3*f* is expanded by the weight 2*v* in the direction of the gravitation (white arrow). At this time, the suction operation is effected through the discharge opening 3*a* (black arrow), by which the developer is loosened.

Thus, in this example, similarly to Embodiments 1-11, the rotational force received from the developer replenishing apparatus 201, both of the rotating operation of developer supply container 1 and the reciprocation of the pump portion 3*f* can be effected.

Also in this example, the suction operation and the discharging operation can be effected by a single pump, and therefore, the structure of the developer discharging mechanism can be simplified. In addition, by the suction operation through the fine discharge opening, the inside of the developer supply container is compressed and decompressed (negative pressure), and therefore, the developer can be properly loosened.

In the case of this example, the pump portion 3*f* rotates about the cylindrical portion 2*k*, and therefore, the space of the mounting portion 10 of developer replenishing apparatus 201 is large, with the result of upsizing of the device, and from this standpoint, the structures of Embodiment 1-11 are preferable.

Embodiment 13

Referring to FIGS. 38-40, the description will be made as to structures of Embodiment 13. Part of FIG. 38 is a perspective view of a cylindrical portion 2*k*, and (b) is a perspective view of a flange portion 3. Parts (a) and (b) of FIG. 39 are partially sectional perspective views of a developer supply container 1, and (a) shows a state in which a rotatable shutter is open, and (b) shows a state in which the rotatable shutter is closed. FIG. 40 is a timing chart illustrating a relation between operation timing of the pump 3*f* and timing of opening and closing of the rotatable shutter. In FIG. 39, contraction is a discharging step of the pump portion 3*f*, expansion is a suction step of the pump portion 3*f*.

In this example, a mechanism for separating between a discharging chamber 3*h* and the cylindrical portion 2*k* during the expanding-and-contracting operation of the pump portion 3*f* is provided, as is contrasted to the foregoing embodiments. In this example, the separation is provided between the cylindrical portion 2*k* and the discharging portion 3*h* so that the pressure variation is produced selectively in the discharging portion 3*h* when the volume of the pump portion 3*f* of the cylindrical portion 2*k* and the discharging portion 3*h* changes. The structures of this example in the other respects are substantially the same as those of Embodiment 10 (FIG. 33), and the description thereof is omitted by assigning the same reference numerals to the corresponding elements.

As shown in part (a) of FIG. 38, one longitudinal end surface of the cylindrical portion 2*k* functions as a rotatable shutter. More particularly, said one longitudinal end surface of the cylindrical portion 2*k* is provided with a communication opening 2*r* for discharging the developer to the flange portion 3, and is provided with a closing portion 2*s*. The communication opening 2*r* has a sector-shape.

On the other hand, as shown in part (b) of FIG. 38, the flange portion 3 is provided with a communication opening 3*k* for receiving the developer from the cylindrical portion 2*k*. The communication opening 3*k* has a sector-shape configuration similar to the communication opening 2*r*, and the portion other than that is closed to provide a closing portion 3*m*.

Parts (a)-(b) of FIG. 39 illustrate a state in which the cylindrical portion 2*k* shown in part (a) of FIG. 38 and the flange portion 3 shown in part (b) of FIG. 38 have been assembled. The communication opening 2*r* and the outer surface of the communication opening 3*k* are connected with each other so and so as to compress the sealing member 5, and the cylindrical portion 2*k* is rotatable relative to the stationary flange portion 3.

With such a structure, when the cylindrical portion 2*k* is rotated relatively by the rotational force received by the gear portion 2*a*, the relation between the cylindrical portion 2*k* and the flange portion 3 are alternately switched between the communication state and the non-passage continuing state.

That is, rotation of the cylindrical portion 2*k*, the communication opening 2*r* of the cylindrical portion 2*k* becomes aligned with the communication opening 3*k* of the flange portion 3 (part (a) of FIG. 39). With a further rotation of the cylindrical portion 2*k*, the communication opening 2*r* of the cylindrical portion 2*k* becomes out of alignment with the communication opening 3*k* of the flange portion 3 so that the situation is switched to a non-communication state (part (b) of FIG. 39) in which the flange portion 3 is separated to substantially seal the flange portion 3.

Such a partitioning mechanism (rotatable shutter) for isolating the discharging portion 3*h* at least in the expanding-and-contracting operation of the pump portion 3*f* is provided for the following reasons.

The discharging of the developer from the developer supply container 1 is effected by making the internal pressure of the developer supply container 1 higher than the ambient pressure by contracting the pump portion 3*f*. Therefore, if the partitioning mechanism is not provided as in foregoing Embodiments 1-11, the space of which the internal pressure is changed is not limited to the inside space of the flange portion 3 but includes the inside space of the cylindrical portion 2*k*, and therefore, the amount of volume change of the pump portion 3*f* has to be made eager.

This is because a ratio of a volume of the inside space of the developer supply container 1 immediately after the pump portion 3*f* is contracted to its end to the volume of the inside space of the developer supply container 1 immediately before the pump portion 3*f* starts the contraction is influenced by the internal pressure.

However, when the partitioning mechanism is provided, there is no movement of the air from the flange portion 3 to the cylindrical portion 2*k*, and therefore, it is enough to change the pressure of the inside space of the flange portion 3. That is, under the condition of the same internal pressure value, the amount of the volume change of the pump portion 3*f* may be smaller when the original volume of the inside space is smaller.

In this example, more specifically, the volume of the discharging portion 3*h* separated by the rotatable shutter is 40 $cm^3$, and the volume change of the pump portion 3*f* (reciprocation movement distance) is 2 $cm^3$ (it is 15 $cm^3$ in Embodiment 1). Even with such a small volume change, developer supply by a sufficient suction and discharging effect can be effected, similarly to Embodiment 1.

As described in the foregoing, in this example, as compared with the structures of Embodiments 1-12, the volume change amount of the pump portion 3*f* can be minimized. As a result, the pump portion 3*f* can be downsized. In addition, the distance through which the pump portion 3*f* is reciprocated (volume change amount) can be made smaller. The provision of such a partitioning mechanism is effective particularly in the case that the capacity of the cylindrical portion 2*k* is large in order to make the filled amount of the developer in the developer supply container 1 is large.

Developer supplying steps in this example will be described.

In the state that developer supply container 1 is mounted to the developer replenishing apparatus 201 and the flange portion 3 is fixed, drive is inputted to the gear portion 2*a* from the driving gear 300, by which the cylindrical portion 2*k* rotates, and the cam groove 2*e* rotates. On the other hand, the cam projection 3*g* fixed to the pump portion 3*f* non-rotatably supported by the developer replenishing apparatus 201 with the flange portion 3 is moved by the cam groove 2*e*. Therefore, with the rotation of the cylindrical portion 2*k*, the pump portion 3*f* reciprocates in the up and down directions.

Referring to FIG. 40, the description will be made as to the timing of the pumping operation (suction operation and discharging operation of the pump portion 3*f* and the timing of opening and closing of the rotatable shutter, in such a structure. FIG. 40 is a timing chart when the cylindrical portion 2*k* rotates one full turn. In FIG. 40, contraction means the contracting operation of the pump portion (discharging operation of the pump portion), expansion means the expanding operation of the pump portion (suction operation by the pump portion), and rest means non-operation of the pump portion. In addition, opening means the opening state of the rotatable shutter, and close means the closing state of the rotatable shutter.

As shown in FIG. 40, when the communication opening 3*k* and the communication opening 2*r* are aligned with each other, the drive converting mechanism converts the rotational force inputted to the gear portion 2*a* so that the pumping operation of the pump portion 3*f* stops. More specifically, in this example, the structure is such that when the communication opening 3*k* and the communication opening 2*r* are aligned with each other, a radius distance from the rotation axis of the cylindrical portion 2*k* to the cam groove 2*e* is constant so that the pump portion 3*f* does not operate even when the cylindrical portion 2*k* rotates.

At this time, the rotatable shutter is in the opening position, and therefore, the developer is fed from the cylindrical portion 2*k* to the flange portion 3. More particularly, with the rotation of the cylindrical portion 2*k*, the developer is scooped up by the partition wall 6, and thereafter, it slides down on the inclined projection 6*a* by the gravity, so that the developer moves via the communication opening 2*r* and the communication opening 3*k* to the flange 3.

As shown in FIG. 40, when the non-communication state in which the communication opening 3*k* and the communication opening 2*r* are out of alignment is established, the drive converting mechanism converts the rotational force inputted to the gear portion 2*b* so that the pumping operation of the pump portion 3*f* is effected.

That is, with further rotation of the cylindrical portion 2*k*, the rotational phase relation between the communication opening 3*k* and the communication opening 2*r* changes so that the communication opening 3*k* is closed by the stop portion 2*s* with the result that the inside space of the flange 3 is isolated (non-communication state).

At this time, with the rotation of the cylindrical portion 2*k*, the pump portion 3*f* is reciprocated in the state that the non-communication state is maintained the rotatable shutter is in the closing position). More particularly, by the rotation of the cylindrical portion 2*k*, the cam groove 2*e* rotates, and the radius distance from the rotation axis of the cylindrical portion 2*k* to the cam groove 2*e* changes. By this, the pump portion 3*f* effects the pumping operation through the cam function.

Thereafter, with further rotation of the cylindrical portion 2*k*, the rotational phases are aligned again between the communication opening 3*k* and the communication opening 2*r*, so that the communicated state is established in the flange portion 3.

The developer supplying step from the developer supply container 1 is carried out while repeating these operations.

As described in the foregoing, also in this example, by the gear portion 2*a* receiving the rotational force from the developer replenishing apparatus 201, both of the rotating operation of the cylindrical portion 2*k* and the suction and discharging operation of the pump portion 3*f* can be effected.

Further, according to the structure of the this example, the pump portion 3*f* can be downsized. Furthermore, the volume change amount (reciprocation movement distance) can be reduced, and as a result, the load required to reciprocate the pump portion 3*f* can be reduced.

Also in this example, the suction operation and the discharging operation can be effected by a single pump, and therefore, the structure of the developer discharging mechanism can be simplified. In addition, by the suction operation through the fine discharge opening, the inside of the developer supply container is compressed and decompressed (negative pressure), and therefore, the developer can be properly loosened.

Moreover, in this example, no additional structure is used to receive the driving force for rotating the rotatable shutter from the developer replenishing apparatus 201, but the rotational force received for the feeding portion (cylindrical portion 2*k*, helical projection 2*c*) is used, and therefore, the partitioning mechanism is simplified.

As described above, the volume change amount of the pump portion 3*f* does not depend on the all volume of the developer supply container 1 including the cylindrical portion 2*k*, but it is selectable by the inside volume of the flange portion 3. Therefore, for example, in the case that the capacity (the diameter of the cylindrical portion 2*k* is changed when manufacturing developer supply containers having different developer filling capacity, a cost reduction effect can be expected. That is, the flange portion 3 including the pump portion 3*f* may be used as a common unit, which is assembled with different kinds of cylindrical portions 2*k*. By doing so, there is no need of increasing the number of kinds of the metal molds, thus reducing the manufacturing cost. In addition, in this example, during the non-communication state between the cylindrical portion 2*k* and the flange 3, the pump portion 3*f* is reciprocated by one cyclic period, but similarly to Embodiment 1, the pump portion 3*f* may be reciprocated by a plurality of cyclic periods.

Furthermore, in this example, throughout the contracting operation and the expanding operation of the pump portion, the discharging portion 3*h* is isolated, but this is not inevitable, and the following in an alternative. If the pump portion 3*f* can be downsized, and the volume change amount (reciprocation movement distance) of the pump portion 3*f* can be reduced, the discharging portion 3*h* may be opened slightly during the contracting operation and the expanding operation of the pump portion.

Embodiment 14

Referring to FIGS. 41-43, the description will be made as to structures of Embodiment 14. FIG. 41 is a partly sectional perspective view of a developer supply container 1. Parts (a)-(c) of FIG. 42 are a partial section illustrating an operation of a partitioning mechanism (stop valve 35). FIG. 43 is a timing chart showing timing of a pumping operation (contracting operation and expanding operation) of the pump portion 2*b* and opening and closing timing of the stop valve which will be described hereinafter. In FIG. 43, contraction means contracting operation of the pump portion 2*b* the discharging operation of the pump portion 2*b*), expansion means the expanding operation of the pump portion 2*b* (suction operation of the pump portion 2*b*). In addition, stop means a rest state of the pump portion 2*b*. In addition, opening means an open state of the stop valve 35 and close means a state in which the stop valve 35 is closed.

This example is significantly different from the above-described embodiments in that the stop valve 35 is employed as a mechanism for separating between a discharging portion 3*h* and a cylindrical portion 2*k* in an expansion and contraction stroke of the pump portion 2*b*. The structures of this example in the other respects are substantially the same as those of Embodiment 8 (FIG. 30), and the description thereof is omitted by assigning the same reference numerals to the corresponding elements. In this example, in the structure of the Embodiment 8 shown in FIG. 30, a plate-like partition wall 6 shown in FIG. 33 of Embodiment 10 is provided.

In the above-described Embodiment 13, a partitioning mechanism (rotatable shutter) using a rotation of the cylindrical portion 2*k* is employed, but in this example, a partitioning mechanism (stop valve) using reciprocation of the pump portion 2*b* is employed. The description will be made in detail.

As shown in FIG. 41, a discharging portion 3*h* is provided between the cylindrical portion 2*k* and the pump portion 2*b*. A wall portion 33 is provided at a cylindrical portion 2*k* side end of the discharging portion 3*h*, and a discharge opening 3*a* is provided lower at a left part of the wall portion 33 in the Figure. A stop valve 35 and an elastic member (seal) 34 as a partitioning mechanism for opening and closing a communication port 33*a* formed in the wall portion 33 are provided. The stop valve 35 is fixed to one internal end of the pump portion 2*b* (opposite the discharging portion 3*h*), and reciprocates in a rotational axis direction of the developer supply container 1 with expanding-and-contracting operations of the pump portion 2*b*. The seal 34 is fixed to the stop valve 35, and moves with the movement of the stop valve 35.

Referring to parts (a)-(c) of the FIG. 42 (FIG. 43 if necessary), operations of the stop valve 35 in a developer supplying step will be described.

FIG. 42 illustrates in (a) a maximum expanded state of the pump portion 2*b* in which the stop valve 35 is spaced from the wall portion 33 provided between the discharging portion 3*h* and the cylindrical portion 2*k*. At this time, the developer in the cylindrical portion 2*k* is fed into the discharging portion 3*h* through the communication port 33*a* by the inclined projection 6*a* with the rotation of the cylindrical portion 2*k*.

Thereafter, when the pump portion 2*b* contracts, the state becomes as shown in (b) of the FIG. 42. At this time, the seal 34 is contacted to the wall portion 33 to close the communication port 33*a*. That is, the discharging portion 3*h* becomes isolated from the cylindrical portion 2*k*.

When the pump portion 2*b* contracts further, the pump portion 2*b* becomes most contracted as shown in part (c) of FIG. 42.

During period from the state shown in part (b) of FIG. 42 to the state shown in part (c) of FIG. 42, the seal 34 remains contacting to the wall portion 33, and therefore, the discharging portion 3*h* is pressurized to be higher than the ambient pressure (positive pressure) so that the developer is discharged through the discharge opening 3*a*.

Thereafter, during expanding operation of the pump portion 2*b* from the state shown in (c) of FIG. 42 to the state shown in (b) of FIG. 42, the seal 34 remains contacting to the wall portion 33, and therefore, the internal pressure of the discharging portion 3*h* is reduced to be lower than the ambient pressure (negative pressure). Thus, the suction operation is effected through the discharge opening 3*a*.

When the pump portion 2*b* further expands, it returns to the state shown in part (a) of FIG. 42. In this example, the foregoing operations are repeated to carry out the developer supplying step. In this manner, in this example, the stop valve 35 is moved using the reciprocation of the pump portion, and therefore, the stop valve is opening during an initial stage of the contracting operation (discharging operation) of the pump portion 2*b* and in the final stage of the expanding operation (suction operation) thereof.

The seal 34 will be described in detail. The seal 34 is contacted to the wall portion 33 to assure the sealing property of the discharging portion 3*h*, and is compressed with the contracting operation of the pump portion 2*b*, and therefore, it is preferable to have both of sealing property and flexibility. In this example, as a sealing material having such properties, the use is made with polyurethane foam the available from Kabushiki Kaisha INOAC Corporation, Japan (tradename is MOLTOPREN, SM-55 having a thickness of 5 mm). The thickness of the sealing material in the maximum contraction state of the pump portion 2*b* is 2 mm the compression amount of 3 mm).

As described in the foregoing, the volume variation (pump function) for the discharging portion 3*h* by the pump portion 2*b* is substantially limited to the duration after the seal 34 is contacted to the wall portion 33 until it is compressed to 3 mm, but the pump portion 2*b* works in the range limited by the stop valve 35. Therefore, even when such a stop valve 35 is used, the developer can be stably discharged.

In this manner, in this example, similarly to Embodiments 1-13, by the gear portion 2*a* receiving the rotational force from the developer replenishing apparatus 201, both of the rotating operation of the cylindrical portion 2*k* and the suction and discharging operation of the pump portion 2*b* can be effected.

Furthermore, similarly to Embodiment 13, the pump portion 2*b* can be downsized, and the volume change volume of the pump portion 2*b* can be reduced. The cost reduction advantage by the common structure of the pump portion can be expected.

In addition, in this embodiment, no additional structure is used to receive the driving force for operating the stop valve 35 from the developer replenishing apparatus 201 is used, but the use is made with the reciprocation force of the pump portion 2*b*, and therefore, the partitioning mechanism can be simplified.

Furthermore, also in this example, one pump is enough for the suction operation and the discharging operation, and therefore, the structure of the developer discharging mechanism can be simplified. In addition, by the suction operation through the fine discharge opening, the inside of the developer supply container is compressed and decompressed (negative pressure), and therefore, the developer can be properly loosened.

Embodiment 15

Referring to parts (a)-(c) of FIG. 44, the structures of Embodiment 15 will be described. Part (a) of FIG. 44 is a partially sectional perspective view of the developer supply container 1, and (b) is a perspective view of the flange portion 3, and (c) is a sectional view of the developer supply container.

This example is significantly different from the foregoing embodiments in that a buffer portion 23 is provided as a mechanism separating between discharging chamber 3*h* and the cylindrical portion 2*k*. In the other respects, the structures are substantially the same as those of Embodiment 10 (FIG. 33), and therefore, the detailed description is omitted by assigning the same reference numerals to the corresponding elements.

As shown in part (b) of FIG. 44, a buffer portion 23 is fixed to the flange portion 3 non-rotatably. The buffer portion 23 is provided with a receiving port 23*a* which opens upward and a supply port 23*b* which is in fluid communication with a discharging portion 3*h*.

As shown in part (a) and (c) of FIG. 44, such a flange portion 3 is mounted to the cylindrical portion 2*k* such that the buffer portion 23 is in the cylindrical portion 2*k*. The cylindrical portion 2*k* is connected to the flange portion 3 rotatably relative to the flange portion 3 immovably supported by the developer replenishing apparatus 201. The connecting portion is provided with a ring seal to prevent leakage of air or developer.

In addition, in this example, as shown in part (a) of FIG. 44, an inclined projection 6*a* is provided on the partition wall 6 to feed the developer toward the receiving port 23*a* of the buffer portion 23.

In this example, until the developer supplying operation of the developer supply container 1 is completed, the developer in the developer accommodating portion 2 is fed through the opening 23*a* into the buffer portion 23 by the partition wall 6 and the inclined projection 6*a* with the rotation of the developer supply container 1

Therefore, as shown in part (c) of FIG. 44, the inside space of the buffer portion 23 is maintained full of the developer.

As a result, the developer filling the inside space of the buffer portion 23 substantially blocks the movement of the air toward the discharging portion 3*h* from the cylindrical portion 2*k*, so that the buffer portion 23 functions as a partitioning mechanism.

Therefore, when the pump portion 3*f* reciprocates, at least the discharging portion 3*h* can be isolated from the cylindrical portion 2*k*, and for this reason, the pump portion can be downsized, and the volume change of the pump portion can be reduced.

In this manner, in this example, similarly to Embodiments 1-14, by the rotational force received from the developer replenishing apparatus 201, both of the rotating operation of the feeding portion 2*c* (cylindrical portion 2*k*) and the reciprocation of the pump portion 3*f* can be effected.

Furthermore, similarly to Embodiments 13-14, the pump portion can be downsized, and the volume change amount of the pump portion can be reduced. Also, the pump portion can be made common, by which the cost reduction advantage is provided.

Moreover, in this example, the developer is used as the partitioning mechanism, and therefore, the partitioning mechanism can be simplified.

In addition, in this example, one pump is enough for the suction operation and the discharging operation, and therefore, the structure of the developer discharging mechanism can be simplified. Moreover, by the suction operation through the fine discharge opening, the inside of the developer supply container is compressed and decompressed (negative pressure), and therefore, the developer can be properly loosened.

Embodiment 16

Referring to FIGS. 45-46, the structures of Embodiment 16 will be described. Part (a) of FIG. 45 is a perspective view of a developer supply container 1, and (b) is a sectional view of the developer supply container 1, and FIG. 46 is a sectional perspective view of a nozzle portion 47.

In this example, the nozzle portion 47 is connected to the pump portion 2*b*, and the developer once sucked in the nozzle portion 47 is discharged through the discharge opening 3*a*, as is contrasted to the foregoing embodiments. In the other respects, the structures are substantially the same as in Embodiment 10, and the detailed description thereof is omitted by assigning the same reference numerals to the corresponding elements.

As shown in part (a) of FIG. 45, the developer supply container 1 comprises a flange portion 3 and a developer accommodating portion 2. The developer accommodating portion 2 comprises a cylindrical portion 2*k*.

In the cylindrical portion 2*k*, as shown in (b) of FIG. 45, a partition wall 6 functioning as a feeding portion extends over the entire area in the rotational axis direction. One end surface of the partition wall 6 is provided with a plurality of inclined projections 6*a* at different positions in the rotational axis direction, and the developer is fed from one end with respect to the rotational axis direction to the other end (the side adjacent the flange portion 3). The inclined projections 6*a* are provided on the other end surface of the partition wall 6 similarly. In addition, between the adjacent inclined projections 6*a*, a through-opening 6*b* for permitting passing of the developer is provided. The through-opening 6*b* functions to stir the developer. The structure of the feeding portion may be a combination of the helical projection 2*c* in the cylindrical portion 2*k* and a partition wall 6 for feeding the developer to the flange portion 3, as in the foregoing embodiments.

The flange portion 3 including the pump portion 2*b* will be described.

The flange portion 3 is connected to the cylindrical portion 2*k* rotatably through a small diameter portion 49 and a sealing member 48. In the state that the container is mounted to the developer replenishing apparatus 201, the flange portion 3 is immovably held by the developer replenishing apparatus 201 (rotating operation and reciprocation is not permitted).

In addition, as shown in FIG. 46, in the flange portion 3, there is provided a supply amount adjusting portion (flow rate adjusting portion) 50 which receives the developer fed from the cylindrical portion 2*k*. In the supply amount adjusting portion 50, there is provided a nozzle portion 47 which extends from the pump portion 2*b* toward the discharge opening 3*a*. Therefore, with the volume change of the pump 2*b*, the nozzle portion 47 sucks the developer in the supply amount adjusting portion 50, and discharges it through discharge opening 3*a*.

The structure for drive transmission to the pump portion 2*b* in this example will be described.

As described in the foregoing, the cylindrical portion 2*k* rotates when the gear portion 2*a* provided on the cylindrical portion 2*k* receives the rotation force from the driving gear 300. In addition, the rotation force is transmitted to the gear portion 43 through the gear portion 42 provided on the small diameter portion 49 of the cylindrical portion 2*k*. Here, the gear portion 43 is provided with a shaft portion 44 integrally rotatable with the gear portion 43.

One end of shaft portion 44 is rotatably supported by the housing 46. The shaft 44 is provided with an eccentric cam 45 at a position opposing the pump portion 2*b*, and the eccentric cam 45 is rotated along a track with a changing distance from the rotation axis of the shaft 44 by the rotational force transmitted thereto, so that the pump portion 2*b* is pushed down (reduced in the volume). By this, the developer in the nozzle portion 47 is discharged through the discharge opening 3*a*.

When the pump portion 2*b* is released from the eccentric cam 45, it restores to the original position by its restoring force (the volume expands). By the restoration of the pump portion (increase of the volume), suction operation is effected through the discharge opening 3*a*, and the developer existing in the neighborhood of the discharge opening 3*a* can be loosened.

By repeating the operations, the developer is efficiently discharged by the volume change of the pump portion 2*b*. As described in the foregoing, the pump portion 2*b* may be provided with an urging member such as a spring to assist the restoration (or pushing down).

The hollow conical nozzle portion 47 will be described. The nozzle portion 47 is provided with an opening 51 in a outer periphery thereof, and the nozzle portion 47 is provided at its free end with an ejection outlet 52 for ejecting the developer toward the discharge opening 3*a*.

In the developer supplying step, at least the opening 51 of the nozzle portion 47 can be in the developer layer in the supply amount adjusting portion 50, by which the pressure produced by the pump portion 2*b* can be efficiently applied to the developer in the supply amount adjusting portion 50.

That is, the developer in the supply amount adjusting portion 50 (around the nozzle 47) functions as a partitioning mechanism relative to the cylindrical portion 2*k*, so that the effect of the volume change of the pump 2*b* is applied to the limited range, that is, within the supply amount adjusting portion 50.

With such structures, similarly to the partitioning mechanisms of Embodiments 13-15, the nozzle portion 47 can provide similar effects.

As described in the foregoing, in this example, similarly to Embodiments 1-15, by the rotational force received from the developer replenishing apparatus 201, both of the rotating operation of the feeding portion 6 (cylindrical portion 2*k*) and the reciprocation of the pump portion 2*b* are effected. Similarly to Embodiments 13-15, the pump portion 2*b* and/or flange portion 3 may be made common to the advantages.

In addition in this example, one pump is enough for the suction operation and the discharging operation, and therefore, the structure of the developer discharging mechanism can be simplified. Furthermore, by the suction operation through the fine discharge opening, the inside of the developer supply container is compressed and decompressed (negative pressure), and therefore, the developer can be properly loosened.

According to this example, the developer and the partitioning mechanism are not in sliding relation as in Embodiments 13-14, and therefore, the damage to the developer can be suppressed.

Embodiment 17

Referring to FIG. 47, Embodiment 17 will be described. In this example, the same reference numerals as in Embodiment 1 are assigned to the elements having the corresponding functions in this embodiment, and the detailed description thereof is omitted.

In this example, the rotational force received from a developer replenishing apparatus 201 is converted to linear reciprocating force, by which when the pump portion 2*b* is reciprocated, not a suction operation through the discharge opening 3*a* but a discharging operation through the discharge opening 3*a* is effected. The other structures are substantially the same as those of Embodiment 8 (FIG. 30) described above.

As shown in parts (a)-(c) of FIG. 47, in this example, one end portion of the pump portion 2*b* (the side opposite the discharging portion 3*h*) is provided with an air vent 2*p*, which is opened and closed by a vent valve 18 provided inside the pump portion 2*b*.

One end portion of the cam flange portion 15 is provided with an air vent 15*b* which is in fluid communication with the air vent 2*p*. Furthermore, a filter 17 is provided to partition between the pump 2*b* and the discharging portion 3*h*, and the filter 17 permits the air to pass but substantially prevents the developer from passing.

The operation in the developer supplying step will be described.

As shown in part (b) of FIG. 47, when the pump portion 2*b* is expanded in the direction w by the above-described cam mechanism, the internal pressure of the cylindrical portion 2*k* decreases down to a level lower than the ambient pressure (external air pressure). Then, the vent valve 18 is opened by the pressure difference between the internal and external pressures of the developer supply container 1, the air outside the developer supply container 1 flows into the developer supply container 1 (pump portion 2*b*) of the developer supply container 1 through the air vents 2*p*, 15*b* as indicated by an arrow A.

Thereafter, when the pump portion 2*b* is compressed in the direction of an arrow $\gamma$ by the above-described cam mechanism as shown in part (c) of FIG. 47, the internal pressure of the developer supply container 1 (pump portion 2*b*) rises. At this time, the air vents 2*p* and 15*b* are sealed because the vent valve 18 is closed by the internal pressure rise of the developer supply container 1 (pump portion 2*b*). By this, the internal pressure of the developer supply container 1 further increases to a level higher than the ambient pressure (external air pressure), and therefore, the developer is discharged by the pressure difference between the internal and external pressure of the developer supply container 1 through the discharge opening 3*a*. That is, the developer is discharged from the developer accommodating portion 2.

As described, also in this example, similarly to Embodiments 1-16, by the rotational force received from the developer replenishing apparatus, both of the rotating operation of the developer supply container and the reciprocation of the pump portion are effected.

In addition, also in this example, one pump is enough to effect the suction operation and the discharging operation, and therefore, the structure of the developer discharging mechanism can be made simple However, with the structure of this example, the developer loosening effect by the suction operation through the discharge opening 3*a* is not expected, and therefore, the structures of Embodiments 1-16 are preferable in that the developer can be discharged while being loosened sufficiently.

Embodiment 18

Referring to FIG. 48, the structures of Embodiment 18 will be described. Parts (a) and (b) of FIG. 48 are perspective views showing an inside of a developer supply container 1.

In this example, by the expanding operation of the pump 3*f*, the air is taken in through the air vent 2*p* not through a discharge opening 3*a*. More particularly, the rotational force received from the developer replenishing apparatus 201 is converted to a reciprocating force, but the suction operation through the discharge opening 3*a* is not effected, but only the discharging operation through the discharge opening 3*a* is carried out. The other structures are substantially the same as the structures of the above-described Embodiment 13 (FIG. 39).

In this example, as shown in FIG. 48, an upper surface of the pump portion 3*f* is provided with an air vent 2*p* for taking the air in at the time of expanding operation of the pump portion 3*f*. In addition, a vent valve 18 for opening and closing the air vent 2*p* is provided inside the pump portion 3*f*.

Part (a) of FIG. 48 shows a state in which the vent valve 18 is opened by the expanding operation of the pump portion 3*f*, and the air is being taken in through the air vent 2*p* provided in the pump portion 3*f*. In this state, a rotatable shutter is open, that is, the communication opening 3*k* is not closed by the closing stop portion 2*s*, and the developer is fed from the cylindrical portion 2*k* toward the discharging portion 3*h*.

Part (b) of FIG. 48 illustrates a state in which the vent valve 18 is closed by the contracting operation of the pump portion 3*f*, and the air taking through the air vent 2*p* is prevented. At this time, the rotatable shutter is closed, that is, the communication opening 3*k* is closed by the closing portion 2*s*, and the discharging portion 3*h* is isolated from the cylindrical portion 2*k*. And, with the contracting operation of the pump portion 3*f*, the developer is discharged through the discharge opening 3*a*.

As described, also with this structure of this example, similarly to Embodiments 1-17, by the rotational force received from the developer replenishing apparatus, both of the rotating operation of the developer supply container 1 and the reciprocation of the pump portion 3*f* are effected.

However, with the structure of this example, the developer loosening effect by the suction operation through the discharge opening 3*a* is not expected, and therefore, the structures of Embodiments 1-16 are preferable from the standpoint of capability of efficient discharging of the developer with sufficient loosening of the developer.

In the foregoing, specific Embodiments 1-18 have been described as examples of the present invention, and the following modifications are possible.

For example, in Embodiments 1-18, bellow-like pumps or film-like pumps are employed as a displacement type pump portion, but the following structures are usable.

More particularly, the pump portion provided in the developer supply container 1 may be a piston pump or a plunger type pump having a dual-cylinder structure including an inner cylinder and an outer cylinder. Also in the case of using such a pump, the internal pressure of the developer supply container 1 can be alternately changed between positive pressure state (pressurized state) and the negative pressure state (pressure reduced state), and therefore, the developer can be discharged properly through the discharge opening 3*a*. However, when such a pump is used, a seal structure is required in order to prevent developer leakage through a gap between the inner cylinder and the outer cylinder, with the result of complication of the structure, and larger driving force for driving the pump portion, and from this standpoint, the examples described in the foregoing are preferable.

In the foregoing Embodiments 1-18 various structures and concepts may replace the structures and concepts of other embodiments.

For example, in Embodiments 1-2, 4-18, the feeding portion (the stirring member 2*m* rotatable relative to the cylindrical portion) described in Embodiment 3 (FIG. 24) may be employed. For the other structures required by the employment of such a feeding portion, the structures disclosed with respect to the other embodiments are usable.

In addition, for example, in Embodiments 1-8, 10-18, the pump portion (film-like pump) of Embodiment 9 (FIG. 32) may be employed. Furthermore, for example, in Embodiments 1-10, 12-18, the drive converting mechanism of Embodiment 11 (FIGS. 34-36) which converts to the force for backward stroke of the pump portion without converting to the force for forward stroke of the pump portion may be employed.

INDUSTRIAL APPLICABILITY

According to the present invention, the pump portion can be properly operated together with the feeding portion provided in the developer supply container.

The developer accommodated in the developer supply container can be properly fed, and simultaneously the developer accommodated in the developer supply container can be properly discharged.

The invention claimed is:

1. A developer supply container comprising:

a developer accommodating chamber-fer accommodating developer;

a developer discharging chamber provided with a discharge opening capable of permitting discharging of the developer;

a shutter movable relative to the developer discharging chamber between an open position wherein the discharge opening is open and a closed position wherein the discharge opening is closed by the shutter;

a driving force receiving portion capable of receiving a rotational force;

a pump portion capable of acting on at least the developer discharging chamber, the pump portion having a volume that changes with reciprocation; and a drive converting portion for converting the rotational force received by the driving force receiving portion to a force for operating the pump portion.

2. A developer supply container according to claim 1, wherein the drive converting portion converts the rotational force received by the driving force receiving portion to the force for operating the pump portion that reciprocates the pump portion.

3. A developer supply container according to claim 1, wherein the drive converting portion converts the rotational force with the reciprocation of the pump portion so that an internal pressure of at least the developer discharging chamber changes between a pressure lower than an ambient pressure and a pressure higher than the ambient pressure.

4. A developer supply container according to claim 3, wherein with an increase of a volume of a chamber of the pump portion, the pressure at least in the developer discharging chamber becomes negative.

5. A developer supply container according to claim 3, wherein the developer in the developer supply container has a fluidity energy of not less than $4.3\times10^{-4}$ kg·m$^2$/s$^2$ and not more than $4.14\times10^{-3}$ kg·m$^2$/s$^2$, and wherein the discharge opening has an area not more than 12.6 mm$^2$.

6. A developer supply container according to claim 1, wherein the drive converting portion converts the rotational force such that suction and delivery actions are alternately carried out through the discharge opening with the reciprocation of the pump portion.

7. A developer supply container according to claim 1, wherein the drive converting portion is disposed at a position away from an inside space of the developer discharging chamber and away from an inside space of the developer accommodating chamber so as not to contact developer in the developer accommodating chamber and developer in the developer discharging chamber.

8. A developer supply container according to claim 1, further comprising a holding portion that is to be held by the developer replenishing apparatus so that the developer discharging chamber is substantially non-rotatable, wherein the discharge opening is provided in a bottom portion of the developer discharging chamber.

9. A developer supply container according to claim 8, wherein the drive converting portion includes a rotatable portion and a follower portion which is substantially non-rotatable with the developer discharging chamber and which is reciprocal by being driven by the rotatable portion, and wherein the follower portion is integrally movable with the pump portion.

10. A developer supply container according to claim 1, wherein the pump portion is connected to the developer discharging chamber.

11. A developer supply container according to claim 10, further comprising a partition between the developer accommodating chamber and the developer discharging chamber such that a pressure change resulting from a volume change of a chamber of the pump portion takes place selectively in the developer discharging chamber.

12. A developer supply container according to claim 11, wherein the partition is movable between a closed position for separating the developer accommodating chamber from the developer discharging chamber and an open position for communicating between the developer accommodating chamber and the developer discharging chamber, and wherein the drive converting portion converts the rotational force so that when the partition is in the closed position, the discharging action through the discharge opening is carried out at least by the pump portion.

13. A developer supply container according to claim 12, wherein the drive converting portion converts the rotational force so that when the partition is in the closed position, the discharging action through the discharge opening is carried out by the pump portion.

14. A developer supply container according to claim 12, wherein the drive converting portion converts the rotational force so that when the partition is in the open position, the pump portion is not in operation.

15. A developer supply container according to claim 12, wherein the partition is reciprocated by a force provided by the conversion of the drive converting portion.

16. A developer supply container according to claim 1, further comprising a nozzle portion connected to the pump portion and having an opening at a free end thereof, the opening of the nozzle portion being positioned adjacent to the discharge opening.

17. A developer supply container according to claim 16, wherein the nozzle portion is provided with a plurality of the openings around a free end side thereof.

18. A developer supply container according to claim 1, wherein the drive converting portion includes a rotatable portion, and a follower portion which is reciprocal by being driven by the rotatable portion, and wherein the pump portion is provided outside a drive conversion path extending from the driving force receiving portion to the follower portion.

19. A developer supply container according to claim 1, wherein the drive converting portion converts the rotational force received by the driving force receiving portion such that the developer accommodating chamber reciprocates with the pump portion.

20. A developer supply container according to claim 1, wherein the drive converting portion is provided with a cam mechanism configured and positioned to convert the rotational force received by the driving force receiving portion to the force for operating the pump portion.

* * * * *